US010282729B2

(12) United States Patent
Phillips

(10) Patent No.: US 10,282,729 B2
(45) Date of Patent: May 7, 2019

(54) METHODS, APPARATUS AND MEDIA FOR USE IN ASSOCIATION WITH IDENTIFICATION TOKEN AND/OR IN DOCKING

(71) Applicant: MasterCard International Incorporated, Purchase, NY (US)

(72) Inventor: Simon Phillips, York (GB)

(73) Assignee: Mastercard International Incorporated, Purchase, NY (US)

( * ) Notice: Subject to any disclaimer, the term of this patent is extended or adjusted under 35 U.S.C. 154(b) by 899 days.

(21) Appl. No.: 14/281,205

(22) Filed: May 19, 2014

(65) Prior Publication Data

US 2014/0337233 A1 Nov. 13, 2014

Related U.S. Application Data

(63) Continuation-in-part of application No. 11/966,139, filed on Dec. 28, 2007, now Pat. No. 8,991,695, and a continuation-in-part of application No. 12/344,863, filed on Dec. 29, 2008, now Pat. No. 8,794,532.

(51) Int. Cl.
*G06Q 20/40* (2012.01)
*G06Q 20/32* (2012.01)
*G06Q 20/34* (2012.01)
*G07F 7/08* (2006.01)

(52) U.S. Cl.
CPC ..... *G06Q 20/4016* (2013.01); *G06Q 20/3278* (2013.01); *G06Q 20/352* (2013.01); *G07F 7/0893* (2013.01)

(58) Field of Classification Search
USPC ............................................ 235/380; 705/67
See application file for complete search history.

(56) References Cited

U.S. PATENT DOCUMENTS

2008/0017704 A1* 1/2008 VanDeburg ............ G06Q 20/32
235/380
2011/0184867 A1* 7/2011 Varadarajan ........... G06Q 20/04
705/44

* cited by examiner

*Primary Examiner* — Rafferty D Kelly
(74) *Attorney, Agent, or Firm* — Buckley, Maschoff & Talwalkar LLC

(57) ABSTRACT

In some embodiments, a method includes supporting an identification token, issued to an account holder by a non-card shaped body of a device; communicating with a proximity coupling device via a wireless interface of the identification token; electrically connecting a communication device to an electrical connector attached to the non-card shaped body; and resetting a security parameter in the identification token in response, at least in part, to at least one signal from the communication device. In some embodiments, the non-card shaped body of the device is a non-card shaped body of a device issued to the account holder. In some embodiments, the communication device is a communication device issued to the account holder. In some embodiments, an apparatus includes an identification token having a wireless interface; a non-card shaped body that encloses the identification token; and an electrical connector attached to the non-card shaped body and adapted to be electrically connected to a communication device; the identification token to communicate with a proximity coupling device via the wireless interface, and to reset a security parameter in the identification token in response, at least in part, to at least one signal from the communication device.

30 Claims, 27 Drawing Sheets

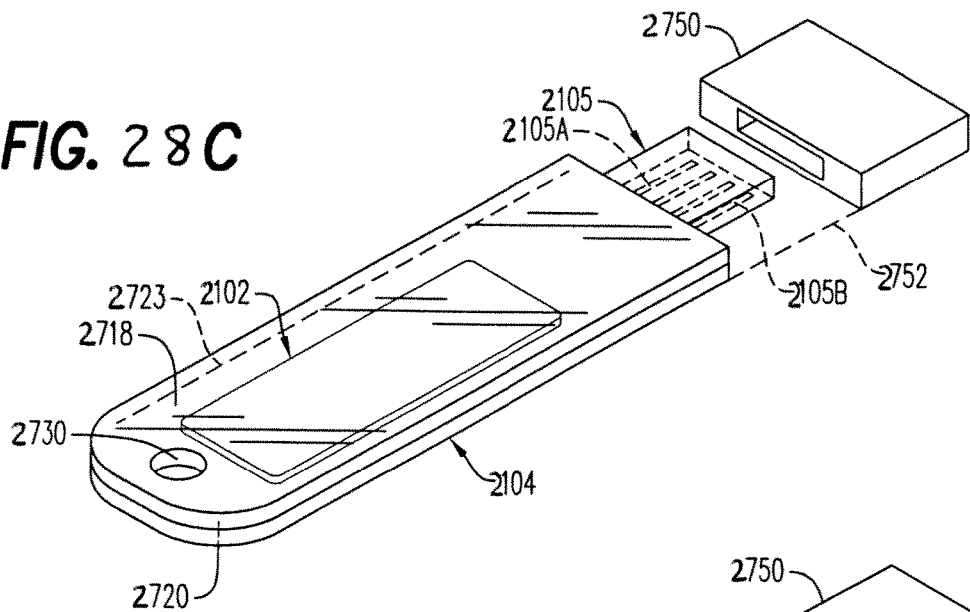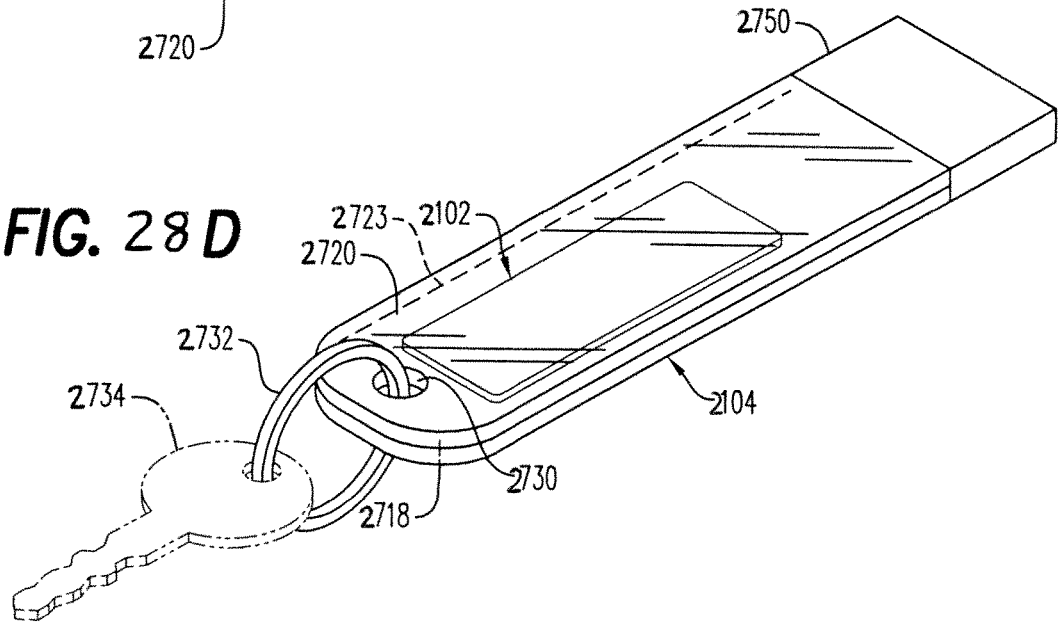

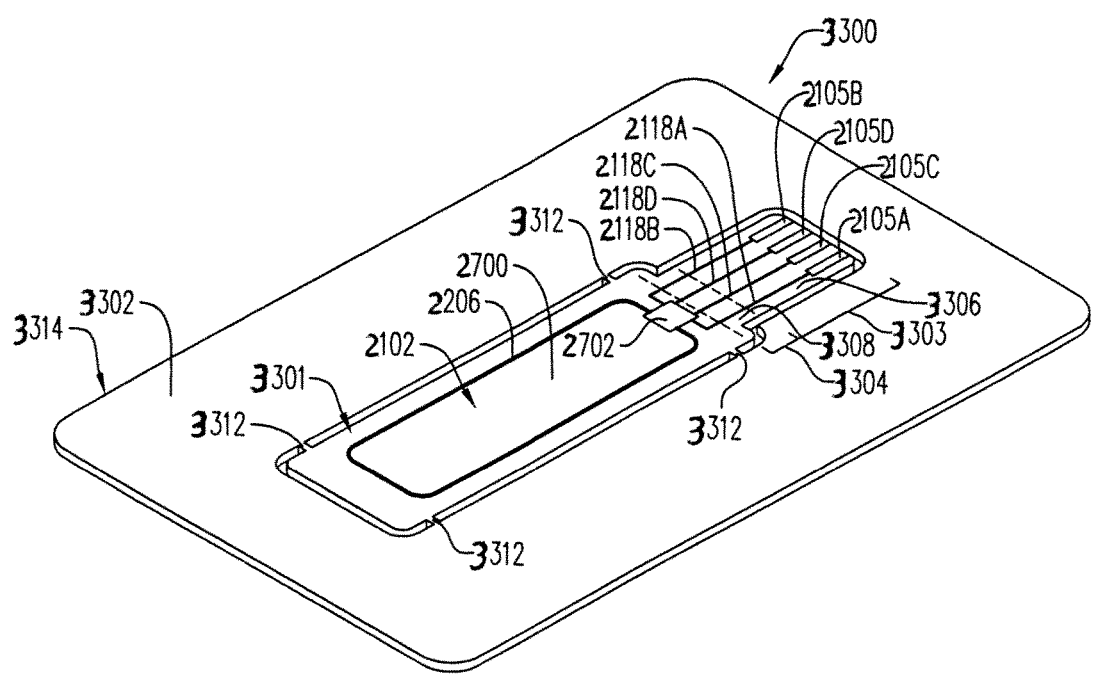

US 10,282,729 B2

METHODS, APPARATUS AND MEDIA FOR USE IN ASSOCIATION WITH IDENTIFICATION TOKEN AND/OR IN DOCKING

CROSS REFERENCE TO RELATED APPLICATION

The present application is a Continuation in Part of co-pending prior U.S. patent application Ser. No. 11/966,139, filed Dec. 28, 2007, which is hereby incorporated by reference in entirety; the present application is also a Continuation in Part of co-pending prior U.S. patent application Ser. No. 12/344,863, filed Dec. 29, 2008, which is hereby incorporated by reference in entirety.

BACKGROUND

Proximity payment devices are in widespread use. A well known standard for proximity payment devices has been promulgated by MasterCard International Incorporated, the assignee hereof, and is referred to as "PayPass". A proximity payment device often includes a wireless communication interface to transmit a payment account number and/or other information to a point of sale (POS) terminal. The wireless interface often includes a radio frequency identification integrated circuit (RFID IC) and an antenna to receive a power signal from and/or communicate with the POS terminal.

Some proximity payment devices include an EMV risk parameter that is used to help reduce and/or limit fraud and/or bad debt. The EMV risk parameter is usually incremented or decremented each time the proximity payment device is used in a purchase transaction. The proximity payment device may be usable only until the EMV risk parameter reaches a predetermined value and/or until a predetermined amount has been spent. Thereafter, the EMV risk parameter may need to be reset if the proximity payment device is to be usable in further purchase transactions.

One issue associated with EMV risk parameters is how to reset the EMV risk parameter during periods of time in which the risk of fraud and/or bad debt is low, e.g., when the proximity payment device is not lost and the account is in good standing. Some systems reset the EMV risk parameter after the proximity payment device has been used in a predetermined number of transactions. In some systems, this is carried out the next time that the proximity payment device is presented for a purchase transaction.

The amount of time needed to reset the EMV risk parameter is sometimes twenty to thirty seconds, which can be considerably longer than the amount of time needed for the transaction itself.

If the proximity payment device has a card shape and contact terminals, the proximity payment device may be inserted into a card reader with contacts that make contact with the terminals on the card. However, some proximity payment devices do not have a card shape and thus may not be insertable into such a reader.

BRIEF DESCRIPTION OF THE DRAWINGS

FIGS. 28A-28D are perspective views of a proximity payment device, a body and a connector, according to some embodiments;

FIG. 30 is a perspective view of a structure, according to some embodiments;

DETAILED DESCRIPTION

The following text is incorporated from U.S. patent application Ser. No. 11/966,139. Definitions in such text apply to terms in such text and all claims entitled to the benefit of the filing date of such application.

Figure 1:
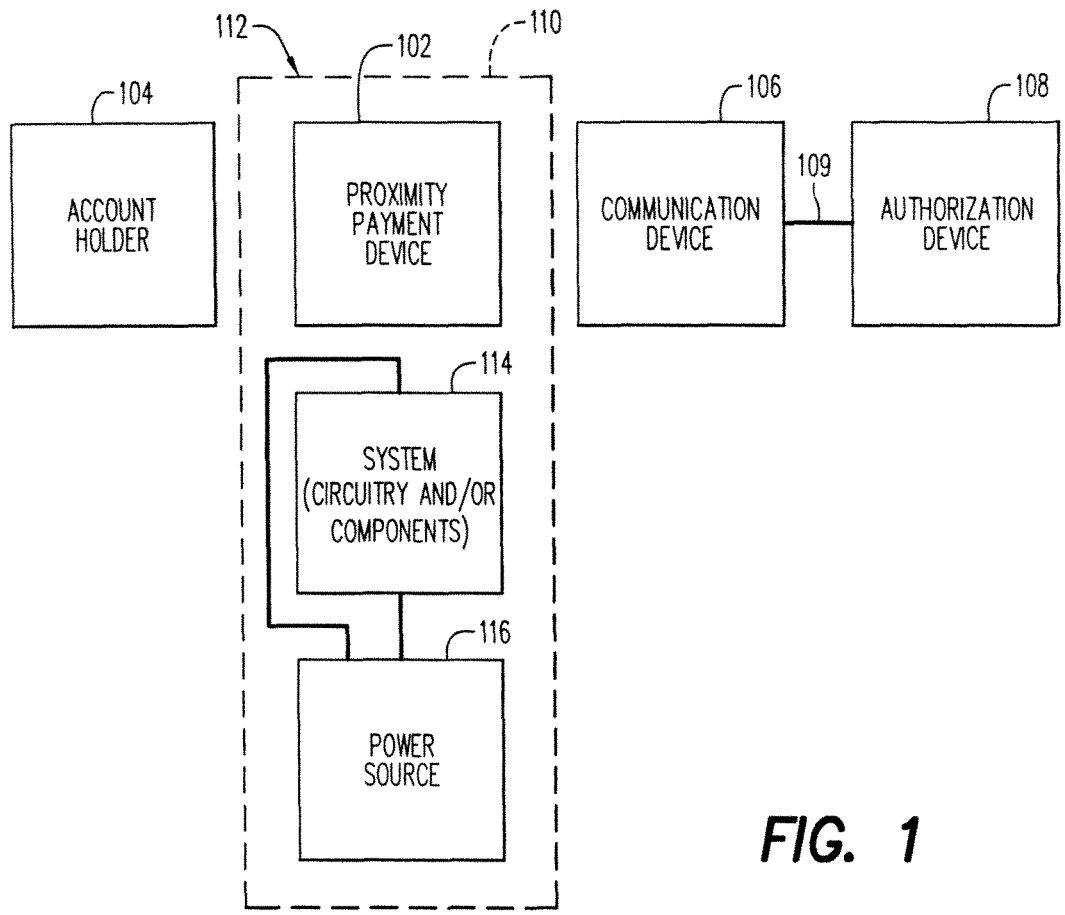
FIG. 1 is a schematic block diagram of a system, according to some embodiments.

FIG. 1 is a schematic block diagram of a system 100 to reset an EMV risk parameter and/or other security parameter(s) stored in a proximity payment device issued to an account holder, in accordance with some embodiments.

Referring to FIG. 1, the system 100 includes a proximity payment device 102 issued to an account holder 104, a communication device 106 issued to the account holder 104 and an authorization device 108. The communication device 104 and the authorization device 108 are coupled by a communication link 109.

The proximity payment device 102 may include an EMV risk parameter and/or other security parameter(s). If the proximity payment device includes an EMV risk parameter, such parameter may be incremented, decremented and/or changed in some other way each time the proximity payment device is used in a purchase transaction. The proximity payment device may be usable only until the EMV risk parameter reaches a predetermined value and/or until a predetermined amount has been spent. Thereafter, the EMV risk parameter may need to be reset if the proximity payment device is to be usable in further purchase transactions.

In accordance with some embodiments, an EMV risk parameter and/or other security parameter may be reset to increase the number of transactions in which the proximity payment device may be used. The parameter may or may not be reset to its initial value and/or attribute. In some embodiments, an EMV risk parameter and/or other security parameter may be reset before the proximity payment device becomes unusable.

The proximity payment device 102 may have any configuration. In some embodiments, the proximity payment device 102 is supported by a case and/or other type of body. Such case and/or other type of body is referred to herein as body 110. Unless stated otherwise, the term "supported by" means partially and/or entirely disposed on, disposed in, mounted on, mounted in, installed on, installed in, contained in and/or embedded in.

In some embodiments, body 110 comprises a body of a key fob, a wristwatch, a music player, a video player, a PDA and/or any other portable device 112. In such embodiments, the proximity payment device 102 may be referred to as a proximity payment system 102 of the device 112. The device 112 may further comprise a system 114 to perform one or more functions of the device 112. If the device 112 comprises a wristwatch, the system 114 may comprise circuitry and/or components to perform one or more functions of the wristwatch. If the device 112 comprises a music player, the system 114 may comprise circuitry and/or components to play music. If the device 100 comprises a video player, the system 114 may comprise circuitry and/or components to play video (with or without associated audio). If the device 100 comprises a PDA, the system 114 may comprise circuitry and/or components to perform one or more functions of the PDA. Although the system 104 is shown separate from the proximity payment system 102, in some embodiments, the proximity payment system 102 and the system 114 may share one or more circuits and/or components.

The device 112 may further include a power source 116. The power source 116 may be coupled (directly and/or indirectly) and/or supply power (directly and/or indirectly) to the proximity payment system 102 and/or the system 114. In some embodiments, the power source 116 comprises a battery. If the device 112 comprises a wristwatch, a music player, a video player, a PDA and/or any other portable device 112, the power source 116 may power the key fob, respectively.

The communication device 104 may comprise any type of communication device. As further described hereinafter, in some embodiments, the communication device 106 comprises a cell phone, a computer and/or a dock.

The authorization device 108 may comprise any type of device capable of providing an authorization to reset the EMV risk parameter and/or other security parameter(s) stored in the proximity payment device 102.

As stated above, the communication device 104 and the authorization device 108 are coupled by a communication link 109. Unless stated otherwise, a communication link may comprise any type of communication link, for example, but not limited to wired (e.g., conductors, fiber optic cables) or wireless (e.g., acoustic links, electromagnetic links or any combination thereof including, for example, but not limited to microwave links, satellite links, infrared links), and/or any combinations thereof. A communication link may be public or private, dedicated and/or shared (e.g., a network) and/or any combination thereof. A communication link may or may not be a permanent communication link. A communication link may support any type of information in any form, for example, but not limited to, analog and/or digital (e.g., a sequence of binary values, i.e. a bit string) signal(s) in serial and/or in parallel form. The information may or may not be divided into blocks. If divided into blocks, the amount of information in a block may be predetermined or determined dynamically, and/or may be fixed (e.g., uniform) or variable. A communication link may employ a protocol or combination of protocols including, for example, but not limited to the Internet Protocol.

Figure 2:
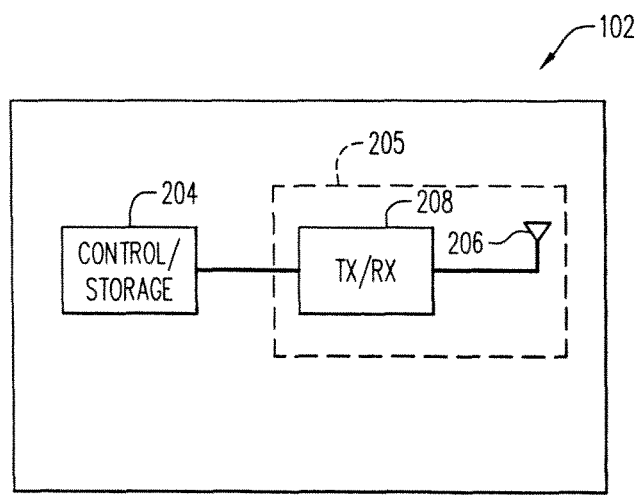
FIG. 2 is a schematic block diagram of a proximity payment device, according to some embodiments.

FIG. 2 is a schematic block diagram of the proximity payment device 102, according to some embodiments. Referring to FIG. 2, in some embodiments, the proximity payment device 102 includes control/storage circuitry 204 and a wireless communication interface 205.

The control/storage circuitry 204 is operative to store a payment account number and/or other information to be transmitted to a POS terminal. In some embodiments, the control/storage circuitry 204 may comprise a simple memory device capable only of responding to a pre-defined set of commands. In some other embodiments, the control/storage circuitry 204 may comprise a secure microcontroller capable of executing a pre-defined program.

The wireless communication interface 205 allows the proximity payment device 102 to transmit and/or receive signals. The signals transmitted by the wireless communication interface 205 may include a payment account number and/or other information stored in the control/storage circuitry 204. The signals received by the wireless communication interface may include an interrogation, a power signal and/or other signals.

In some embodiments, the wireless communication interface 205 is configured to allow the proximity payment device 102 to operate in accordance with the above-mentioned "PayPass" standard.

In some embodiments, wireless communication interface 205 comprises an antenna 206 and transmit/receive circuitry 208. The antenna 206 may be configured to transmit and receive radio frequency (RF) signals and may comprise a loop antenna and/or any other suitable configuration. The transmit/receive circuitry 208 may be coupled between the antenna 206 and the control/storage circuitry 204.

In operation, wireless signals (e.g., RF signals) may be received by the antenna 206 and supplied to the transmit/receive circuitry 208, which in response may provide signals that are supplied to the control/storage circuitry 204. The control/storage circuitry 204 may also provide signals that are supplied to the transmit/receive circuitry 208, which in response may provide signals that are supplied to the antenna 206 and transmitted thereby.

In some embodiments, the control/storage circuit 204 and the transmit/receive circuitry 208 are disposed in a single integrated circuit. In some embodiments, the control/storage circuitry 204 and the transmit/receive circuitry 208 are disposed in an RFID IC. Unless stated otherwise, the term RFID is not limited to a specific type of RFID. In some embodiments, an RFID may be a simple memory device capable only of responding to a pre-defined set of commands. In some other embodiments, an RFID may comprise a microcontroller capable of executing a program. Some embodiments may include further features. Some embodiments may comprise other configurations altogether. In some embodiments, the RFID IC comprises an IC that uses contactless technology, such as, for example, as specified in international standard ISO/IEC 14443.

As stated above, in some embodiments, the communication device 106 comprises a cell phone.

Figure 3:
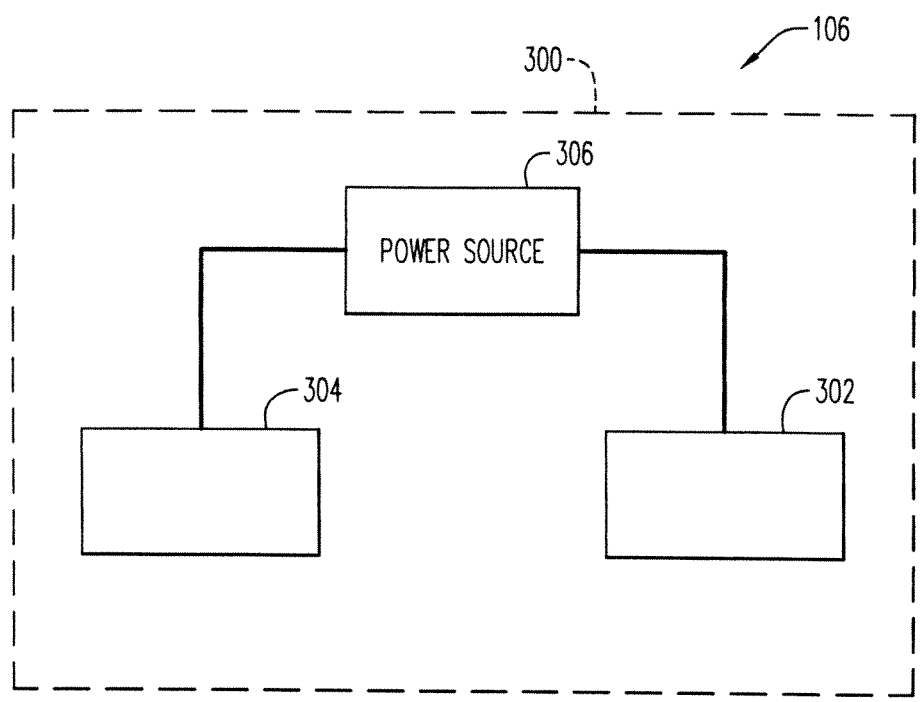
FIG. 3 is a schematic block diagram of communication device, according to some embodiments.

FIG. 3 is a schematic block diagram of communication device 106 that comprises a cell phone 300, according to some embodiments. Referring to FIG. 3, the cell phone 300 includes first and second subsystems 302, 304. The first subsystem 302 may include circuitry and/or other components to perform wireless communication with a cellular network. The second subsystem 304 may include circuitry and/or other components to perform near field communication.

Although the first subsystem 302 is shown separate from the second subsystem 304, in some embodiments, the first subsystem 302 and the second subsystem 304 may share one or more circuits and/or components.

The cell phone may further include a power source 306. The power source 306 may be coupled (directly and/or indirectly) and/or supply power (directly and/or indirectly) to the first subsystem 302 and/or the second subsystem 304. In some embodiments, the power source 306 comprises a battery.

Figure 4:
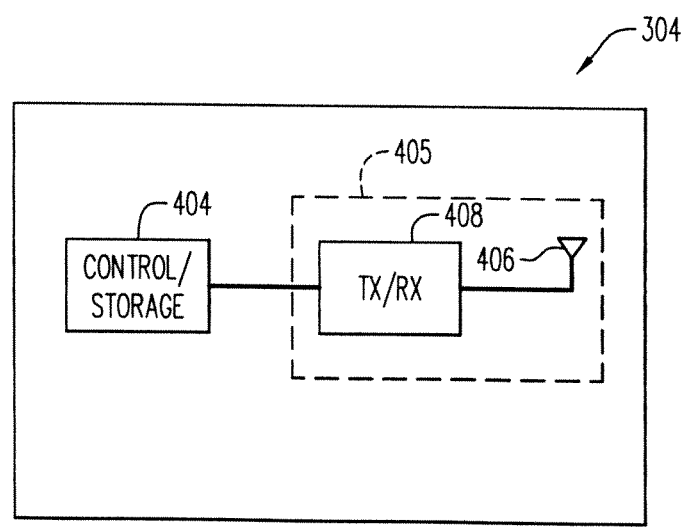
FIG. 4 is a schematic block diagram of a subsystem of the communication device of FIG. 3, according to some embodiments.

FIG. 4 is a schematic block diagram of the second subsystem 304, according to some embodiments. Referring to FIG. 4, in accordance with some embodiments, the second subsystem 304 includes control/storage circuitry 404 and a wireless communication interface 405.

In some embodiments, the control/storage circuitry 404 may be a simple memory device capable only of responding to a pre-defined set of commands. In some other embodiments, the control/storage circuitry 404 may comprise a secure microcontroller capable of executing a pre-defined program.

The wireless communication interface 405 facilitates wireless communication. In some embodiments, wireless communication interface 405 comprises an antenna 406 and transmit/receive circuitry 408. The antenna 406 may be configured to transmit and receive radio frequency (RF) signals and may comprise a loop antenna and/or any other suitable configuration. The transmit/receive circuitry 408 may couple the antenna 406 to the control/storage circuitry 404.

In some embodiments, the control/storage circuit 404 and the transmit/receive circuitry 408 are disposed in a single integrated circuit. In some embodiments, the control/storage circuit 404 and the transmit/receive circuitry 408 are disposed in an IC that uses NFC technology, such as, for example, an NFC IC provided by PHILIPS ELECTRONICS or NXP Semiconductors.

In operation, wireless signals (e.g., RF signals) are received by the antenna 406 and supplied to the transmit/receive circuitry 408, which in response may provide signals that are supplied to the control/storage circuitry 404. The control/storage circuitry 404 may also provide signals that are supplied to the transmit/receive circuitry 408, which in response, may provide signals that are supplied to the antenna 406 and transmitted thereby.

Figure 5:
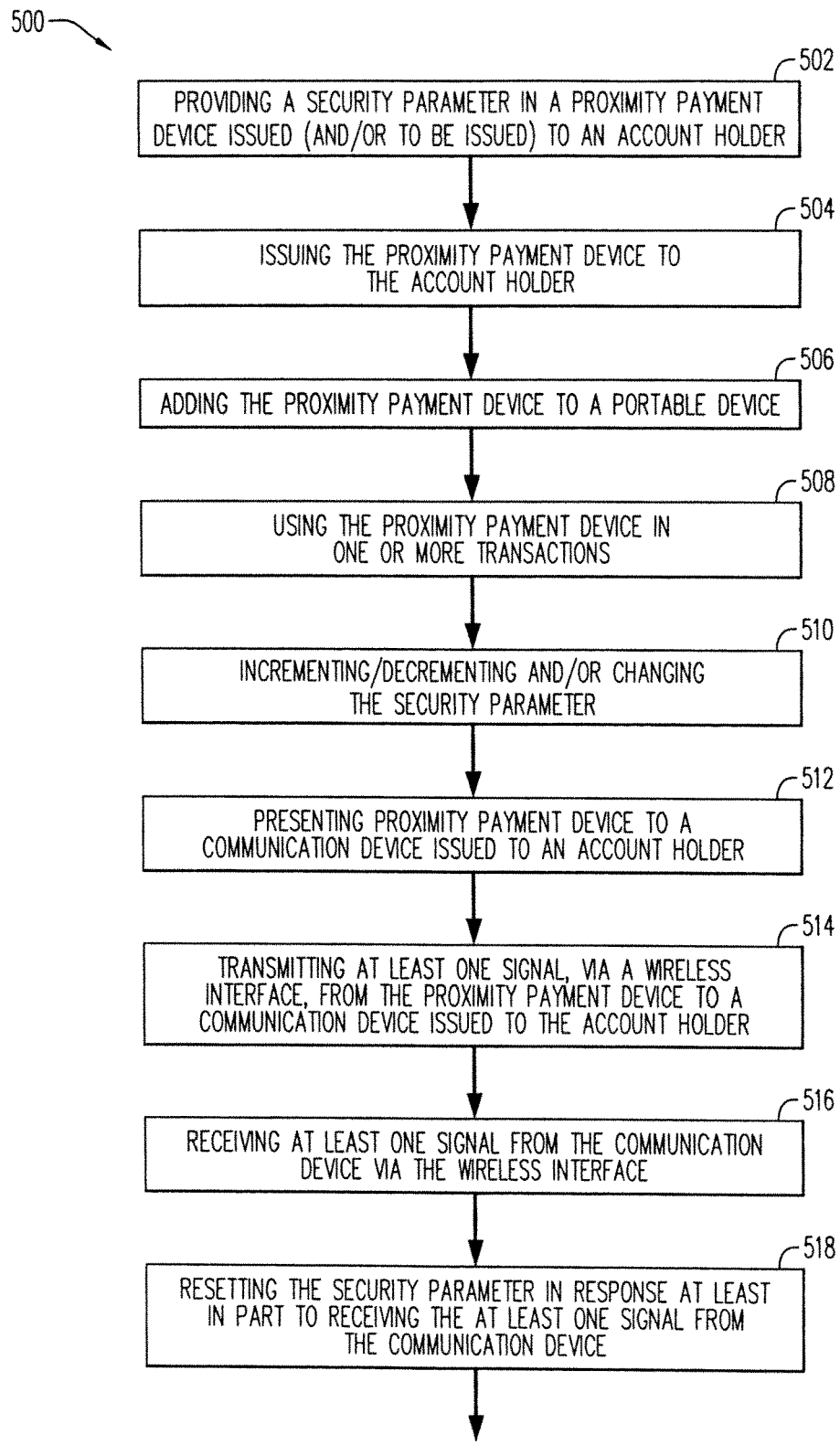
FIG. 5 is a flow chart that illustrates a method, according to some embodiments.

FIG. 5 is a flow chart 500 of a method according to some embodiments. In some embodiments, one or more portions of the method may be used in association with the proximity payment device 102 and communication device 106. The method is not limited to the order shown in the flow chart. Rather, embodiments of the method may be performed in any order that is practicable. For that matter, unless stated otherwise, any method disclosed herein may be performed in any order that is practicable. Notably, some embodiments may employ one or more portions of the method without one or more other portions of the method.

At 502, the method may include providing a security parameter in a proximity payment device issued, and/or to be issued, to an account holder. In some embodiments such security parameter comprises an EMV risk parameter that is provided in the course of personalization and/or a pre-personalization of the proximity payment device. As is known, pre-personalization of the proximity payment device may include storing information such as keys to be used in subsequent transactions and/or parameters to be used to select a particular card brand to be borne by the proximity payment device. This may include writing information such as loading of keys to be used in subsequent transactions and parameters (such as to select a particular card brand to be borne by the proximity payment device) into the control/storage circuitry 204 (FIG. 2) of the proximity payment device. Pre-personalization may further include printing information such as a payment card association brand, etc., on the proximity payment device. If a multiple proximity payment devices are processed as a batch, the information transmitted to each proximity payment device and/or printed on each proximity payment device may be the same for all proximity payment devices in the batch.

Personalization of the proximity payment device may include assigning the proximity payment device to a particular payment account and/or a particular account holder by storing information in the proximity payment device. This may include writing a payment card account number and a name of the account holder into the control/storage circuitry 204 (FIG. 2) of a proximity payment device. Other information, such as expiration date, may be stored in either of the pre-personalization and personalization steps. Personalization may further include printing the payment account number and/or any other information (or a portion thereof) that was (or is to be) stored in the proximity payment device 102 on a surface of the proximity payment device 102. In some embodiments, pre-personalization and personalization steps may be combined into one step. In some embodiments, personalization and/or pre-personalization is carried out using contactless card programming equipment commonly used to program proximity payment cards, such as for example, a model 9000 available from Datacard Group, Minnetonka, Minn.

Unless stated otherwise, the term "issued to" may include, but is not limited to, given to, loaned to, rented to, sold to, and/or transferred to.

At 504, the method may further include issuing the proximity payment device to the account holder. Unless stated otherwise, the term "issuing" may include, but is not limited to, giving, loaning, renting, selling and/or transferring. In some embodiments, issuing the proximity payment device to the account holder includes mailing and/or otherwise sending the proximity payment device to the account holder.

At 506, the method may further include adding the proximity payment device to a cell phone, a music player, a video player, a PDA, a wristwatch, a wristband, a bracelet, a pendant, a key fob and/or any other type of consumer or portable device such that the proximity payment device is supported by a body of the portable device. In some embodiments, this is carried out by the account holder, after the proximity payment device is issued to the account holder.

At 508, the method may further include using the proximity payment device in one or more transactions. In some embodiments, this may be carried out in a conventional manner, e.g., in accordance with the above-mentioned "PayPass" standard. For example, the proximity payment device may be presented to a proximity coupling device (not shown) of a POS terminal (not shown) to accomplish payment for a transaction. The proximity coupling device may transmit an interrogation signal. The proximity payment device may receive the interrogation signal via the antenna 206 (FIG. 2). The received interrogation signal may cause the circuitry of the proximity payment device to be powered-up. For example, the proximity payment device may include circuitry to rectify the received interrogation signal to generate a DC power that may be used to power the control/storage circuitry 204 (FIG. 2) and transmit/receive circuitry 208 (FIG. 2). The proximity payment device may transmit a signal to the proximity coupling device in response to the interrogation signal. The proximity payment device may transmit the signal (and possibly one or more additional signals) to the proximity coupling device via the antenna 206 (FIG. 2). One or more signals transmitted by the proximity payment device may include a payment card account number and/or other information required for interaction with the proximity coupling device. In some embodiments, the proximity payment device may transmit the payment card account number and/or other information via the antenna 206 (FIG. 2) after a handshake procedure or the like with the POS terminal. The POS terminal may then interact with a payment card system to charge the current sales transaction to the payment card account represented by the payment card account number received from the proximity payment device.

In some embodiments, the proximity payment device may be presented to the proximity coupling device by simply positioning the proximity payment device within wireless communication range of the proximity coupling device. In some embodiments, the proximity payment device may be presented to the proximity payment device by positioning the proximity payment device in physical contact with, and/or by tapping a portion of the proximity payment device on, the proximity coupling device.

In some embodiments, a proximity payment device may be selectively enabled/disabled in order to enable and/or disable operation of the proximity payment device. In some embodiments, a proximity payment device may be presented to a proximity coupling device before, during and/or after enabling operation of the proximity payment device.

At 510, the value of the EMV risk parameter may be incremented, decremented and/or changed in any other way in response to one or more of such transactions.

At 512, the method may include presenting the proximity payment device to a communication device issued to the account holder. In some embodiments, the proximity payment device may be presented to the communication device by simply positioning the proximity payment device within wireless communication range of the communication device. In some embodiments, the proximity payment device may be presented to the communication device by positioning the proximity payment device in physical contact with, and/or by tapping a portion of the proximity payment device on, the communication device.

At 514, the method may further include transmitting at least one signal, via a wireless interface, from the proximity payment device to the communication device. In accordance with some embodiments, the at least one signal may include a request for authorization to reset the EMV risk parameter. In accordance with some embodiments, the communication device may transmit the request to an authorization device.

At 516, the method may further include receiving at least one signal from the communication device via the wireless interface. In accordance with some embodiments, the at least one signal may include authorization to reset the EMV risk parameter. In accordance with some embodiments, the communication device may receive the authorization from the authorization device.

At 518, the method may further include resetting a security parameter in the proximity payment device in response at least in part to receiving the at least one signal from the communication device.

Figure 6:
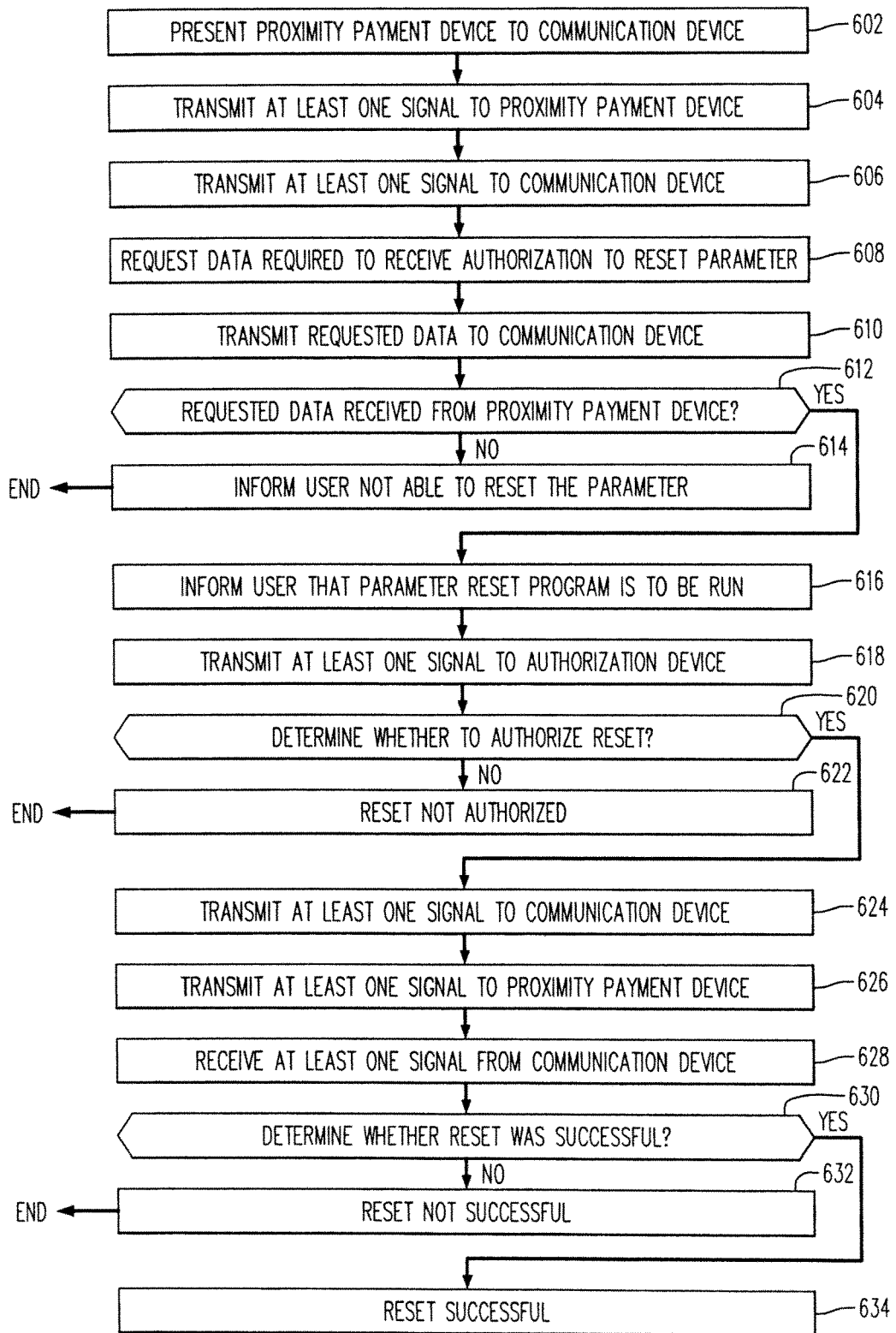
FIG. 6 is a flow chart that illustrates a method, according to some embodiments.

FIG. 6 shows a flow chart 600 of a method that may be used in resetting a EMV risk parameter, according to some embodiments. In some embodiments, one or more portions the method may be used in association with the proximity payment device 102 and communication device 106 in order to reset the EMV risk parameter stored in the proximity payment device 102. In some embodiments, one or more portions of the method may be used at 510-518 in the method of FIG. 5. The method is not limited to the order shown in the flow chart. Rather, embodiments of the method may be performed in any order that is practicable. For that matter, unless stated otherwise, any method disclosed herein may be performed in any order that is practicable. Notably, some embodiments may employ one or more portions of the method without one or more other portions of the method.

At 602, the method may include presenting a proximity payment device to a communication device. The communication device may recognize the proximity payment device, and at 604, the communication device may transmit at least one signal to the proximity payment device. In some embodiments, the at least one signal may be transmitted via the antenna 406 (FIG. 4) and may be similar to an interrogation signal of the above-mentioned "PayPass" standard. In some embodiments, the at least one signal includes a query as to a status of the EMV risk parameter in the proximity payment device.

The proximity payment device may receive the at least one signal transmitted by the communication device. In some embodiments, the at least one signal may be received via the antenna 206 (FIG. 2) and may cause the proximity payment device to be powered-up. For example, the proximity payment device may include circuitry to rectify the received request signal to generate DC power that may be used to power the control/storage circuitry 204 (FIG. 2) and transmit/receive circuitry 208 (FIG. 2).

At 606, the proximity payment device may transmit at least one signal to the communication device. The at least one signal may comprise a request for authorization to reset the EMV risk parameter. In some embodiments, the at least one signal transmitted by the communication device includes a query and the proximity payment device transmits the request for authorization in response, at least in part, to such query. In some other embodiments, the proximity payment device transmits the at least one signal without receiving any signals from the communication device.

The communication device may receive the at least one signal transmitted by the proximity payment device, and if the at least one signal comprises a request for authorization to reset the EMV risk parameter, then at 608, the communication device may request an account number and/or other data that may be required to receive authorization to reset the EMV risk parameter.

The proximity payment device may receive the request for data, and at 610, the proximity payment device may transmit the requested data to the communication device.

The communication device may receive the data transmitted by the proximity payment device, and at 612, the communication device may determine whether the data includes the requested data. If the communication device determines that the data does not include the requested data, then at 614, the communication device may inform a user that the EMV risk parameter is not able to be reset. In some embodiments, the communication device informs and/or prompts the user using a display. In some embodiments, information supplied to and/or by the display comprises information supplied by the proximity payment device. In some embodiments, information supplied to and/or by the display may define one or more logos and/or brands. In some embodiment, the one or more logos and/or brands may include (i) a brand and/or logo of a national payment card association such as MasterCard International Incorporated, (ii) a brand and/or logo of an issuer and/or merchant associated with the proximity payment device (iii) a brand and/or logo of a specific card product.

At 612, if the communication device determines that the data includes the requested data, then at 616, the communication device may inform the user that an EMV risk parameter reset program is to be run.

At 618, the communication device may transmit at least one signal to an authorization device. In some embodiments, the at least one signal comprises a request for authorization to reset the EMV risk parameter and/or data that may be required to receive such authorization. In some embodiments, the authorization device comprises a device operated by the issuer and/or a device operated by a party associated with the issuer.

In some embodiments, the method includes establishing a communication channel to connect the communication device and the authorization device. In some embodiments, the method includes establishing a communication channel to connect the proximity payment device and the authorization device.

If the communication device comprises a cell phone, the proximity payment device may transmit the at least one signal via a communication link that includes the cellular network. If the communication device comprises a computer, the communication device may transmit the at least one signal via a communication link that includes a telephone line and/or a network, e.g., the Internet.

The authorization device may receive the at least one signal transmitted by the communication device, and at 620, the authorization device may determine whether to authorize reset of the EMV risk parameter. In some embodiments, this determination is based on whether or not risk of fraud and/or bad debt is low, e.g., the proximity payment device is not reported lost and the account is in good standing.

If the authorization device determines not to authorize reset of the EMV risk parameter, then at 622, the authorization device may inform the communication device, which may in turn inform the user that the EMV risk parameter is not authorized to be reset.

At 620, if the authorization device determines to authorize reset of the EMV risk parameter, then at 624, the authorization device may transmit at least one signal to the communication device. In some embodiments, the at least one signal includes an authorization to reset the EMV risk parameter. In some embodiments, the authorization comprises a script to be executed by the proximity payment device to reset the EMV risk parameter.

The communication device may receive the at least one signal transmitted by the authorization device, and at 626, the communication device may transmit the at least one signal to the proximity payment device.

At 628, the proximity payment device may receive the at least one signal transmitted by the communication device. If the at least one signal includes an authorization to reset the EMV risk parameter, the proximity payment device may reset the EMV risk parameter in response at least thereto. If the at least one signal includes a script, the proximity payment device may execute the script to reset the EMV risk parameter.

At 630, the communication device and/or the proximity payment device may determine whether the reset was successful. If the reset was not successful, then at 632, the communication device may inform the user and/or the authorization device that the reset was not successful.

At 630, if the reset was successful, then at 634, the communication device may inform the user and/or the authorization device that the reset was successful.

In some embodiments, the communication device may be used in resetting the EMV risk parameter in any number of proximity payment devices on any number of occasions. In some embodiments, the communication device may be used in resetting the EMV risk parameter in only a limited number of proximity payment devices and/or on only a limited number of occasions.

In some embodiments, the communication device may include a counter indicative of the number of occasions that the communication device may be used in resetting the EMV risk parameters. The counter may be decremented each time that the communication device is used in resetting an EMV risk parameter. If the counter reaches zero, the communication device may no longer be used in resetting an EMV risk parameter. Some embodiments may allow the issuer to reset or increment the counter so that the communication device may again be used in resetting an EMV risk parameter.

In some embodiments, one or more authentication protocols may be used in addition to and/or in lieu of the one or more portions of the methods disclosed herein.

In some embodiments, the authorization device may transmit a request for a user identifier prior to transmitting an authorization to reset the EMV risk parameter. In accordance with some embodiments, a user identifier may be required if an online purchase transaction is attempted. In some embodiments, the communication device may receive the request for the user identifier and may prompt the user to enter a user identifier (e.g., using a keypad). In accordance with some embodiments, a visible and/or audible indication may be provided to indicate that the attention of the user is required. If the user enters a user identifier, the communication device may transmit the user identifier to the authorization device. The authorization device may determine whether the user identifier is valid. If the authorization device determines that the user identifier is not valid, the authorization device may inform the communication device of such, and the communication device may inform the user. The user may be given one or more additional opportunities to enter a user identifier, however, the authorization device may not transmit the authorization to reset the EMV risk parameter unless a valid user identifier is received.

In some embodiments, the communication device may store any data that may be required to receive authorization to reset the EMV risk parameter. In some embodiments, such data comprises the data received at 612 of the method of FIG. 6. The communication device may thereafter request authorization to reset an EMV risk parameter even though the proximity payment device may not be present. The communication device may thereafter receive authorization to reset the EMV risk parameter, which the communication device may transmit to the proximity payment device when the proximity payment device is next presented to the communication device. In some embodiments, the authorization may expire if not transmitted to the proximity payment device within a certain period of time, which may be specified by the authorization device at the time that the authorization is transmitted to the communication device. In some embodiments, this is carried out by performing portions 602-604 of the method of FIG. 6 after portion 624 and without performing portions 606-614.

Thus, in some embodiments, it is possible to reset the EMV risk parameter in a proximity payment device without having to provide a communication channel between the communication device and the authorization device. Notably such a communication channel may not always be available and/or may be inconvenient to provide and/or wait for.

In some embodiments, the communication device may request authorization on a periodic basis, shortly before an authorization expires and/or after an authorization expires, so as to have an authorization available when the proximity payment device is next presented to the communication device.

In some embodiments, the communication device 106 may include information that defines a schedule for requesting authorization. In some embodiments, one or more portions of the information that defines the schedule may be supplied by and/or based at least in part on data supplied by the account holder.

In some embodiments, an account holder may present the proximity payment device to the communication device on a periodic basis. In some embodiments, an account holder may present the proximity payment device to the communication device at night.

In some embodiments, the proximity payment device 102, the communication device 106 and/or the authorization device 108 may transmit and/or receive signals that include data not related to resetting a security parameter in the proximity payment device. In some embodiments, such signals may be transmitted and/or received to and/or from one another and/or one or more other devices.

In some embodiments, the communication device 106 may include information that defines the data to be transmitted and/or received and/or a schedule for transmitting and/or receiving such data. The communication device 106 may also include information that defines one or more sources and/or destinations for such data. In some embodiments, one or more portions of such information may be supplied by and/or based at least in part on data supplied by the account holder.

In some embodiments, the authorization device comprises a device that is operated by and/or on behalf of an issuer of the proximity payment device. In some embodiments, the authorization device comprises a device operated by and/or on behalf of a party associated with the issuer of the proximity payment device.

In some embodiments, the communication device 106 comprises a first communication device issued to an account holder and the communication link 109 comprises a second communication device issued to the account holder.

Figure 7:
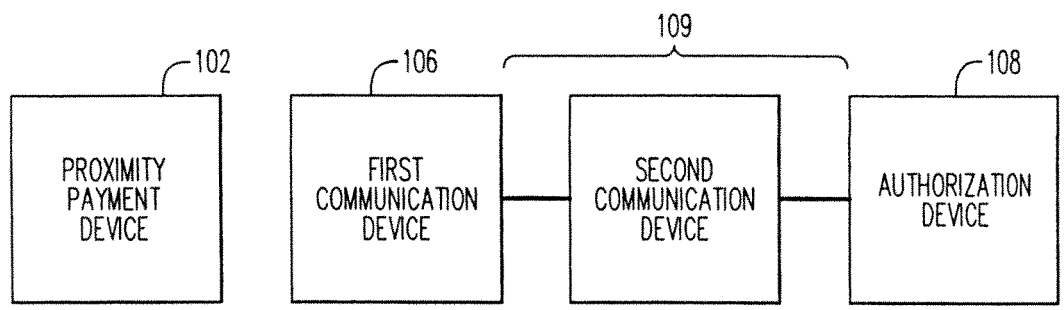
FIG. 7 is a schematic block diagram of a system, according to some embodiments.

FIG. 7 is a schematic block diagram of a system 100 to reset an EMV risk parameter and/or other security parameter(s) stored in a proximity payment device issued to an account holder, in accordance with some embodiments.

Referring to FIG. 7, in accordance with some embodiments, the system 100 includes a proximity payment device 102 issued to an account holder 104, a first communication device 106 issued to the account holder, a second communication device issued to the account holder and an authorization device 108.

In accordance with some embodiments, the first communication device 106 couples the proximity payment device 102 to the second communication device. The second communication device may be coupled to the authorization device 108.

Figure 8:
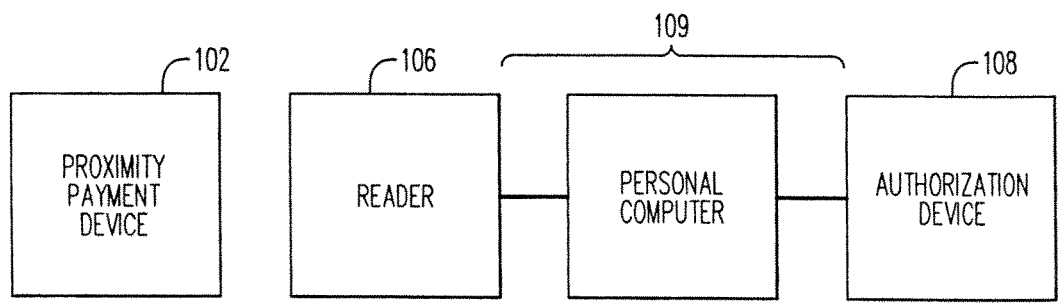
FIG. 8 is a schematic block diagram of a system, according to some embodiments.
Figure 10:
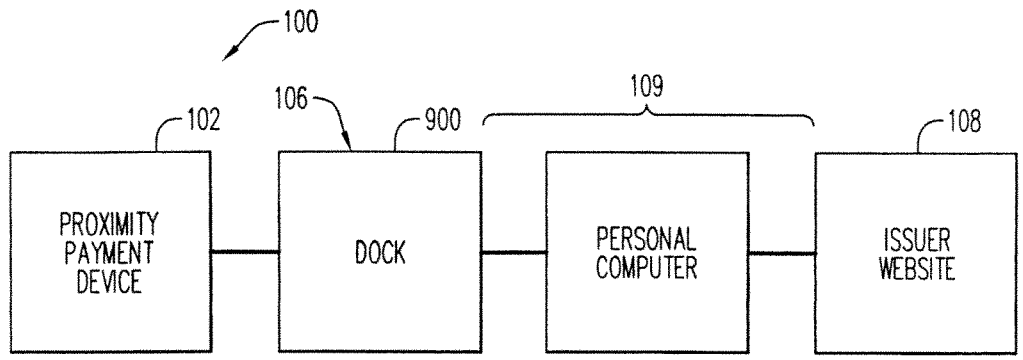
FIG. 10 is a schematic block diagram of a system, according to some embodiments.

In some embodiments, the first communication device 106 comprises a reader and the second communication device comprises a personal computer (FIG. 8). In some embodiments, the first communication device 106 comprises a dock and the second communication device comprises a personal computer (FIG. 10). In some embodiments, the authorization device 108 comprises a website (see FIG. 10). In some embodiments, the authorization device 108 comprises a website of an issuer of the proximity payment device 102 (see FIG. 10). In some embodiments the authorization device comprises an issuer device coupled to a payment server (see FIG. 11). In some embodiments the issuer device is coupled to the payment server by a Banknet.

In some embodiments, the system 100 may be used to communicate other information.

FIG. 8 is a schematic block diagram of a system 100 to reset an EMV risk parameter and/or other security parameter(s) stored in a proximity payment device issued to an account holder, in accordance with some embodiments.

Referring to FIG. 8, in accordance with some embodiments, the system 100 includes a proximity payment device 102 issued to an account holder 104, a communication device 106 that comprises a reader issued to the account holder, a personal computer and an authorization device 108.

In accordance with some embodiments, the reader couples the proximity payment device 102 to the personal computer. The personal computer may be coupled to the authorization device 108 by the Internet.

In some embodiments, the system 100 may be used to communicate other information.

As stated above, in some embodiments, the communication device 106 comprises a dock.

Figure 9:
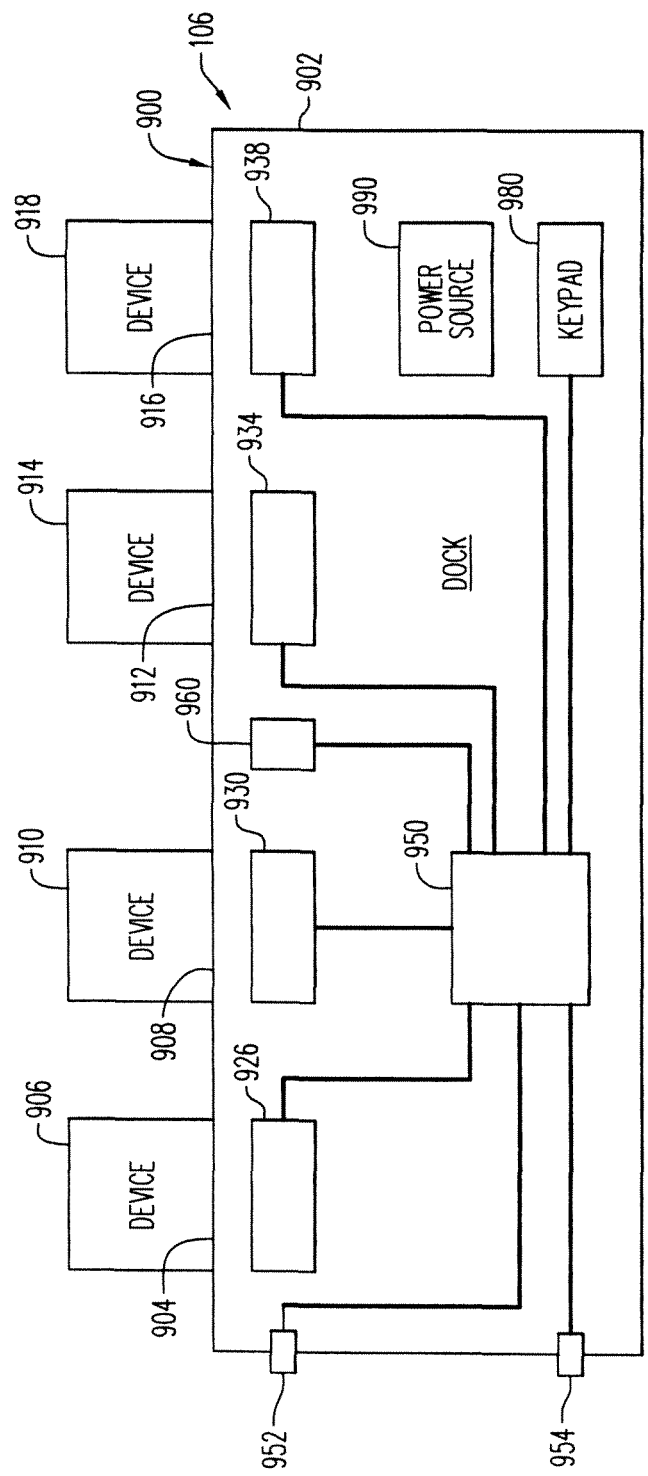
FIG. 9 is a schematic block diagram of communication device, according to some embodiments.

FIG. 9 is a schematic block diagram of communication device 106 that comprises a dock 900, according to some embodiments. Referring to FIG. 9, the dock 900 may include a body 902 that defines plurality of seats to receive a plurality of devices. In some embodiments, such plurality of seats may include a first seat 904 to receive a first device 906, a second seat 908 to receive a second device 910, a third seat 912 to receive a third device 914, and a fourth seat 916 to receive a fourth device 918.

In some embodiments, at least one of the first device 906, the second device 910, the third device 914 and the fourth device 918 may comprise at least one of a cell phone, a wristwatch, a portable data assistant, a music player and a key fob. In some embodiments, at least one of the first device 906, the second device 910, the third device 914 and the fourth device 918 comprises a proximity payment device.

In some embodiments, the first device 906, the second device 910, the third device 914 and the fourth device 918 may each include a wireless interface. In some embodiments, at least one of the first device 906, the second device 910, the third device 914 and the fourth device 918 may comprise a proximity payment device that is the same as and/or similar to the proximity payment device 102.

The dock 900 may further include a plurality of wireless communication interfaces to communicate with the plurality of devices. In some embodiments, such plurality of wireless communication interfaces may include a first wireless communication interface 926, a second wireless communication interface 930, a third wireless communication interface 934 and a fourth wireless communication interface 938. The first wireless communication interface 926 may communicate with the wireless communication interface of the first device 906. The second wireless communication interface 930 may communicate with the wireless communication interface of the second device 910. The third wireless communication interface 934 may communication with wireless communication interface of the third device 914. The fourth wireless communication interface 938 may communication with wireless communication interface of the fourth device 918. In some embodiments, the first wireless communication interface 926, the second wireless communication interface 930, the third wireless communication interface 934 and the fourth wireless communication interface 938 may each be supported by the body 902 and may each include circuitry and/or other components to perform near field communication.

In some embodiments, the first wireless communication interface 926, the second wireless communication interface 930, the third wireless communication interface 934 and the fourth wireless communication interface 938 are adjacent to a wall of the body 902 so as to help maximize the range of the interfaces 926, 930, 934, 938 outside the body 902.

The dock may further include a controller 950. In some embodiments, the controller 950 is adapted to selectively couple the first wireless communication interface 926, the second wireless communication interface 930, the third wireless communication interface 934, and/or the fourth wireless interface 938 to one or more others of the first wireless communication interface 926, the second wireless communication interface 930, the third wireless communication interface 934, and the fourth wireless interface 938.

Thus, in some embodiments, the dock may facilitate communication between at least one of the first device 906, the second device 910, the third device 914 and the fourth device 918 and at least one other of the first device 906, the second device 910, the third device 914 and the fourth device 918.

The dock may further include a first port 952 and a second port 954. In some embodiments, the first port 952 is connected to a personal computer and/or another device. In some embodiments, the second port 954 is connected to a wired public telephone network.

In some embodiments, the dock 900 may facilitate communication between at least one of the first device 906, the second device 910, the third device 914 and the fourth device 918 and at least one other device via port 952 and/or 954. In some embodiments, the dock may facilitate transfer of data between at least one of the first device 906, the second device 910, the third device 914 and the fourth device 918 and a personal computer. In some embodiments, the personal computer is coupled to the Internet.

As stated above, in some embodiments, the proximity payment device 102, the communication device 106 and/or the authorization device 108 may transmit and/or receive signals that include data not related to resetting a security parameter in the proximity payment device. In some embodiments, such signals may be transmitted and/or received to and/or from one another and/or one or more other devices.

In some embodiments, the dock 900 may include information that defines the data to be transmitted and/or received and/or a schedule for transmitting and/or receiving such data. The dock 900 may also include information that defines one or more sources and/or destinations for such data. In some embodiments, one or more portions of such information may be supplied by and/or based at least in part on data supplied by the account holder.

The dock 900 may further comprise a polling antenna 960. The polling antenna 960 may be used in detecting whether any devices with wireless communication interfaces are within range of any of the wireless communication interfaces of the dock 900. In some embodiments, the polling antenna comprises an antenna to receives signals from the wireless communication interface of the first device, the wireless communication interface of the second device, the wireless communication interface of the third device and/or the wireless communication interface of the fourth device.

The dock may further include a power source 990. The power source 990 may be coupled (directly and/or indirectly) and/or supply power (directly and/or indirectly) to the circuits and/or components of the dock 900. In some embodiments, the power source 990 comprises a battery. In some embodiments, a power source may comprise a power supply that receives power from an AC outlet.

In some embodiments, the dock 900 may include criteria for selecting a communication interface via which to transmit and/or receive signals.

In some embodiments, the criteria may include selecting a communication interface of the dock based at least in part on speed, reliability and/or security of a communication link that may be connected to the communication interface. In that regard, in some embodiments, the criteria may include selecting a communication interface of the dock via which communication with a desired device may be fastest, most reliable and/or most secure.

In some embodiments, the criteria may include selecting a communication interface of the dock that is connected to the Internet and/or via which communication with a desired device may include communication via the Internet.

In some embodiments, the criteria may include selecting a communication interface of the dock that communicates with a wireless communication interface of a cell phone, in the event that a connection (direct or indirect) to the Internet is not available.

In some embodiments, the criteria may include selecting a communication interface of the dock that communicates with a wired public telephone network, in the event that a connection (direct or indirect) to the Internet and a connection (direct or indirect) to a cell phone are not available.

In some embodiments, the dock 900 further includes a key pad 980. The key pad 980 may or may not be supported by the body 902 of the dock 900.

FIG. 10 is a schematic block diagram of a system 100, in accordance with some embodiments. Referring to FIG. 10, in accordance with some embodiments, the system 100 includes a proximity payment device 102 issued to an account holder 104, a communication device 106 that comprises a dock 900 issued to the account holder, a personal computer and an authorization device 108.

In accordance with some embodiments, the dock 900 couples the proximity payment device 102 to the personal computer. The personal computer is coupled to authorization device 108 by the Internet. In some embodiments, the authorization device comprise an issuer website.

In some embodiments, the system 100 may be used to reset an EMV risk parameter and/or other security parameter(s) stored in the proximity payment device 102 issued to an account holder.

In some embodiments, the system 100 may be used to communicate other information.

Figure 11:
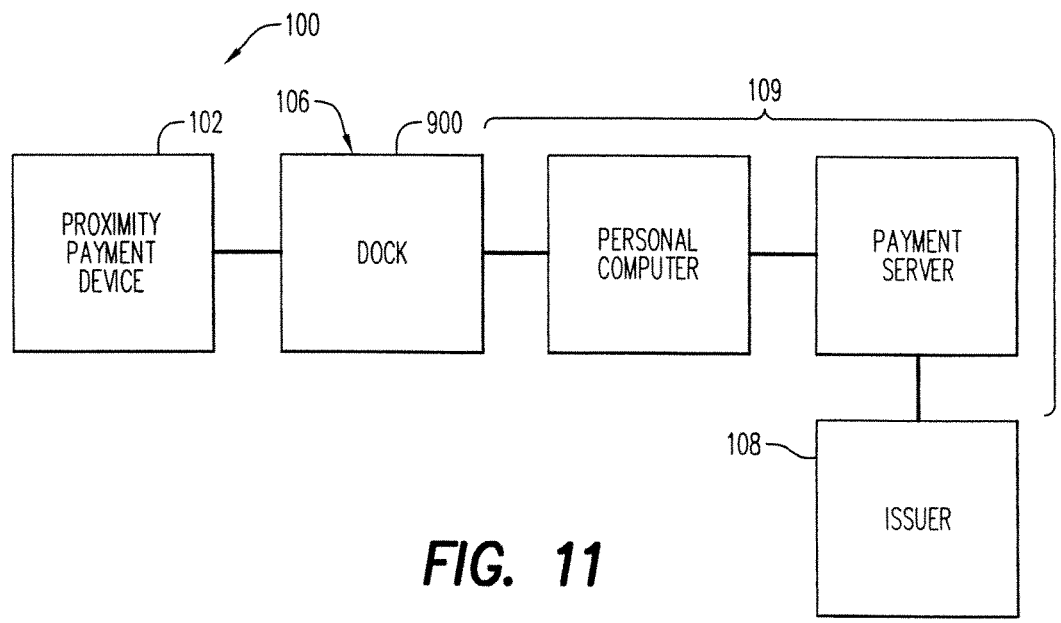
FIG. 11 is a schematic block diagram of a system, according to some embodiments.

FIG. 11 is a schematic block diagram of a system 100, in accordance with some embodiments. Referring to FIG. 11, in accordance with some embodiments, the system 100 includes a proximity payment device 102 issued to an account holder 104, a communication device 106 that comprises a dock 900 issued to the account holder, a personal computer a payment server and an authorization device 108.

In accordance with some embodiments, the dock 900 couples the proximity payment device 102 to the personal computer. The personal computer is coupled to payment server by the Internet. The payment server is coupled to the authorization device 108 by a Banknet. In some embodiments, the authorization device comprises an issuer device.

In some embodiments, the system 100 may be used to reset an EMV risk parameter and/or other security parameter(s) stored in the proximity payment device 102 issued to an account holder.

In some embodiments, the system 100 may be used to communicate other information.

Figure 12:
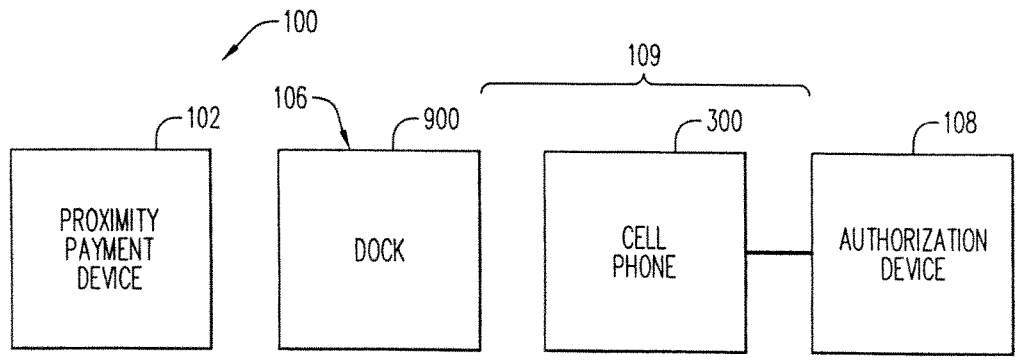
FIG. 12 is a schematic block diagram of a system, according to some embodiments.

FIG. 12 is a schematic block diagram of a system 100, in accordance with some embodiments. Referring to FIG. 12, in accordance with some embodiments, the system 100 includes a proximity payment device 102 issued to an account holder 104, a communication device 106 that comprises a dock 900 issued to the account holder, a cell phone 300 issued to an account holder and an authorization device 108.

In accordance with some embodiments, the dock 900 couples the proximity payment device 102 to the cell phone 300. The cell phone 300 couples is coupled to the authorization device via the cellular network.

In some embodiments, the system 100 may be used to reset an EMV risk parameter and/or other security parameter(s) stored in the proximity payment device 102 issued to an account holder.

In some embodiments, the system 100 may be used to communicate other information.

Figure 13A:
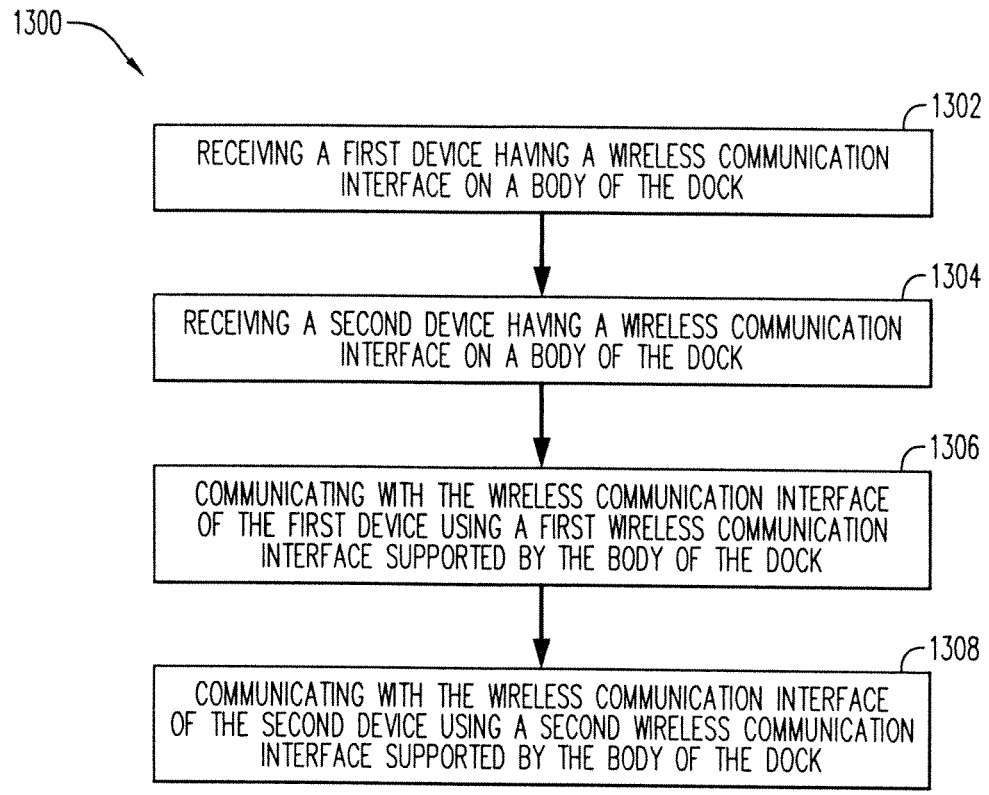
FIG. 13A a flow chart that illustrates a method, according to some embodiments.

FIG. 13A is a flow chart 1300 of a method according to some embodiments. In some embodiments, one or more portions of the method may be used in association with the proximity payment device 102 and dock 900. The method is not limited to the order shown in the flow chart. Rather, embodiments of the method may be performed in any order that is practicable. For that matter, unless stated otherwise, any method disclosed herein may be performed in any order that is practicable. Notably, some embodiments may employ one or more portions of the method without one or more other portions of the method.

At 1302, the method may include receiving a first device having a wireless communication interface on a body of a dock.

At 1304, the method may further include receiving a second device having a wireless communication interface on the body of the dock.

At 1306, the method may further include communicating with the wireless communication interface of the first device using a first wireless communication interface supported by the body of the dock.

At 1308, the method may further include communicating with the wireless communication interface of the second device using a second wireless communication interface supported by the body of the dock.

Figure 13B:
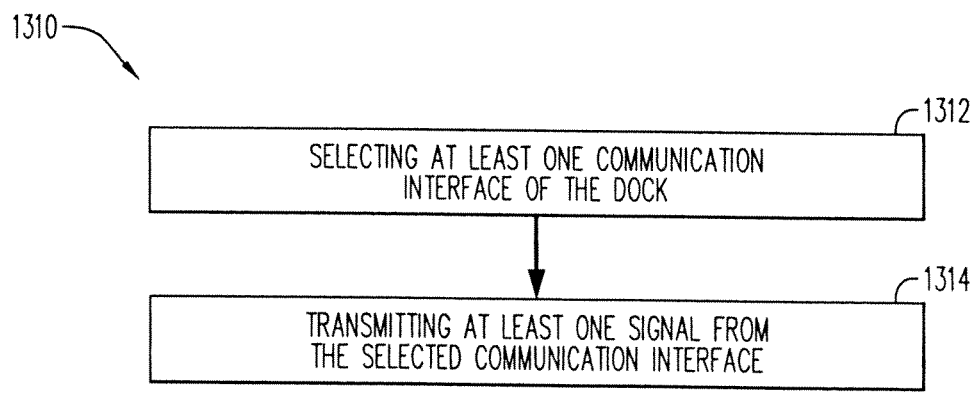
FIG. 13B a flow chart that illustrates a method, according to some embodiments.

FIG. 13B is a flow chart 1310 of a method according to some embodiments. In some embodiments, one or more portions of the method may be used in association with the proximity payment device 102 and dock 900. The method is not limited to the order shown in the flow chart. Rather, embodiments of the method may be performed in any order that is practicable. For that matter, unless stated otherwise, any method disclosed herein may be performed in any order that is practicable. Notably, some embodiments may employ one or more portions of the method without one or more other portions of the method.

At 1312, the method may include selecting at least one communication interface of the dock. In some embodiments, this may include identifying at least one communication interface of the dock that is capable of transmitting to a device and selecting a communication interface of the at least one communication interface that is capable of transmitting at least one signal to the device. In some embodiments, the device may comprise an authorization device or other any other desired device.

In some embodiments, the method may include selecting at least one of a wired communication interface of the dock and a wireless communication interface of the dock.

In some embodiments, this may include polling to detect a wireless communication interface within range of the dock and/or selecting a wireless communication interface of the dock capable of communicating with the wireless communication interface within range of the dock. In some embodiments, this may include polling to detect all wireless communication interfaces within range of the dock and identifying all wireless communication interfaces of the dock capable of communicating with the wireless communication interfaces within range of the dock. The method may further include selecting a wireless communication interface from the wireless communication interfaces of the dock capable of communicating with the wireless communication interfaces within range of the dock.

At 1314, the method may further include transmitting at least one signal from the selected communication interface of the dock.

In some embodiments, the dock 900 and/or other embodiments of the communication device 106 may transmit at least one signal that may be received by the antenna 206 (FIG. 2) of the proximity payment device 102 and used to charge a battery and/or the power source 116. For example, the proximity payment device 102 may include circuitry to rectify the received signal to generate DC power that may be used to charge the battery and/or other power source 116. In some embodiments, the at least one signal may be transmitted via the antenna 406 (FIG. 4) and may be similar to an interrogation signal of the above-mentioned "PayPass" standard.

In some embodiments, the dock 900 and/or other embodiments of the communication device 106 may transmit at least one signal that may be received by devices that are not proximity payment device and may be used to charge a battery and/or the power source 116 in such devices.

The dock 900 may have any configuration.

Figure 14A:
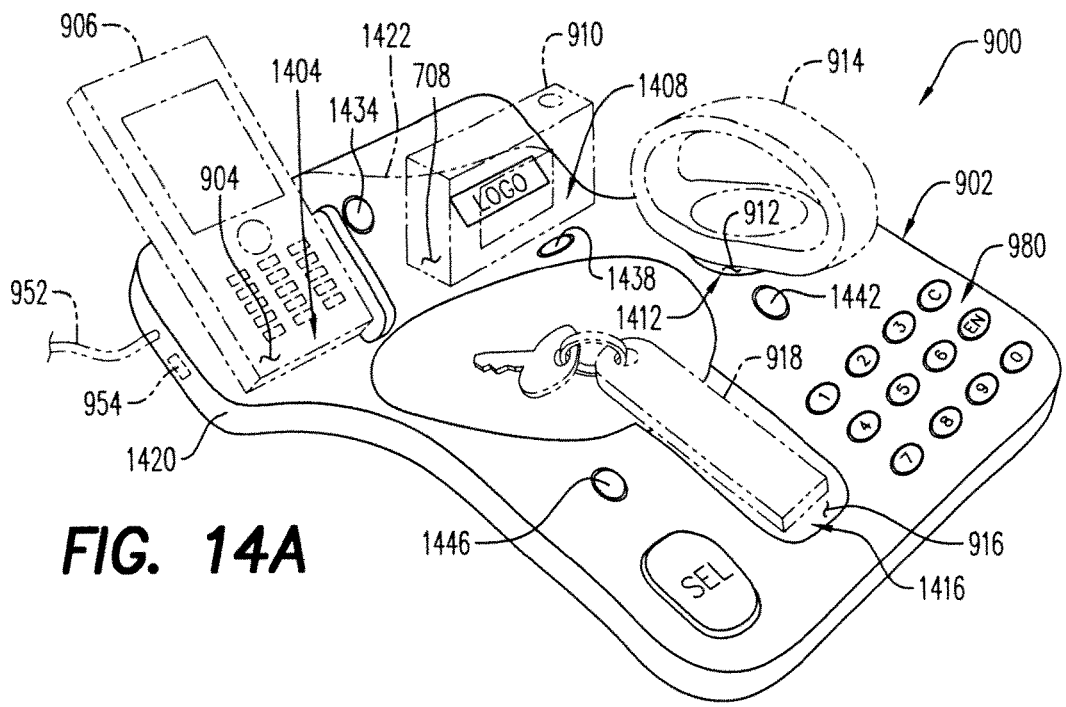
FIG. 14A is a perspective view of a communication device and a plurality of devices thereon, according to some embodiments.
Figure 14B:
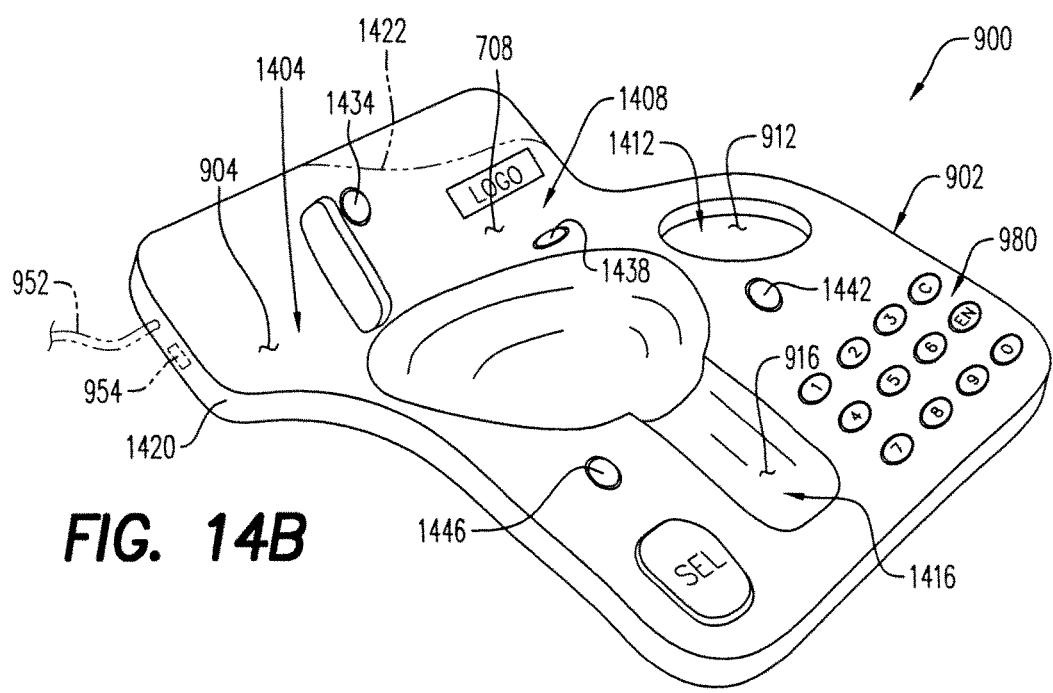
FIG. 14B is a perspective view of a communication device, according to some embodiments.

FIGS. 14A-14B are perspective views of the dock 900 with and without devices thereon, in accordance with some embodiments. Referring to FIGS. 14A-14B, in accordance with some embodiments, the body 902 of the dock may comprise a rigid material. The first seat 904 may be defined by a first recess 1404 shaped to receive the first device 906, the second seat 908 may be defined by a second recess 1408 shaped to receive the second device 910, the third seat 912 may be defined by a third recess 1412 shaped to receive the third device 914, the fourth seat 916 may be defined by a fourth recess 1416 shaped to receive the fourth device 918.

In some embodiments, the first device 906 may comprise a cell phone, the second device 910 may comprise a digital camera, the third device 914 may comprise a wristwatch and the fourth device 918 may comprise a key fob, a key ring and keys. However, other embodiments may also be employed.

In some embodiments, at least one of the first, second, third and fourth recesses 1404, 1408, 1412, 1416 may be shaped so as to help position a respective one of the first, second, third and fourth devices 906, 910, 914, 918 in a way that helps to maximize the strength of the wireless communication between the wireless communication interface in the device and the respective wireless communication interface of the dock 900.

In some embodiments, the antenna for the wireless communication interface of the first device may be disposed adjacent to a lower rear portion the first device. The antenna for the wireless interface of the second device may be disposed adjacent to a bottom of the second device. The antenna for the wireless interface of the third device may be disposed adjacent to a crystal and/or face of the third device. The antenna for the wireless communication of the fourth device may be disposed in the key fob.

Thus, in some embodiments, the recess 1404 to receive the first device 906 may be shaped to receive the lower rear portion of the first device 906 and to position the lower rear portion of the first device 906 flush against the portion of the body 902 that supports the respective wireless communication interface 926 of the dock 900. The recess 1408 to receive the second device may be shaped to receive the bottom portion of the second device 910 and to position the bottom portion of the second device 910 flush against the portion of the body 902 that supports the respective wireless communication interface 930 of the dock 900. The recess 1412 to receive the third device 914 may be shaped to receive the crystal and/or face of the third device 914 and to position the crystal and/or face of the third device 914 flush against the portion of the body 902 that supports the respective wireless communication interface 934 of the dock 900. The recess 1416 to receive the fourth device 918 may position the key fob of the fourth device 918 flush against the portion of the body 902 that supports the respective wireless communication interface 938 of the dock 900. Thus, recess to receive the fourth device 918 may include a first portion and a second portion. The first portion may have an elongated shape to receive an elongated portion of the key fob. The second portion may have a circular and/or spherical shape to receive the key ring and the keys so as not to interfere with positioning of the key fob.

In some embodiments, at least one of the first, second, third and fourth recesses 1404, 1408, 1412, 1416 is further shaped so as to help position a respective one of the first, second, third and fourth devices 906, 910, 914, 918 in a way that helps to provide convenient access to an account holder using the dock 900.

In that regard, in some embodiments, the body 902 may include an angled portion 1420 that defines at least a portion of the first recess 1404. One or more portions of the angled portion may be tapered 1422.

In some embodiments, the body 902 defines an enclosure to enclose, or at least substantially enclose, some or all components of the dock 900. In some other embodiments, the body 902 does not define an enclosure to enclose, or at least substantially enclose, some or all components of the dock 900. For example, the underside of the dock 900 may be open and/or open at least in part.

Figure 15:
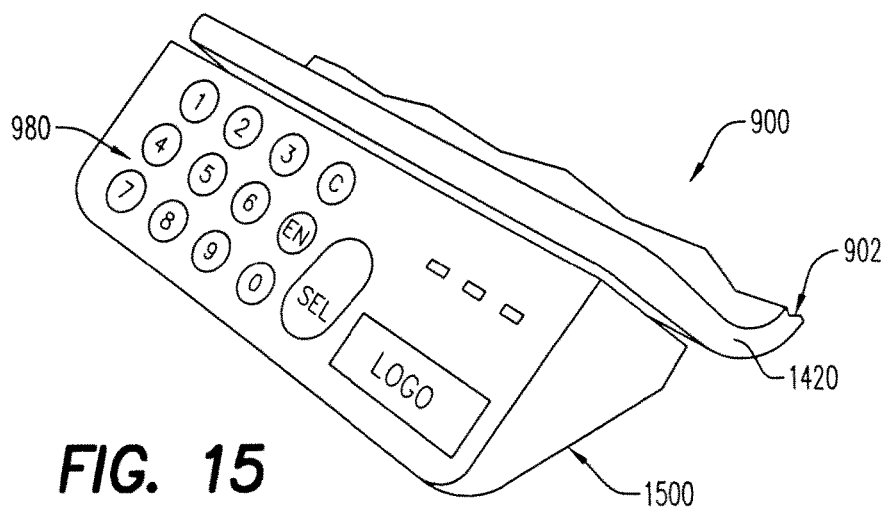
FIG. 15 is a perspective view of a portion of a communication device, according to some embodiments.

The dock 900 may further include a user interface. In some embodiments, such user interface includes the keypad 980. In some embodiments, the keypad is supported by the body 902 of the dock 900. In some other embodiments, the keypad is supported by a body 1500 (FIG. 15) separate from the body 902 of the dock 900.

The keypad 980 may define a plurality of keys. If the keypad 980 is supported by the body 902 of the dock 900, the body 902 may define one or more openings to receive the plurality of keys.

In some embodiments, the user interface includes a plurality of other devices. In some embodiments, such plurality of other devices may include a first input/output device 1434, a second input/output device 1438, a third input output device 1442 and a fourth input/output device 1446. Each input/output device may be associated with a respective one of the first, second, third and fourth devices 906, 910, 914, 918 and may comprise a push button and/or an indicator. If the input/output device includes a push button, the button may be depressable to indicate a desire to select the associated device. If the input/output device includes an indicator, the indicator may indicate that the associated device has been selected and/or that the associated device is in use.

Figure 16A:
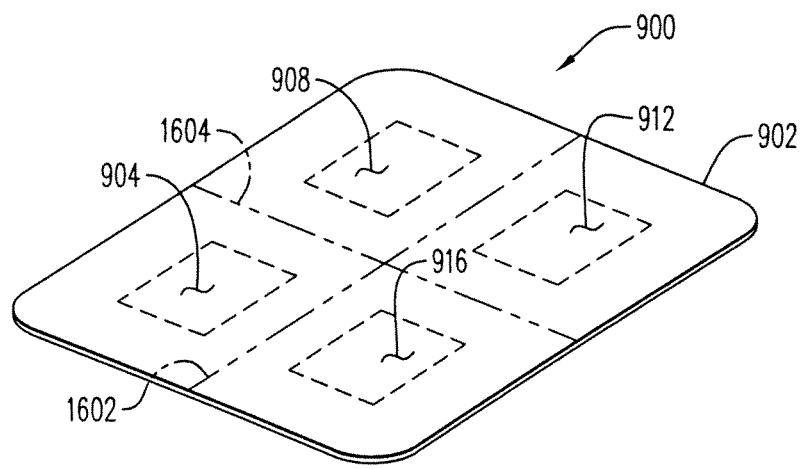
FIG. 16A is a perspective view of a communication device in a first state, according to some embodiments, in a first state.

FIG. 16A is a perspective view of the dock 900 in a first state, in accordance with some embodiments. Referring to FIG. 16A, in accordance with some embodiments, the body 902 of the dock may comprise a flexible material. In some embodiments, the body of the dock comprises a flexible pad. In some embodiments, the body 902 comprises a foldable material. Such a design may facilitate storage and/or transportation of the dock 900.

If desired, the body 902 may then be unfolded so as to allow the first, second, third and/or fourth devices 906, 910, 914, 918 to be positioned on a respective one of the first, second, third and fourth seats 904, 908, 912, 916.

Figure 16B:
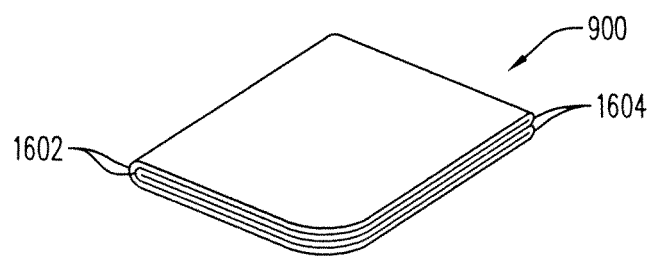
FIG. 16B is a perspective view of the communication device of FIG. 16A in a second state, according to some embodiments.

FIG. 16B is a perspective view of the dock 900 of FIG. 16A in a folded state, in accordance with some embodiments. Referring to FIG. 16B, according to some embodiments, the body 902 of the dock 900 may be foldable along one or more fold lines, e.g., 1602, 1604.

In some embodiments, at least one indicia is provided on the dock 900 and/or other communication device 106 to indicate the position of at least one antenna 406 (FIG. 4) of at least one wireless interface 405 (FIG. 4) of the dock 900 and/or other communication device 106. In some embodiments, each of the at least one indicia is associated with a respective wireless interface of the dock 900 and/or other communication device 106. In some embodiments, each of the at least one indicia comprises indicia that is the same as and/or similar to indicia used in the above-mentioned "PayPass" standard. In some embodiments, each of the at least one indicia comprises a line (solid or broken) that indicates the location of the antenna 406 (FIG. 4) of the associated wireless interface 405 (FIG. 4). In some embodiments, in addition or in lieu thereof, each of the at least one indicia comprises text with instructions such as for example, "PLACE DEVICE HERE".

In some embodiments, indicia is provided on the proximity payment device 102 and/or one or more of devices 906, 910, 914, 918 to indicate the position of an antenna 206 (FIG. 2) of a wireless interface 205 (FIG. 2) of the proximity payment device 102 and/or one or more of devices 906, 910, 914, 918. In some embodiments, the indicia comprises indicia that is the same as and/or similar to indicia used in the above-mentioned "PayPass" standard. In some embodiments, the indicia comprises a line (solid or broken) that indicates the location of the antenna 206 (FIG. 2) of the wireless interface 205 (FIG. 2). In some embodiments, in addition or in lieu thereof, the indicia comprises text with instructions such as for example, "PLACE READER HERE".

Figure 17:
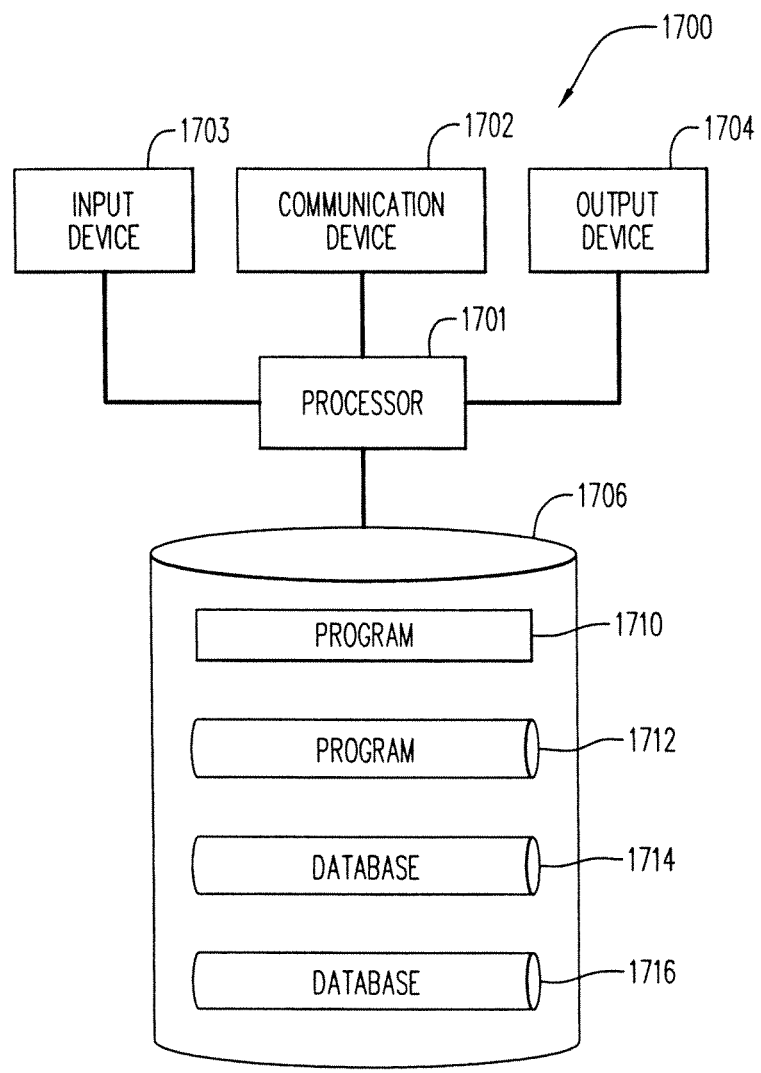
FIG. 17 is a schematic block diagram of an apparatus, according to some embodiments.

FIG. 17 is a block diagram of an apparatus 1700 according to some embodiments. In some embodiments, one or more of the devices (or portion(s) thereof) disclosed herein may have an architecture that is the same as and/or similar to one or more portions of the architecture of apparatus 1700.

Referring to FIG. 17, in accordance with some embodiments, the apparatus 1700 includes a processor 1701 operatively coupled to a communication device 1702, an input device 1703, an output device 1704 and a storage device 1706.

In some embodiments, the processor 1701 may execute processor-executable program code to provide one or more portions of the one or more functions disclosed herein and/or to carry out one or more portions of one or more embodiments of one or more methods disclosed herein. In some embodiments, the processor 1701 may be a conventional microprocessor or microprocessors.

The communication device 1702 may be used to facilitate communication with other devices and/or systems. In some embodiments, communication device 1702 may be configured with hardware suitable to physically interface with one or more external devices and/or network connections. For example, communication device 1702 may comprise an Ethernet connection to a local area network through which apparatus 1700 may receive and transmit information over the Internet and/or one or more other network(s).

The input device 1703 may comprise, for example, one or more devices used to input data and/or other information, such as, for example: a keyboard, a keypad, track ball, touchpad, a mouse or other pointing device, a microphone, knob or a switch, an infra-red (IR) port, etc. The output device 1704 may comprise, for example, one or more devices used to output data and/or other information, such as, for example: an IR port, a dock, a display, a speaker, and/or a printer, etc.

The storage device 1706 may comprise, for example, one or more storage devices, such as, for example, magnetic storage devices (e.g., magnetic tape and hard disk drives), optical storage devices, and/or semiconductor memory devices such as Random Access Memory (RAM) devices and Read Only Memory (ROM) devices.

The storage device 1706 may store one or more programs 1710-1712, which may include one or more instructions to be executed by the processor 1701.

In some embodiments, the one or more programs may include one or more operating systems, database management systems, other applications, other information files, etc., for operation of the apparatus 1700.

The storage device 1706 may store one or more databases 1714-1716 and/or criteria for one or more programs. As used herein a "database" may refer to one or more related or unrelated databases. Data and/or other information may be stored in any form. In some embodiments, data and/or other information may be stored in raw, excerpted, summarized and/or analyzed form.

In some embodiments, one or more portions of one or more embodiments disclosed herein may be embodied in a method, an apparatus, a computer program product, and/or a storage medium readable by a processing system.

As used herein, a signal may be any type of signal, i.e., a physical quantity (e.g., voltage, current, or magnetic field strength), an indication, a message and/or any other type of signal or combination thereof. A voltage, current, or magnetic field strength may be analog, digital, single ended signal, differential and/or any other type or combination thereof.

A wireless communication interface may be any type of wireless communication interface.

As used herein, a controller may be any type of controller. For example, a controller may be programmable or non programmable, general purpose or special purpose, dedicated or non dedicated, distributed or non distributed, shared or not shared, and/or any combination thereof. If the controller has two or more distributed portions, the two or more portions may communicate with one another through a communication link. A controller may include, for example, but is not limited to, hardware, software, firmware, hardwired circuits and/or any combination thereof.

A circuit may be programmable or non programmable, general purpose or special purpose, dedicated or non dedicated, distributed or non distributed, shared or not shared, and/or any combination thereof. If the circuit has two or more distributed portions, the two or more portions may communicate with one another through a communication link. A circuit may include, for example, but is not limited to, hardware, software, firmware, hardwired circuits and/or any combination thereof.

As used herein, the term "proximity payment device" refers to any device, of any shape, which transmits to a point of sale terminal, by wireless transmission, a payment account number. As used herein, a payment account number may be numeric, non numeric and/or a combination thereof.

In some embodiments, a proximity payment device may also have a contact interface like that of a conventional smart card that includes a contact interface.

In some embodiments, one or more logos and/or brands, including for example the brand/logo of a national and/or international payment card association such as MasterCard International Incorporated, may be provided on one or more surfaces of a proximity payment device. The brand/logo of the issuer may also be provided, as well as, for example, a specific card product brand. Embossed or non-embossed numbers and/or letters may be provided on the proximity payment device to indicate one or more account numbers and/or a name of an account holder. Other features that may be provided on the proximity payment device are an adhesive paper strip to receive the signature of the cardholder, and a security code or the like printed on the adhesive strip. In addition, the proximity payment device may have one or more magnetic stripes to allow the proximity payment device to be read by a magnetic card reader.

Some of the principles taught herein have been described in the context of an EMV risk parameter and/or resetting an EMV risk parameter. However, these teachings are also applicable to any type of security parameter and/or resetting any type of security parameter.

In addition, some of the principles taught herein have heretofore been described in the context of proximity payment devices. Nevertheless, these teachings are also applicable to any type of identification token. As used herein, the term "identification token" refers to a device, having a card shape or any other shape, that serves as one or more of a proximity payment device; a transportation related device; an identification device to identify the holder for purposes apart from or in addition to transaction payments (e.g., to identify medical patients and/or individuals insured by health insurance plans); a device used to portably store medical record information; stored value card(s); and to so-called electronic passports (also known as RFID-enabled passports) and/or a source of any type of information associated with a holder of the identification token (and/or the holder of the card installed therein).

The term "transportation related device" refers to a card or other device used to pay, or confirm or evidence payment of, a charge for using a transportation system and/or cards or the like issued by transportation systems (e.g., mass transit systems) for access to the transportation systems. The term "RFID-enabled passport" refers to an internationally recognized travel document that includes an IC and an antenna and communicates with a terminal by a wireless communication technique. The term "information" may include but is not limited to a name, a social security number, an account number, an expiration date, a security code and/or medical information.

Thus, unless stated otherwise, "an account holder" may include, but is not limited to, any person and/or entity having access to an identification token and/or any accounts associated therewith.

As used herein, an account number may be numeric, non numeric and/or a combination thereof.

Unless otherwise stated, terms such as, for example, "in response to" and "based on" mean "in response at least to" and "based at least on", respectively, so as not to preclude being responsive to and/or based on, more than one thing.

In addition, unless stated otherwise, terms such as, for example, "comprises", "has", "includes", and all forms thereof, are considered open-ended, so as not to preclude additional elements and/or features. In addition, unless stated otherwise, terms such as, for example, "a", "one", "first", are considered open-ended, and do not mean "only a", "only one" and "only a first", respectively. Moreover, unless stated otherwise, the term "first" does not, by itself, require that there also be a "second".

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

The following text is incorporated from U.S. patent application Ser. No. 12/344,863 (except that the figure numbers have been incremented by 17, i.e., FIGS. 1-3, 4A-4C, 5-10, 11A-11D, 12-13, 14A-14D and 15 have been renumbered as FIGS. 18-20, 21A-21C, 22-27, 28A-28D, 29-30, 31A-31D and 32, respectively, and reference numbers have been incremented by 2000, i.e., reference numbers 100, 102, 104, and so on, have been have been renumbered as 2100, 2102, 2104, and so on, respectively). Definitions in such text apply to terms in such text and claims that have the filing date of such application.

Some proximity payment devices are not supported by a card shaped body and thus may not be insertable into a card reader adapted to receive a card shaped body. It may be advantageous to be able to reset an EMV risk parameter and/or other security parameter(s) stored in such proximity payment devices without a need to hold the proximity payment device within range of the POS system for the entire amount of time needed to reset the EMV security parameter. (A reset of the EMV risk parameter may be carried out via the wireless interface of the proximity payment device if the proximity payment device is held within range of the POS system for the amount of time needed for the reset.) This amount of time is sometimes twenty to thirty seconds and/or may be considerably longer than the amount of time needed for a payment transaction itself.

Some embodiments address one or more of the above concerns in whole or in part.

Figure 18:
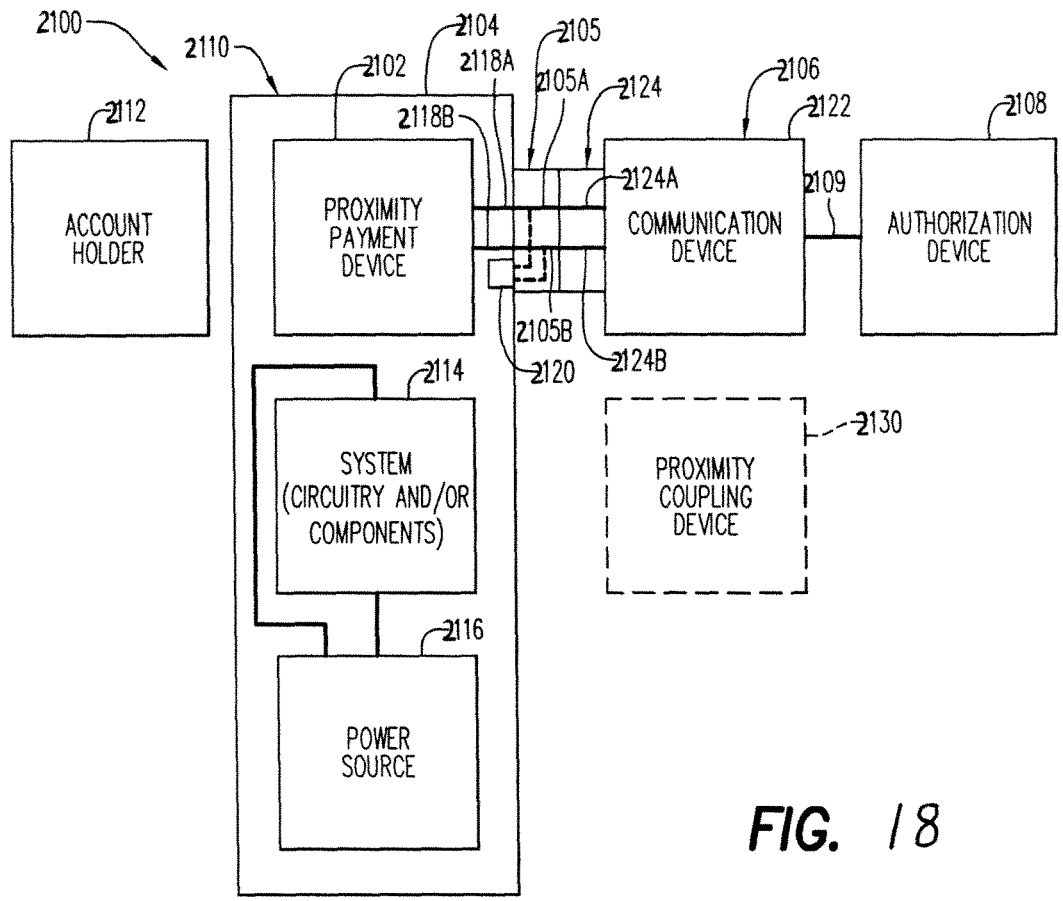
FIG. 18 is a schematic block diagram of a system, according to some embodiments.

FIG. 18 is a schematic block diagram of a system 2100 to reset an EMV risk parameter and/or other security parameter(s) stored in a proximity payment device, in accordance with some embodiments. Referring to FIG. 18, in accordance with some embodiments, the system 2100 includes a proximity payment device 2102, a communication device 2106, an authorization device 2108 and a communication link 2109.

The proximity payment device 2102 may be supported by a body 2104. Unless stated otherwise, the term "supported by" means supported by directly and/or indirectly. In some embodiments, "supported by" includes partially, and/or entirely, disposed on, disposed in, mounted on, mounted in, installed on, installed in, contained in and/or embedded in. In some embodiments, the body 2104 encloses the proximity payment device 2102.

The proximity payment device 2102 and body 2104 may comprise any type of proximity payment device and body, respectively. In some embodiments, body 2104 has a card shape. In some other embodiments, body 2104 does not have a card shape. In some embodiments, the body 2104 comprises a body of a key fob, a wristwatch, a music player, a video player, a PDA, a USB flash drive (or other type of mass storage device) and/or any other portable device, represented by device 2110. In such embodiments, the device 2110 may further comprise a system 2114 to perform one or more functions of the device 2110. If the device 2110 comprises a wristwatch, the system 2114 may comprise circuitry and/or components to perform one or more functions of the wristwatch. If the device 2110 comprises a music player, the system 2114 may comprise circuitry and/or components to play music. If the device 2110 comprises a video player, the system 2114 may comprise circuitry and/or components to play video (with or without associated audio). If the device 2110 comprises a PDA, the system 2114 may comprise circuitry and/or components to perform one or more functions of the PDA. If the device 2110 comprises a thumb drive (or other storage device), the system 2114 may comprise circuitry and/or components to perform one or more functions of the thumb drive (or other storage device). Although the system 2114 is shown separate from the proximity payment device 2102, the proximity payment device 2102 and the system 2114 may share one or more circuits and/or components. The device 2110 may further include a power source 2116. The power source 2116 may be coupled (directly and/or indirectly) and/or supply power (directly and/or indirectly) to the proximity payment device 2102 and/or the system 2114. In some embodiments, the power source 2116 comprises a battery.

In some embodiments, the proximity payment device 2102, the body 2104 and/or the device 2110 are issued to an account holder 2112. Unless stated otherwise, the term "issued to" may include, but is not limited to, given to, loaned to, rented to, sold to, and/or transferred to. In some embodiments, issuing the proximity payment device 2102, the body 2104 and/or the device 2110 to the account holder 2112 comprises handing, sending, and/or otherwise providing the proximity payment device 2102, the body 2104 and/or the device 2110, respectively, to the account holder 2112. In some embodiments, sending comprises mailing. In some embodiments, if more than one of the proximity payment device 2102, the body 2104 and the device 2110 are issued to an account holder 2112, they need not be issued in the same manner as one another.

An electrical connector 2105 may be attached to the body 2104. Unless stated otherwise, the term "attached" means attached in any way, e.g., fixedly attached or removably attached, directly attached or indirectly attached, and combinations thereof.

The electrical connector 2105 may comprise any type of electrical connector. In some embodiments, electrical connector 2105 comprises a universal serial bus (USB) connector. In some embodiments, the electrical connector 2105 comprises connector mounted to the body 2104. In some embodiments, the electrical connector 105 comprises a USB connector mounted to the body 2104.

In some embodiments, the electrical connector 2105 includes one or more electrical conductors, represented by electrical conductors 2105A-2105B. The electrical conductors 2105A-2105B may each have a first end and a second end. In some embodiments, one or more electrical conductors, represented by electrical conductors 2118A-2118B, couple the first end of one or more of the electrical conductors 2105A-2105B, to the proximity payment device 2102. In some other embodiments, circuitry and/or other components 2120 to perform near field communication couple the first end of one or more of the electrical conductors 2105A-2105B to the proximity payment device 2102. Such circuitry and/or other components 2120 may comprise an NFC IC provided by PHILIPS ELECTRONICS or NXP Semiconductors. The second end of one or more of the electrical conductors 2105A-2105B may be electrically connected to the communication device 2106. Unless stated otherwise, the term "electrically connected" means directly electrically connected or indirectly electrically connected.

The communication device 2106 may comprise any type of communication device. In some embodiments, communication device 2106 comprises a communication device issued to account holder 2112. In some embodiments, communication device 2106 comprises a personal computer.

In some embodiments, the communication device 2106 includes a body 2122 and an electrical connector 2124. The electrical connector 2124 may be attached to the body 2122 and may be adapted to be mated with the electrical connector 2105. In that regard, the electrical connector 2124 may include one or more electrical conductors, represented by electrical conductors 2124A-2124B, to make contact with one or more of the electrical conductors 2105A-2105B, respectively, of the electrical connector 2105. In some embodiments, electrical connector comprises a USB connector. Unless stated otherwise, the term "mated" means electrically connected and in physical contact.

The authorization device 2108 may comprise any type of authorization device capable of providing an authorization to reset the EMV risk parameter and/or other security parameter(s) stored in the proximity payment device 2102. In some embodiments the authorization device comprises a device operated by and/or on behalf of an issuer of the proximity payment device 2102. In some embodiments, the authorization device 2108 comprises a website. In some embodiments, the authorization device 2108 comprises a website operated by and/or on behalf of an issuer of the proximity payment device 2102.

The communication link 2109, which couples the communication device 2106 and the authorization device 2108, may comprise any type of communication link, for example, but not limited to wired (e.g., conductors, fiber optic cables) or wireless (e.g., acoustic links, electromagnetic links or any combination thereof including, for example, but not limited to microwave links, satellite links, infrared links), and/or any combinations thereof. A communication link may be public or private, dedicated and/or shared (e.g., a network) and/or any combination thereof. Thus, a communication link may or may not be a permanent communication link. A communication link may support any type of information in any form, for example, but not limited to, analog and/or digital (e.g., a sequence of binary values, i.e. a bit string) signal(s) in serial and/or in parallel form. The information may or may not be divided into blocks. If divided into blocks, the amount of information in a block may be predetermined or determined dynamically, and/or may be fixed (e.g., uniform) or variable. A communication link may employ a protocol or combination of protocols including, for example, but not limited to the Internet Protocol. In some embodiments, the communication link 2109 comprises a telephone line and/or a computer network.

As further described below, in some embodiments, the proximity payment device 2102 includes an EMV risk parameter and/or other security parameter(s) and communicates with the communication device 2106 via the electrical connector 2105. The communication device 2106 may communicate with the authorization device 2108, before, after, and/or while communicating with the proximity payment device 2102, to obtain authorization to reset the security parameter in the proximity payment device 2102. The communication device 2106 may thereafter transmit at least one signal to the proximity payment device 2102 to indicate authorization to reset the security parameter. The proximity payment device 2102 may receive the at least one signal transmitted by the communication device 2106 and may reset the security parameter in response, at least in part, thereto.

Unless stated otherwise, communication may be direct and/or indirect, one way and/or two way. Thus, the phrase "the proximity payment device 2102 communicates with the communication device 2106 via the electrical connector 2105" means that, in some embodiments, the proximity payment device 2102 transmits at least one signal to the communication device 2106 via a communication link that includes the electrical connector 2105 and/or receives at least one signal from the communication device 2106 via a communication link that includes the electrical connector 2105. In view thereof, the at least one signal from the communication device 2106 may comprise a signal directly from (e.g., actually transmitted by) the communication device 2106 and/or a signal indirectly from (e.g., representing the same information as a signal actually transmitted by) the communication device 2106.

A proximity coupling device 2130 is also shown in FIG. 18. Proximity coupling device 2130 may comprise a proximity coupling device of a POS terminal. In some embodiments, the proximity payment device 2102 may be presented to the proximity coupling device 2130 to accomplish payment for a transaction.

Figure 19:
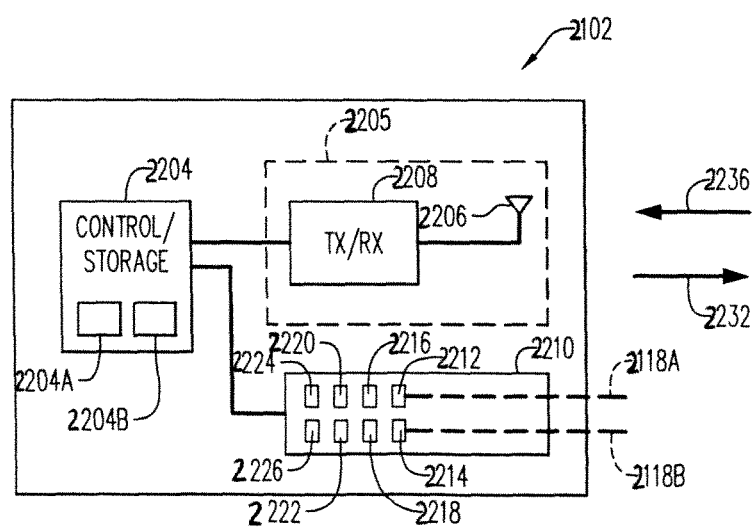
FIG. 19 is a schematic block diagram of a proximity payment device, according to some embodiments.

FIG. 19 is a schematic block diagram of the proximity payment device 2102, according to some embodiments. Referring to FIG. 19, in accordance with some embodiments, the proximity payment device 2102 includes control/storage circuitry 2204 and a wireless communication interface 2205.

As used herein, the control storage circuitry 2204 may comprise any type of control/storage circuitry. For example, control/storage circuitry may be programmable or non programmable, general purpose or special purpose, dedicated or non dedicated, distributed or non distributed, shared or not shared, and/or any combination thereof. Control/storage circuitry may include, but is not limited to, hardware, software, firmware, and/or any combination thereof. Hardware may include, but is not limited to off the shelf integrated circuits, custom integrated circuits and/or any combination thereof. In some embodiments, control/storage circuitry comprises a microcontroller, which may in turn comprise a microprocessor. Software may include, but is not limited to, instructions that are storable and/or stored on a computer readable medium, such as, for example, punch cards, paper tape, magnetic or optical disk, magnetic or optical tape, CD-ROM, DVD, RAM, EPROM, or ROM. Control/storage circuitry may employ continuous signals, periodically sampled signals, and/or any combination thereof. If control/storage circuitry is distributed, two or more portions of the control/storage circuitry may communicate with one another through a communication link.

In some embodiments, the control/storage circuitry 2204 comprises a simple memory device capable only of responding to a pre-defined set of commands. In some other embodiments, the control/storage circuitry 2204 comprises a secure microcontroller capable of executing a pre-defined program.

In some embodiments, the control/storage circuitry 2204 stores information, collectively represented at 2204A, which may include a payment account number, a name of a person (which may be an account holder 2112) and/or other information that may be transmitted to a POS terminal. The control/storage 2204 may also store security information, collectively represented at 2204B, which may include an EMV risk parameter and/or other security parameter(s).

The wireless communication interface 2205 allows the proximity payment device 2102 to transmit and/or receive signals. The signals transmitted by the wireless communication interface 2205 may include a payment account number and/or other information stored in the control/storage circuitry 2204. The signals received by the wireless communication interface may include an interrogation signal, a power signal and/or other signals.

In some embodiments, a signal may comprise an information signal, a power signal and/or a combination thereof. An information signal may represent any type of information, for example but not limited to data, instruction, command, control, timing, synchronization, request, query, interrogation, authorization and/or any other type of information.

In some embodiments, wireless communication interface 2205 comprises an antenna 2206 and transmit/receive circuitry 2208. The antenna 2206 may be configured to transmit and receive radio frequency (RF) signals and may comprise a loop antenna and/or any other suitable configuration. The transmit/receive circuitry 2208 may be coupled between the antenna 2206 and the control/storage circuitry 2204.

In operation, wireless signals (e.g., RF signals) may be received by the antenna 2206 and supplied to the transmit/receive circuitry 2208, which in response may provide signals that are supplied to the control/storage circuitry 2204. The control/storage circuitry 2204 may also provide signals that are supplied to the transmit/receive circuitry 2208, which in response may provide signals that are supplied to the antenna 2206 and transmitted thereby.

In some embodiments, the control/storage circuit 2204 and the transmit/receive circuitry 2208 are disposed in a single integrated circuit. In some embodiments, the control/storage circuitry 2204 and the transmit/receive circuitry 2208 are disposed in an RFID IC. Unless stated otherwise, the term RFID is not limited to a specific type of RFID. In some embodiments, an RFID may be a simple memory device capable only of responding to a pre-defined set of commands. In some other embodiments, an RFID may comprise a microcontroller capable of executing a program. In some embodiments, an RFID IC comprises an IC that uses contactless technology, such as, for example, as specified in international standard ISO/IEC 14443. Some embodiments may include additional features and/or other configurations altogether.

The proximity payment device 2102 may further include a contact interface 2210. The contact interface 2210 may include a plurality of contacts, represented by contacts 2212-2228. In some embodiments, the contact interface 2210 is the same as and/or similar to a contact interface of a conventional smart card having a contact interface.

As stated above, the proximity payment device 2102 may be coupled to the electrical connector 2105 to allow the proximity device 2102 to transmit signals and/or to receive signals via the electrical connector 2105. In that regard, in some embodiments, the one or more conductors 2118A-2118B electrically connect one or more of the contacts 2212-2218 to the first end of one or more of the electrical conductors 2105A-2105B of the electrical connector 2105, to allow the proximity device 2102 to transmit signals and/or to receive signals via the electrical connector 2105. In some other embodiments, the circuitry and/or other components 2120 to perform near field communication couple may couple the wireless communication interface 2205 to the first end of one or more of the electrical conductors 2105A-2105B of the electrical connector 2105, to allow the proximity device 2102 to transmit signals and/or to receive signals via the electrical connector 2105.

Signals transmitted by the proximity payment device 2102 (e.g., via the wireless interface 2205 and/or the contact interface 2210) are represented at 2232. Signals received by the proximity payment device 2102 (e.g., via the wireless interface 2205 and/or the contact interface 2210) are represented at 2236.

Figure 20:
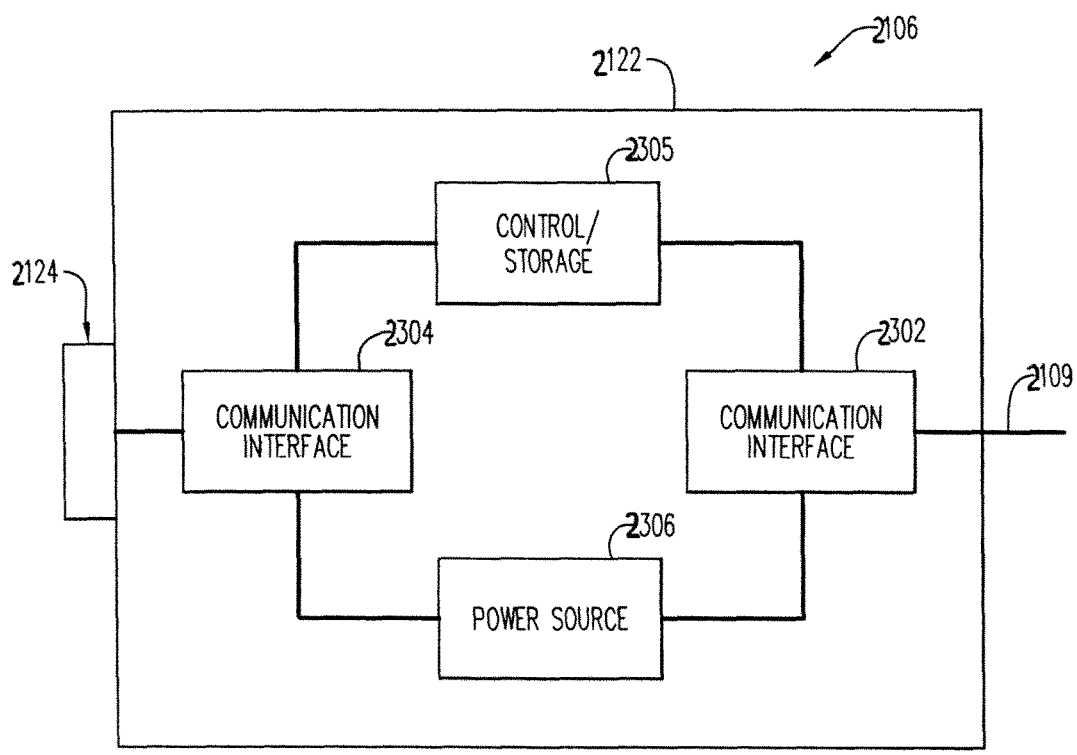
FIG. 20 is a schematic block diagram of a communication device, according to some embodiments.

FIG. 20 is a schematic block diagram of communication device 2106, in accordance with some embodiments. Referring to FIG. 20, in accordance with some embodiments, the communication device 2106 may further include a first communication interface 2302, a second communication interface 2304 and control/storage circuitry 2305. The first communication interface 2302 may be coupled to the electrical connector 2124. The second communication interface 2304 may be coupled to the authorization device 2108 (FIG. 18).

In operation, signals may be received by the communication interfaces 2302, 2304 and supplied to the control/ storage circuitry 2305. The control/storage circuitry 2305 may also provide signals that are supplied to the communication interfaces 2302, 2304.

The communication device 2106 may further include a power source 2306. The power source 2306 may be coupled (directly and/or indirectly) and/or supply power (directly and/or indirectly) to the first communication interface 2302 and/or the second communication interface 2304. In some embodiments, the power source 2306 comprises a battery.

Figure 21A:
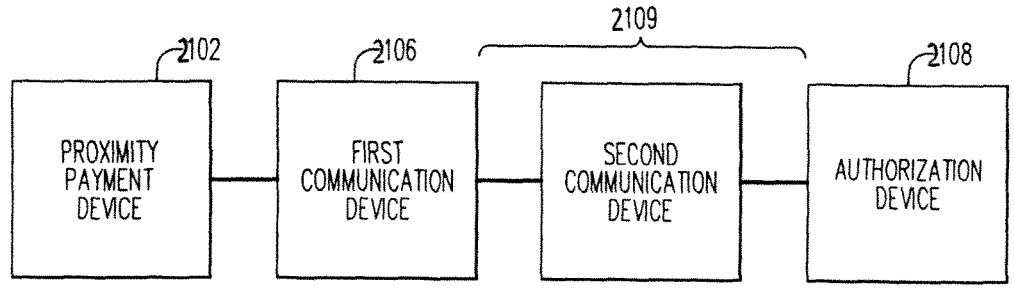
FIG. 21A is a schematic block diagram of a system, according to some embodiments.

FIG. 21A is a schematic block diagram of the system 2100, in accordance with some embodiments. Referring to FIG. 21A, in accordance with some embodiments, the communication device 2106 comprises a first communication device and the communication link 2109 comprises a second communication device.

Figure 21B:
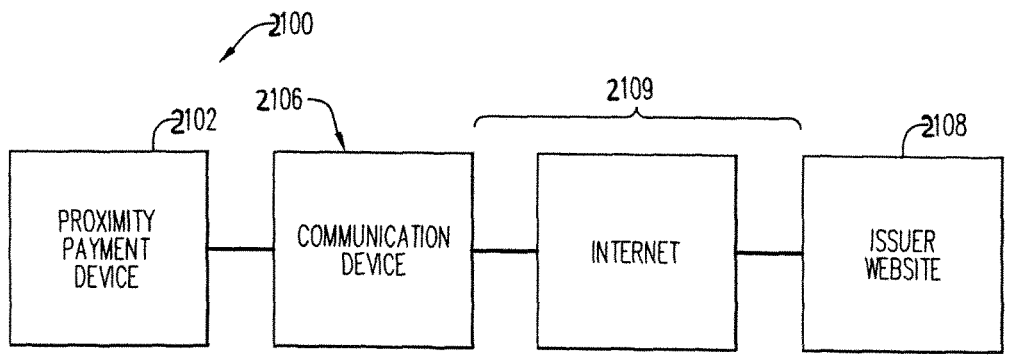
FIG. 21B is a schematic block diagram of a system, according to some embodiments.

FIG. 21B is a schematic block diagram of the system 2100, in accordance with some embodiments. Referring to FIG. 21B, in accordance with some embodiments, the communication link 2109 comprises the Internet and/or other computer network. In some embodiments the communication link 2109 comprises the Banknet. In some embodiments, the authorization device 2108 comprises an issuer website.

Figure 21C:
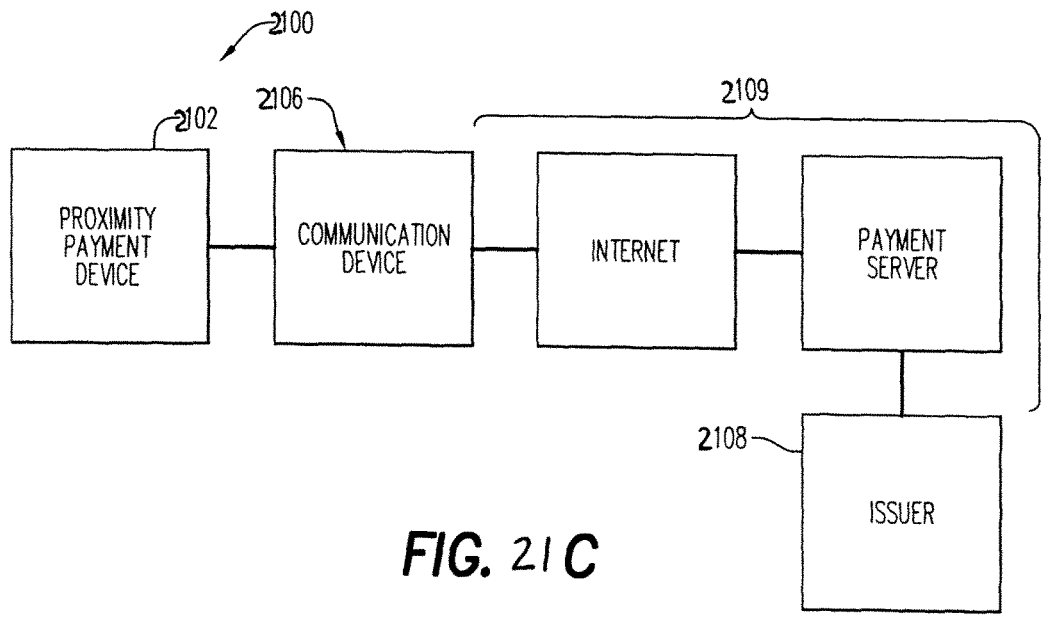
FIG. 21C is a schematic block diagram of a system, according to some embodiments.

FIG. 21C is a schematic block diagram of a system 2100, in accordance with some embodiments. Referring to FIG. 21C, in accordance with some embodiments, the communication link 2109 comprises the Internet (and/or other computer network) and a payment server. As stated above, in some embodiments, the authorization device 2108 comprises an issuer device.

Figure 22:
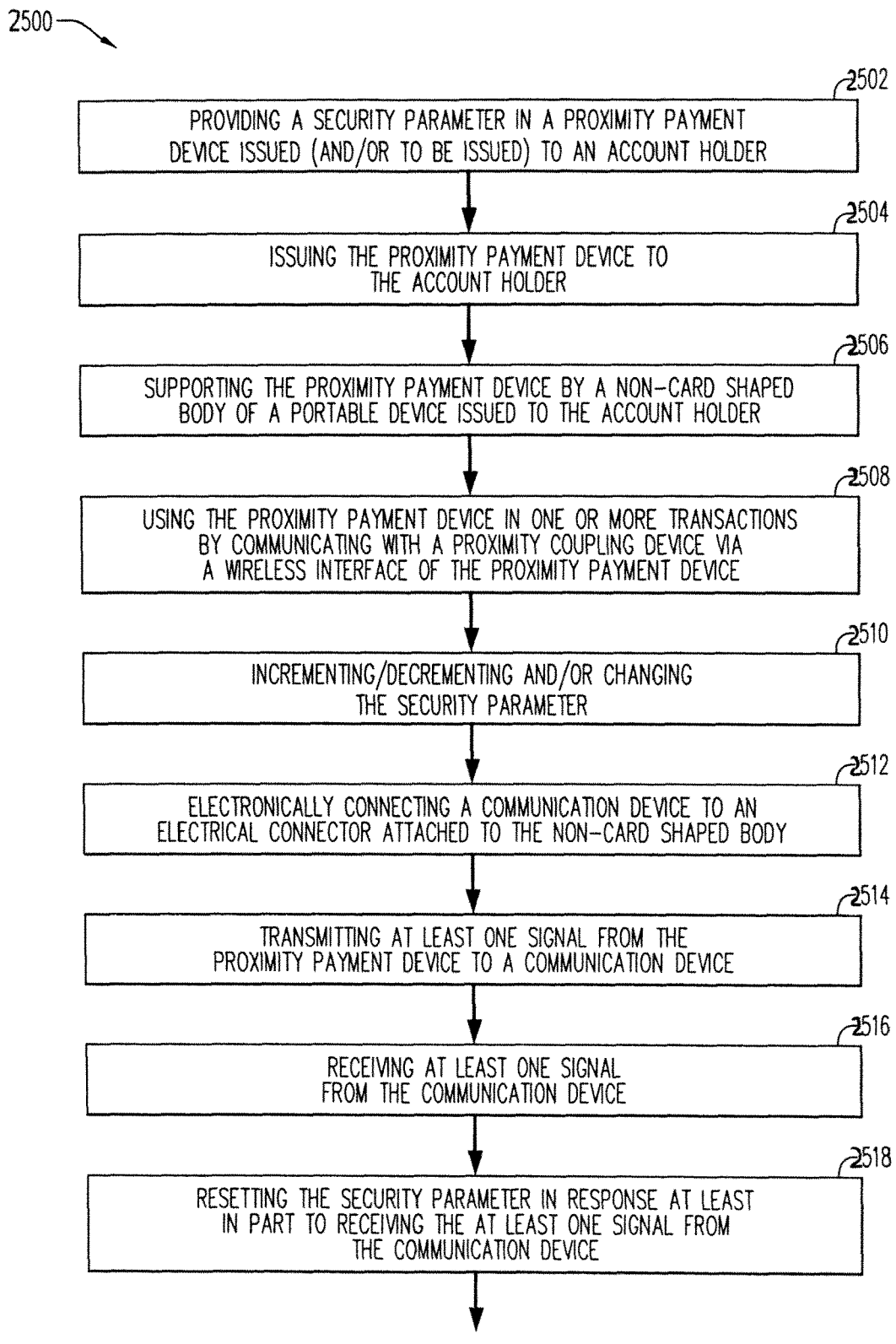
FIG. 22 is a flow chart that illustrates a method, according to some embodiments.

FIG. 22 is a flow chart 2500 of a method according to some embodiments. In some embodiments, one or more portions of the method may be used in association with the proximity payment device 2102, the electrical connector, the communication device 2106 and/or one or more other portions of the system 2100 (FIG. 18). The method is not limited to the order shown in the flow chart. Rather, embodiments of the method may be performed in any order that is practicable. For that matter, unless stated otherwise, any method disclosed herein may be performed in any order that is practicable. Notably, some embodiments may employ one or more portions of the method without one or more other portions of the method.

At 2502, the method may include providing a security parameter in a proximity payment device issued, and/or to be issued, to an account holder. In some embodiments such security parameter comprises an EMV risk parameter that is provided in the course of personalization and/or a pre-personalization of the proximity payment device. As is known, pre-personalization of the proximity payment device may include storing information such as keys to be used in subsequent transactions and/or parameters to be used to select a particular card brand to be borne by the proximity payment device. This may include writing information such as loading of keys to be used in subsequent transactions and parameters (such as to select a particular card brand to be borne by the proximity payment device) into the control/ storage circuitry 2204 (FIG. 19) of the proximity payment device. Pre-personalization may further include printing information such as a payment card association brand, etc., on the proximity payment device. If a multiple proximity payment devices are processed as a batch, the information transmitted to each proximity payment device and/or printed on each proximity payment device may be the same for all proximity payment devices in the batch.

Personalization of the proximity payment device may include assigning the proximity payment device to a particular payment account and/or a particular account holder by storing information in the proximity payment device. This may include writing a payment card account number and a name of the account holder into the control/storage circuitry 2204 (FIG. 19) of a proximity payment device. Other information, such as expiration date, may be stored in either of the pre-personalization and personalization steps. Personalization may further include printing the payment account number and/or any other information (or a portion thereof) that was (or is to be) stored in the proximity payment device 2102 on a surface of the proximity payment device 2102. In some embodiments, pre-personalization and personalization steps may be combined into one step. In some embodiments, personalization and/or pre-personalization is carried out using contactless card programming equipment commonly used to program proximity payment cards, such as for example, a model 9000 available from Datacard Group, Minnetonka, Minn.

At 2504, the method may further include issuing the proximity payment device to the account holder. Unless stated otherwise, the term "issuing" may include, but is not limited to, giving, loaning, renting, selling and/or transferring. In some embodiments, issuing the proximity payment device to the account holder includes mailing and/or otherwise sending the proximity payment device to the account holder.

At 2506, the method may further include supporting the proximity payment device by a non-card shaped body of a device issued to the account holder. In some embodiments, the device comprises a cell phone, a music player, a video player, a PDA, a wristwatch, a wristband, a bracelet, a pendant, a key fob and/or any other type of portable device. In some embodiments, this is carried out by the account holder, after the proximity payment device is issued to the account holder.

At 2508, the method may further include using the proximity payment device in one or more transactions. This may include communicating with a proximity coupling device via a wireless interface of the proximity payment device. In some embodiments, this is carried out in a conventional manner, e.g., in accordance with the above-mentioned "PayPass" standard. For example, the proximity payment device may be presented to a proximity coupling device 2130 (FIG. 18) of a POS terminal to accomplish payment for a transaction. The proximity coupling device may transmit an interrogation signal. The proximity payment device may receive the interrogation signal via the antenna 2206 (FIG. 19). The received interrogation signal may cause the circuitry of the proximity payment device to be powered-up. For example, the proximity payment device may include circuitry to rectify the received interrogation signal to generate a DC power that may be used to power the control/storage circuitry 2204 (FIG. 19) and transmit/receive circuitry 2208 (FIG. 19). The proximity payment device may transmit a signal to the proximity coupling device in response to the interrogation signal. The proximity payment device may transmit the signal (and possibly one or more additional signals) to the proximity coupling device via the antenna 2206 (FIG. 19). One or more signals transmitted by the proximity payment device may include a payment card account number and/or other information required for interaction with the proximity coupling device. In some embodiments, the proximity payment device may transmit the payment card account number and/or other information via the antenna 2206 (FIG. 19) after a handshake procedure or the like with the POS terminal. The POS terminal may then interact with a payment card system to charge the current sales transaction to the payment card account represented by the payment card account number received from the proximity payment device.

In some embodiments, the proximity payment device may be presented to the proximity coupling device by simply positioning the proximity payment device within wireless communication range of the proximity coupling device. In some embodiments, the proximity payment device may be presented to the proximity payment device by positioning the proximity payment device in physical contact with, and/or by tapping a portion of the proximity payment device on, the proximity coupling device.

In some embodiments, a proximity payment device may be selectively enabled/disabled in order to enable and/or disable operation of the proximity payment device. In some embodiments, a proximity payment device may be presented to a proximity coupling device before, during and/or after enabling operation of the proximity payment device.

At 2510, the value of the EMV risk parameter may be incremented, decremented and/or changed in any other way in response to one or more of such transactions.

At 2512, the method may include electrically connecting a communication device to an electrical connector attached to the non-card shaped body. In some embodiments, the communication device includes a body and an electrical connector attached thereto. In some embodiments, the electrical connector attached to the non-card shaped body is mated to the electrical connector attached to the body of the communication device.

At 2514, the method may further include transmitting at least one signal from the proximity payment device to the communication device. In some embodiments, the at least one signal is transmitted via the electrical connector attached to the non-card shaped body. In some embodiments, the at least one signal may include a request for authorization to reset the EMV risk parameter. In some embodiments, the communication device may transmit the request to an authorization device.

At 2516, the method may further include receiving at least one signal from the communication device. In some embodiments, the at least one signal is received via the electrical connector attached to the non-card shaped body. In some embodiments, the at least one signal may include authorization to reset the EMV risk parameter. In some embodiments, the communication device may receive the authorization from the authorization device.

At 2518, the method may further include resetting a security parameter in the proximity payment device in response at least in part to receiving the at least one signal from the communication device. Notably, the parameter may or may not be reset to its initial value and/or attribute. Moreover, in some embodiments, an EMV risk parameter and/or other security parameter may be reset before the proximity payment device becomes unusable.

In some embodiments, the system 2100 may be used to further communicate other information. In some embodiments, the proximity payment device 2102, the communication device 2106 and/or the authorization device 2108 may transmit and/or receive signals that include data not related to resetting a security parameter in the proximity payment device. In some embodiments, such signals may be transmitted and/or received to and/or from one another and/or one or more other devices.

Figure 23:
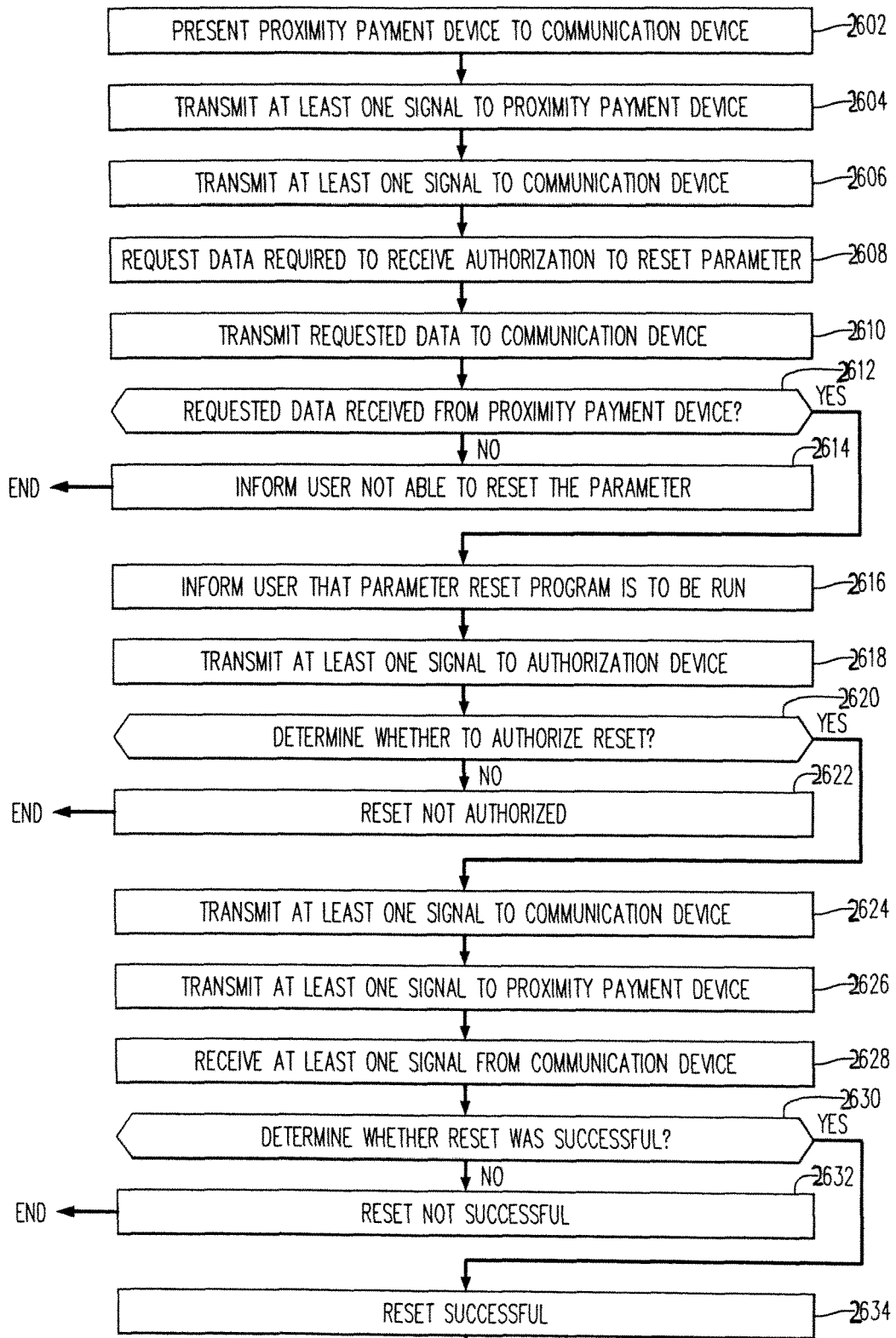
FIG. 23 is a flow chart that illustrates a method, according to some embodiments.

FIG. 23 shows a flow chart 2600 of a method that may be used in resetting a EMV risk parameter, according to some embodiments. In some embodiments, one or more portions the method may be used in association with the proximity payment device 2102, the electrical connector 2105, the communication device 2106 and/or one or more other portions of the system 2100 (FIG. 18) in order to reset the EMV risk parameter stored in the proximity payment device 2102. In some embodiments, one or more portions of the method may be used at 2510-2518 in the method of FIG. 22. The method is not limited to the order shown in the flow chart. Rather, embodiments of the method may be performed in any order that is practicable. For that matter, unless stated otherwise, any method disclosed herein may be performed in any order that is practicable. Notably, some embodiments may employ one or more portions of the method without one or more other portions of the method.

At 2602, the method may include electrically connecting a proximity payment device to a communication device via an electrical connector. The communication device may recognize the proximity payment device, and at 2604, the communication device may transmit at least one signal to the proximity payment device. In some embodiments, the at least one signal is transmitted via the electrical connector. In some embodiments, the at least one signal includes a query as to a status of the EMV risk parameter in the proximity payment device.

The proximity payment device may receive the at least one signal transmitted by the communication device. In some embodiments, the at least one signal is received via the electrical connector 2105 (FIG. 18). The at least one signal may include at least one signal that causes the proximity payment device to be powered-up.

At 2606, the proximity payment device may transmit at least one signal to the communication device. In some embodiments, the proximity payment device transmits the at least one signal via the electrical connector. The at least one signal may comprise a request for authorization to reset the EMV risk parameter. In some embodiments, the at least one signal transmitted by the communication device includes a query and the proximity payment device transmits the request for authorization in response, at least in part, to such query. In some other embodiments, the proximity payment device transmits the at least one signal without receiving any signals from the communication device.

The communication device may receive the at least one signal transmitted by the proximity payment device. In some embodiments, the communication device receives the at least one signal via the electrical connector. If the at least one signal comprises a request for authorization to reset the EMV risk parameter, then at 2608, the communication device may request an account number and/or other data that may be required to receive authorization to reset the EMV risk parameter.

The proximity payment device may receive the request for data. In some embodiments, the proximity payment device receives the request for data via the electrical connector.

At 2610, the proximity payment device may transmit the requested data to the communication device. In some embodiments, the proximity payment device transmits the data via the electrical connector.

The communication device may receive the data transmitted by the proximity payment device. In some embodiments, the communication device receives the data via the electrical connector.

At 2612, the communication device may determine whether the data includes the requested data. If the communication device determines that the data does not include the requested data, then at 2614, the communication device may inform a user that the EMV risk parameter is not able to be reset. In some embodiments, the communication device includes a display and informs and/or prompts the user using the display.

In some embodiments, information supplied to and/or by the display comprises information supplied by the proximity payment device. In some embodiments, the proximity payment device supplies the information via the electrical connector.

In some embodiments, information supplied to and/or by the display may define one or more logos and/or brands. In some embodiment, the one or more logos and/or brands may include (i) a brand and/or logo of a national payment card association such as MasterCard International Incorporated, (ii) a brand and/or logo of an issuer and/or merchant associated with the proximity payment device (iii) a brand and/or logo of a specific card product.

At 2612, if the communication device determines that the data includes the requested data, then at 2616, the communication device may inform the user that an EMV risk parameter reset program is to be run.

At 2618, the communication device may transmit at least one signal to an authorization device. In some embodiments, the at least one signal comprises a request for authorization to reset the EMV risk parameter and/or data that may be required to receive such authorization. In some embodiments, the authorization device comprises a device operated by the issuer and/or a device operated by a party associated with the issuer.

In some embodiments, the method includes establishing a communication channel to connect the communication device and the authorization device. In some embodiments, the method includes establishing a communication channel to connect the proximity payment device and the authorization device.

If the communication device comprises a cell phone, the proximity payment device may transmit the at least one signal via a communication link that includes the cellular network. If the communication device comprises a computer, the communication device may transmit the at least one signal via a communication link that includes a telephone line and/or a network, e.g., the Internet.

The authorization device may receive the at least one signal transmitted by the communication device, and at 2620, the authorization device may determine whether to authorize reset of the EMV risk parameter. In some embodiments, this determination is based on whether or not risk of fraud and/or bad debt is low, e.g., the proximity payment device is not reported lost and the account is in good standing.

If the authorization device determines not to authorize reset of the EMV risk parameter, then at 2622, the authorization device may inform the communication device, which may in turn inform the user that the EMV risk parameter is not authorized to be reset.

At 2620, if the authorization device determines to authorize reset of the EMV risk parameter, then at 2624, the authorization device may transmit at least one signal to the communication device. In some embodiments, the at least one signal includes an authorization to reset the EMV risk parameter. In some embodiments, the authorization comprises a script to be executed by the proximity payment device to reset the EMV risk parameter.

The communication device may receive the at least one signal transmitted by the authorization device, and at 2626, the communication device may transmit the at least one signal to the proximity payment device. In some embodiments, the at least one signal is transmitted via the electrical connector.

At 2628, the proximity payment device may receive the at least one signal transmitted by the communication device. In some embodiments, the at least one signal is received via the electrical connector.

If the at least one signal includes an authorization to reset the EMV risk parameter, the proximity payment device may reset the EMV risk parameter in response at least thereto. If the at least one signal includes a script, the proximity payment device may execute the script to reset the EMV risk parameter.

At 2630, the communication device and/or the proximity payment device may determine whether the reset was successful. If the reset was not successful, then at 2632, the communication device may inform the user and/or the authorization device that the reset was not successful. In some embodiments, the communication device informs the user that the reset was unsuccessful by displaying information to indicate that the reset was unsuccessful and/or by providing any other type of human detectable indication that the reset was unsuccessful. In some embodiments, the human detectable indication comprises a visible, audible and/or tactile indication. In some embodiments, such visible indication may comprise text and/or predefined visible indication(s) to indicate that the reset was unsuccessful. In some embodiments, such audible indication may comprise machine generated speech and/or predefined sound(s) to indicate that the reset was unsuccessful. In some embodiments, such tactile indication may comprise a vibration and/or other predefined tactile indication(s) to indicate that the reset was unsuccessful.

At 2630, if the reset was successful, then at 2634, the communication device may inform the user and/or the authorization device that the reset was successful. In some embodiments, the communication device informs the user that the reset was successful by displaying information to indicate that the reset was successful and/or by providing any other type of human detectable indication that the reset was successful. In some embodiments, the human detectable indication comprises a visible, audible and/or tactile indication. In some embodiments, such visible indication may comprise text and/or predefined visible indication(s) to indicate that the reset was successful. In some embodiments, such audible indication may comprise machine generated speech and/or predefined sound(s) to indicate that the reset was successful. In some embodiments, such tactile indication may comprise a vibration and/or other predefined tactile indication(s) to indicate that the reset was successful.

In some embodiments, the communication device may be used in resetting the EMV risk parameter in any number of proximity payment devices on any number of occasions. In some embodiments, the communication device may be used in resetting the EMV risk parameter in only a limited number of proximity payment devices and/or on only a limited number of occasions.

In some embodiments, the communication device may include a counter indicative of the number of occasions that the communication device may be used in resetting the EMV risk parameters. The counter may be decremented each time that the communication device is used in resetting an EMV risk parameter. If the counter reaches zero, the communication device may no longer be used in resetting an EMV risk parameter. Some embodiments may allow the issuer to reset or increment the counter so that the communication device may again be used in resetting an EMV risk parameter.

In some embodiments, one or more authentication protocols may be used in addition to and/or in lieu of the one or more portions of the methods disclosed herein.

In some embodiments, the authorization device may transmit a request for a user identifier prior to transmitting an authorization to reset the EMV risk parameter. In accordance with some embodiments, a user identifier may be required if an online purchase transaction is attempted. In some embodiments, the communication device may receive the request for the user identifier and may prompt the user to enter a user identifier (e.g., using a keypad). In accordance with some embodiments, a visible and/or audible indication may be provided to indicate that the attention of the user is required. If the user enters a user identifier, the communication device may transmit the user identifier to the authorization device. The authorization device may determine whether the user identifier is valid. If the authorization device determines that the user identifier is not valid, the authorization device may inform the communication device of such, and the communication device may inform the user. The user may be given one or more additional opportunities to enter a user identifier, however, the authorization device may not transmit the authorization to reset the EMV risk parameter unless a valid user identifier is received.

In some embodiments, the communication device may store any data that may be required to receive authorization to reset the EMV risk parameter. In some embodiments, such data comprises the data received at 2612 of the method of FIG. 23. The communication device may thereafter request authorization to reset an EMV risk parameter even though the proximity payment device may not be present. The communication device may thereafter receive authorization to reset the EMV risk parameter, which the communication device may transmit to the proximity payment device when the proximity payment device is next presented to the communication device. In some embodiments, the authorization may expire if not transmitted to the proximity payment device within a certain period of time, which may be specified by the authorization device at the time that the authorization is transmitted to the communication device. In some embodiments, this is carried out by performing portions 2602-2604 of the method of FIG. 23 after portion 2624 and without performing portions 2606-2614.

Thus, in some embodiments, it is possible to reset the EMV risk parameter in a proximity payment device without having to provide a communication channel between the communication device and the authorization device. Notably such a communication channel may not always be available and/or may be inconvenient to provide and/or wait for.

In addition, in some embodiments, it is possible to reset the EMV risk parameter in a proximity payment device without having to hold the proximity payment device within range of the POS system for the amount of time needed to reset the EMV security parameter.

In some embodiments, the communication device may request authorization on a periodic basis, shortly before an authorization expires and/or after an authorization expires, so as to have an authorization available when the proximity payment device is next presented to the communication device.

In some embodiments, the communication device 2106 includes information that defines a schedule for requesting authorization. In some embodiments, one or more portions of the information that defines the schedule may be supplied by and/or based at least in part on data supplied by the account holder.

In some embodiments, an account holder may connect the proximity payment device to the communication device on a periodic basis. In some embodiments, an account holder may connect the proximity payment device to the communication device at night.

In some embodiments, the proximity payment device 2102, the communication device 2106 and/or the authorization device 2108 may transmit and/or receive signals that include data not related to resetting a security parameter in the proximity payment device. In some embodiments, such signals may be transmitted and/or received to and/or from one another and/or one or more other devices.

In some embodiments, the communication device 2106 may include information that defines the data to be transmitted and/or received and/or a schedule for transmitting and/or receiving such data. The communication device 2106 may also include information that defines one or more sources and/or destinations for such data. In some embodiments, one or more portions of such information may be supplied by and/or based at least in part on data supplied by the account holder.

In some embodiments, the authorization device comprises a device that is operated by and/or on behalf of an issuer of the proximity payment device. In some embodiments, the authorization device comprises a device operated by and/or on behalf of a party associated with the issuer of the proximity payment device.

In some embodiments, the communication device 2106 comprises a first communication device issued to an account holder and the communication link 2109 comprises a second communication device issued to the account holder.

In some embodiments, the proximity payment device 2102 includes a display and/or other output device(s) and any indication described herein and/or that may be provided by the communication device, may be provided by the proximity payment device 2102 in lieu of, or in addition to, being provided by the communication device.

Likewise, in some embodiments, the device 2110 includes a display and/or other output device(s) and any indication described herein and/or that may be provided by the communication device, may be provided by the proximity payment device 2110 in lieu of or in addition to being provided by the communication device. In some embodiments, the display and/or output device(s) is part of the system 2114.

Thus, in some embodiments, if the reset was unsuccessful, the proximity payment device 2102, the communication device 2106 and/or the device 2110 may provide a human detectable indication that the reset was unsuccessful. As stated above, in some embodiments, the human detectable indication comprises a visible, audible and/or tactile indication. If the reset was successful, the proximity payment device 2102, the communication device 2106 and/or the device 2110 may provide a human detectable indication that the reset was successful. As stated above, in some embodiments, the human detectable indication comprises a visible, audible and/or tactile indication. As stated above, in some embodiments, the body 2104 comprises a body of a keyfob.

Figure 24A:
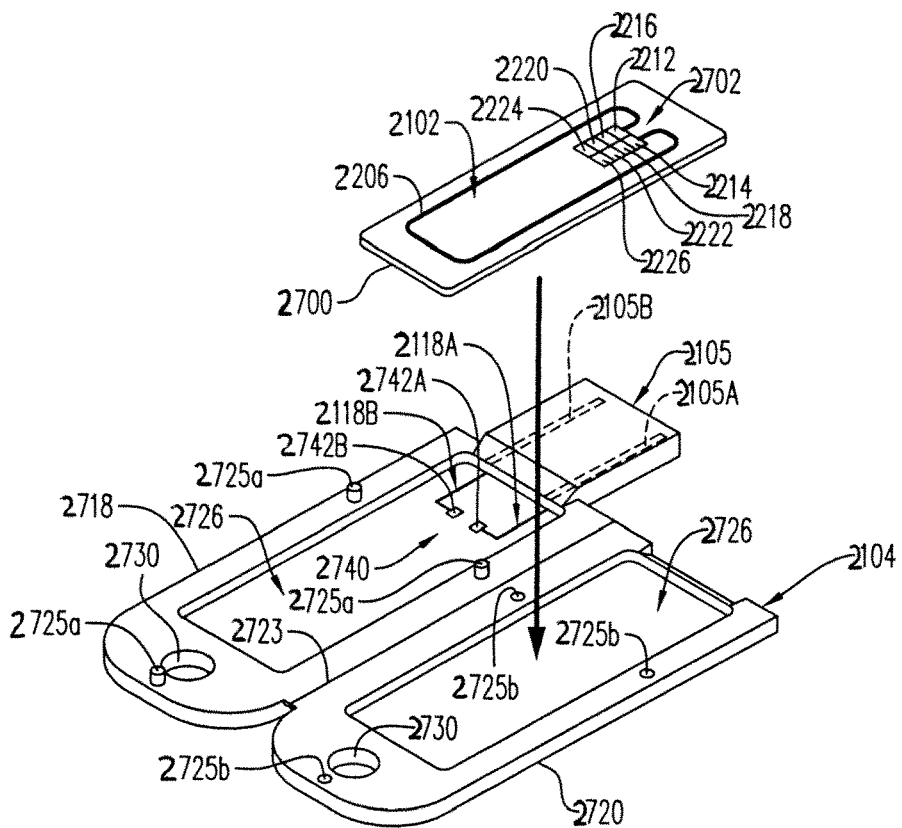
FIGS. 24A-24D are perspective views of a proximity payment device, a body and a connector, according to some embodiments.
Figure 24B:
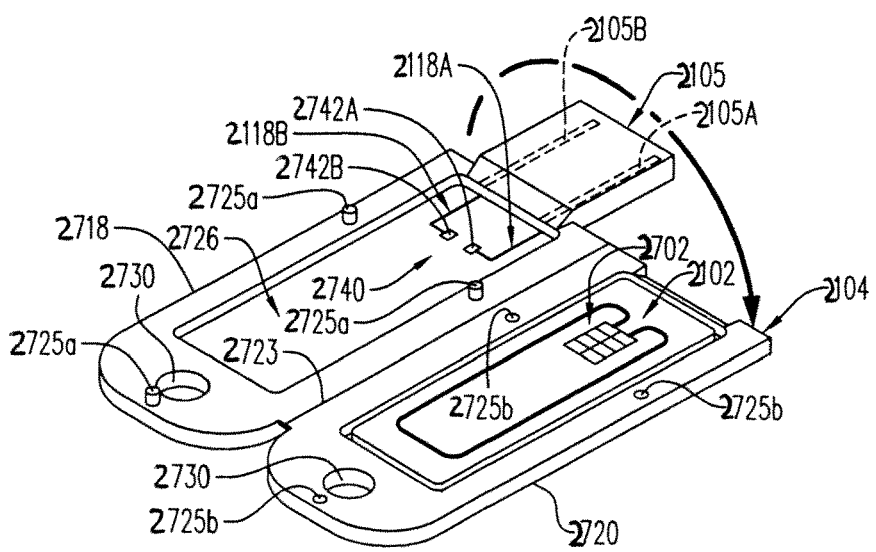
Figure 24C:
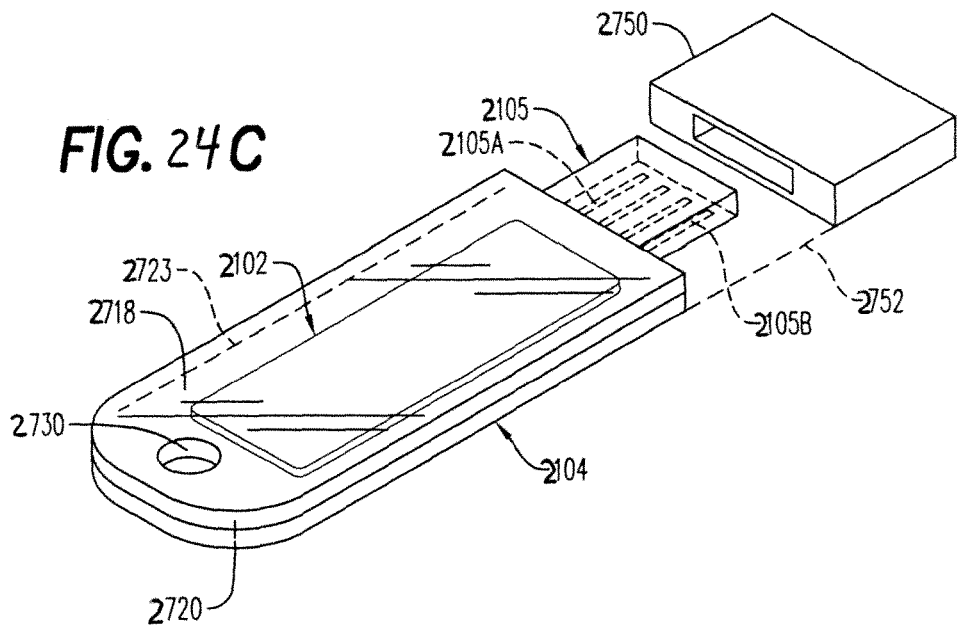
Figure 24D:
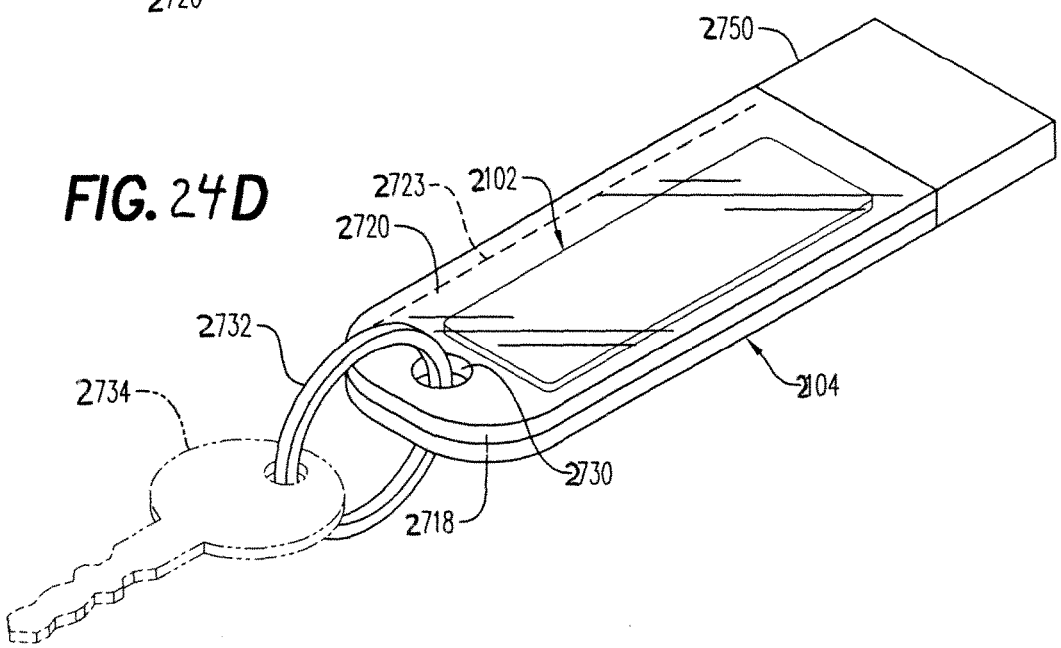

FIGS. 24A-24D are perspective views of the proximity payment device 2102, the body 2104 and connector 2105, according to some embodiments, in which the body 2104 may comprise the body of a keyfob. More particularly, FIG. 24A is a perspective view of the proximity payment device 2102, the body 2104 and connector 2105, according to some embodiments, with the body 2104 in an open state, prior to installing the proximity payment device 2102 therein. FIG. 24B is a perspective view of the proximity payment device 2102 installed in the body 2104, according to some embodiments, with the body 2104 in an open state. FIGS. 24C-24D are perspective views of the proximity payment device 2102 installed in the body 2104, according to some embodiments, with the body 2104 in a closed state.

Referring to FIGS. 24A-24D, in accordance with some embodiments, the proximity payment device 2102 may include a generally rectangular card-shaped plastic body 2700 and an RFID IC 2702 supported thereby. The generally rectangular card-shaped plastic body 2700 may have a height dimension of about 54 mm, a width dimension of about 18 mm, and a thickness dimension of about 0.76 mm. The RFID IC 2702 may include the control/storage circuit 2204, the transmit/receive circuitry 2208 and the contact interface 2210. The contact interface 2210 may include contacts 2212-2226. Two of the contacts 2212-2226, e.g., contacts 2212, 2214, may be electrically connected to the antenna 2206.

As further described below, the proximity payment device 2102 may further include information printed and/or otherwise provided thereon. For example, in some embodiments, the payment account number (or a portion thereof), the account holder's name, a valid from date, an expiration date, a security code and/or other information may be printed and/or otherwise provided on the proximity payment device 2102. If only a portion of the payment account number is provided, such portion may include any number of characters disposed at any position(s) of the account number. In some embodiments, the portion of the payment card account number may include six digits at the beginning of the account number and/or six digits at the end of the account number. If the payment card account number has a BIN portion, the six digits at the beginning of the account number may correspond to such BIN portion. A placeholder may be provided in place of any portion or portions of the payment card account number that are not printed. In some embodiments, one or more X's, (and/or other character(s)) and/or one or more blank spaces may be used as a placeholder for any portions of the payment card account number that are not provided. In some embodiments, an X may be printed in place of each omitted character of the payment card account number. In some embodiments, the information may include one or more logos and/or brands. In some embodiments, the one or more logos and/or brands may include (i) one or more brands and/or logos of one or more national and/or international payment card association such as for example, MasterCard International Incorporated (ii) one or more brands and/or logos of one or more products, such as, for example, Pay Pass, provided by one or more national payment card associations (iii) one or more brands and/or logos of one or more issuers and/or (iv) one or more brands and/or logos of one or more products provided by the one or more issuers. In some embodiments, the information, logos and/or brands may comprise embossed and/or non-embossed numbers and/or letters.

The body 2104 may include a front portion 2718, a back portion 2720 and a portion 2723 to retain the front portion 2718 to the back portion 2720 in a clamshell configuration. In some embodiments, portion 2723 comprises a living hinge or other type of hinge that allows the portions 2718, 2720 to pivot relative to one another. In some embodiments, the portion 2723 is defined in part by scoring of the body 2104. In some embodiments, the portion 2723 comprises material that is bendable and allows the portion 2723 to be bent if the body 2104 is to be closed.

A second side of the front portion 2718 may be releasably retained to a second side of the back portion 2720 by a releasable catch 2725. In some embodiments, the releasable catch 2725 comprises one or more pins 2725a defined by one portion, e.g., front portion 2718, and one or more sockets 2725b defined by the other portion, e.g., back portion 2720, adapted to receive the one or more pins 2725a. In some embodiments the one or more pins and one or more sockets are sized so as to provide a press fit between the pins and sockets. In such embodiments, some amount of force may need to be applied to one or both portions 2718, 2720 to insert the one or more pins into the one or more sockets. Upon releasing the releasable catch 2725, the second side the front portion 2718 and the second side of the back portion 2720 may be free to pivot away from one another.

The front portion 2718 may have a shape that is the same as and/or similar to that of the back portion 2720, such that, with the body 2104 in the closed state, the edge of the second side of the front portion 2718 may be disposed in register with the edge of the second side of the back portion 2720. The second side of the front portion and the second side of the back portion may each be rounded and/or define rounded corners.

Some, or all, of the front portion 2718 and/or some, or all, of the back portion 2720 may be substantially transparent to allow one or more portions of the proximity payment device 2102 to be seen therethrough. In some embodiments, the body 2104 may be formed of plastic and/or other suitable material.

The body 2104 may define a seat 2726 to receive the proximity payment device 2102 and to support and/or position the proximity payment device 2102, at least in part. In some embodiments, the seat 2726 may have a length, a width and/or a height that is the same size as, or slightly larger, than the length, the width and/or the thickness, respectively, of the proximity payment device 2102.

The body 2104 may further define an opening 2730 to receive a ring 2732. The ring may comprise a key ring to receive and/or retain one or more keys 2734.

The body 2104 may support an electrical interface 2740, which may include the one or more conductors 2118A-2118B. Each of the one or more conductors 2118A-2118B may include a contact portion, represented by contacts 2742A-2742B, respectively, adapted to contact one or more contacts 2212-2226 of the proximity payment device 2102. As stated above, the one or more conductors 2118A-2118B may also electrically connect to the one or more conductors 2105A-2105B, respectively, of the electrical connector 2105, to thereby electrically connect one or more of the contacts 2212-2226 of the proximity payment device 2102 to the electrical connector 2105. The contacts 2742A-2742B may be biased (e.g., in the z direction) so as to help insure contact with respective contacts of the proximity payment device 2102. In some embodiments, each of the contacts 2742A-2742B may comprise a spring contact that includes a contact and a spring integral therewith to bias the spring contact (e.g., in the z direction). The body 2104 may be adapted to position the proximity payment device 2102 relative to the electrical interface 2724, at least in part. One or more springs 2732 may be provided within the body 2104 to bias the proximity payment device 2102 toward the electrical interface.

In some embodiments, the electrical connector 2105 comprises a USB connector. In such embodiments, the proximity payment device 2102 and/or the communication device 2106 may be adapted to communicate in accordance with a USB standard such that signals communicated via the connector 2105 comply with such standard.

Some embodiments may include a removable cover 2750 (FIGS. 24C-24D) to protect the connector 2105 if the connector is not in use. A living or other type of hinge, represented by hinge 2752 (FIG. 24C), may fixedly attach the removable cover 2750 to the body 2104.

In some embodiments, the body 2104 may further support a display, a power source and/or a controller (not shown). In some embodiments, the proximity payment device 2102 may be adapted to be electrically connected to such display, power source and/or controller. In that regard, in some embodiments, one or more of contacts 2212-2226 may be adapted to be connected to the display, power source and/or controller. Access to a source of electrical power may improve one or more operating characteristics of the proximity payment device 2102. In some embodiments, access to a source of electrical power may give the proximity payment device a greater range. In some embodiments, access to a source of electrical power may allow the device to perform a greater number of functions and/or may increase the operating speed of the device.

In some embodiments, one or more logos and/or brands, including for example the brand/logo of a national and/or international payment card association such as MasterCard International Incorporated, may be provided on one or more surfaces of a proximity payment device. The brand/logo of the issuer may also be provided, as well as, for example, a specific card product brand. Embossed or non-embossed numbers and/or letters may be provided on the proximity payment device to indicate one or more account numbers and/or a name of an account holder. Other features that may be provided on the proximity payment device are an adhesive paper strip to receive the signature of the cardholder, and a security code or the like printed on the adhesive strip. In addition, the proximity payment device may have one or more magnetic stripes to allow the proximity payment device to be read by a magnetic card reader.

Figure 25:
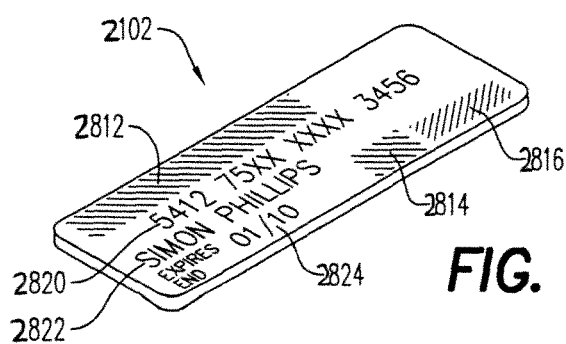
FIG. 25 is a schematic plan view of proximity payment device, according to some embodiments.

FIG. 25 is a schematic plan view of the proximity payment device 2102 of FIGS. 24A-24D, according to some embodiments. Referring to FIG. 25, in accordance with some embodiments, the proximity payment device 2102 has a generally rectangular shaped plastic body 2701 having regions 2812, 2814, 2816 provided with one or more brand and/or logo of an issuer or a payment card association and/or one or more brand and/or logo of a product provided by the issuer or payment card association. The plastic body is further provided with a portion of a payment account number 2820, an account holder's name 2822 and an expiration date 2824. The portion of the payment account number 2820 includes include six digits that define a first portion of the account number and four digits that define a second portion of the account number. For security, X's are provided in place of six digits of the payment account number. Other configurations may also be employed.

Other features that may be provided on the proximity payment device 2102 (though such features are not shown) may include (i) a paper strip or other surface to receive a signature of the cardholder, (ii) a security code, which may be provided on the paper strip, if present, or/or another suitable location and/or (iii) a magnetic stripe (not shown), which may be read by a magnetic card reader and may store some or all of the information that was (or is to be) stored in proximity payment device 2102.

Figure 26:
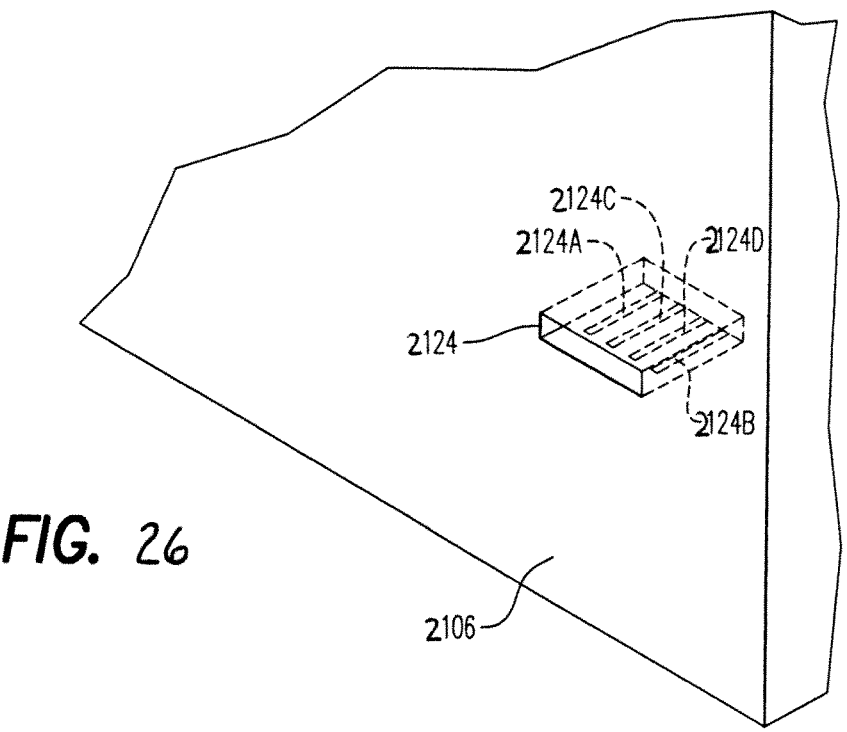
FIG. 26 is a perspective view of a portion of a communication device, according to some embodiments.

FIG. 26 is a perspective view of a portion of the communication device 2106, according to some embodiments. Referring to FIG. 26, in accordance with some embodiments, the communication device 2106 comprises a personal computer and connector 2124 comprises a USB connector.

Figure 27:
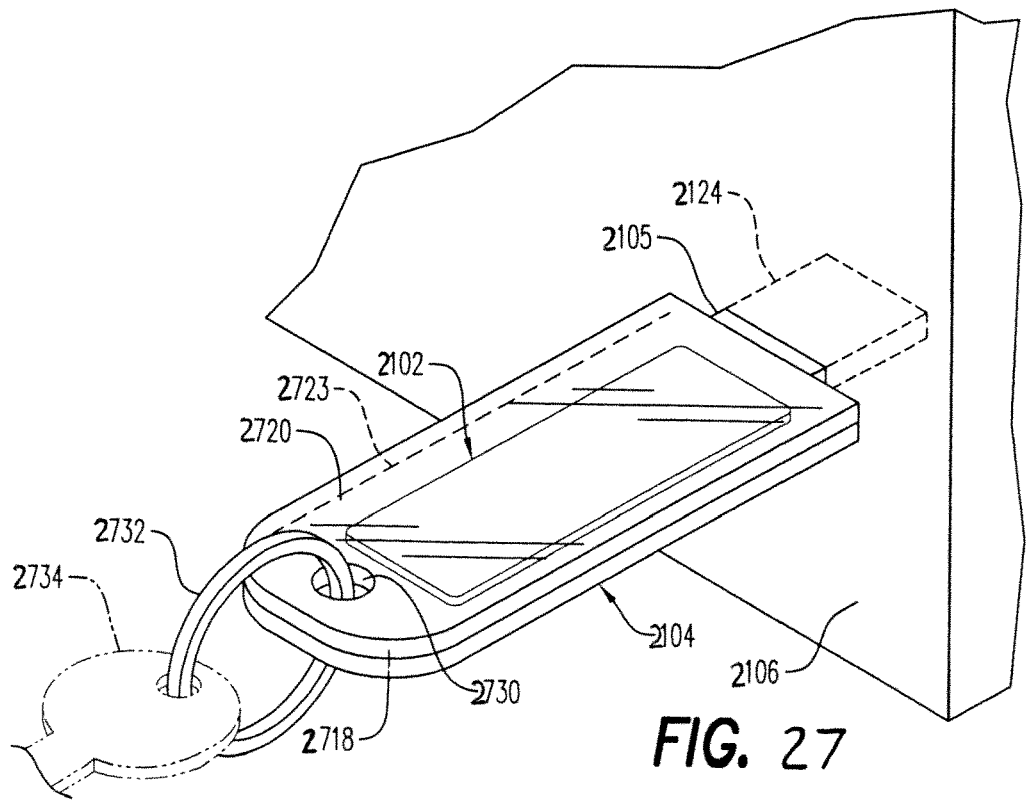
FIG. 27 is a perspective view of a proximity payment device, a body, a connector, and a communication device, according to some embodiments.

FIG. 27 is a perspective view of the proximity payment device 2102, the body 2104, and the electrical connector 2105 of FIGS. 24A-24D in combination with a portion of the communication device 2106 of FIG. 26, with the electrical connector 2105 mated with the electrical connector 2124.

As described above, in operation, the proximity payment device 2102 may include an EMV risk parameter and/or other security parameter(s) and may communicate with the communication device 2106 via the electrical connector 2105. The communication device 2106 may communicate with the authorization device 2108 to obtain authorization to reset the security parameter in the proximity payment device 2102. The communication device 2106 may transmit at least one signal to the proximity payment device 2102 to indicate authorization to reset the security parameter. The proximity payment device 2102 may receive the at least one signal transmitted by the communication device 2106 and may reset the security parameter in response, at least in part, thereto.

As stated above, in some embodiments, the body 2104 comprises a body of a USB flash drive or other type of mass storage device.

Figure 28A:
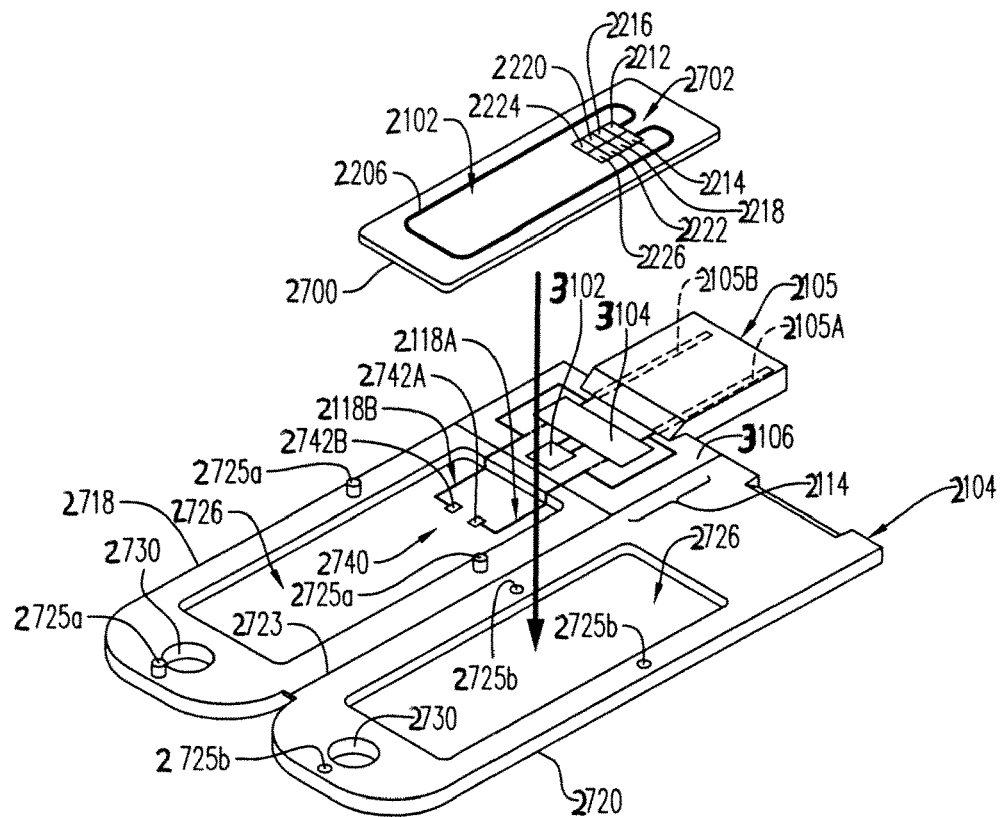
Figure 28B:
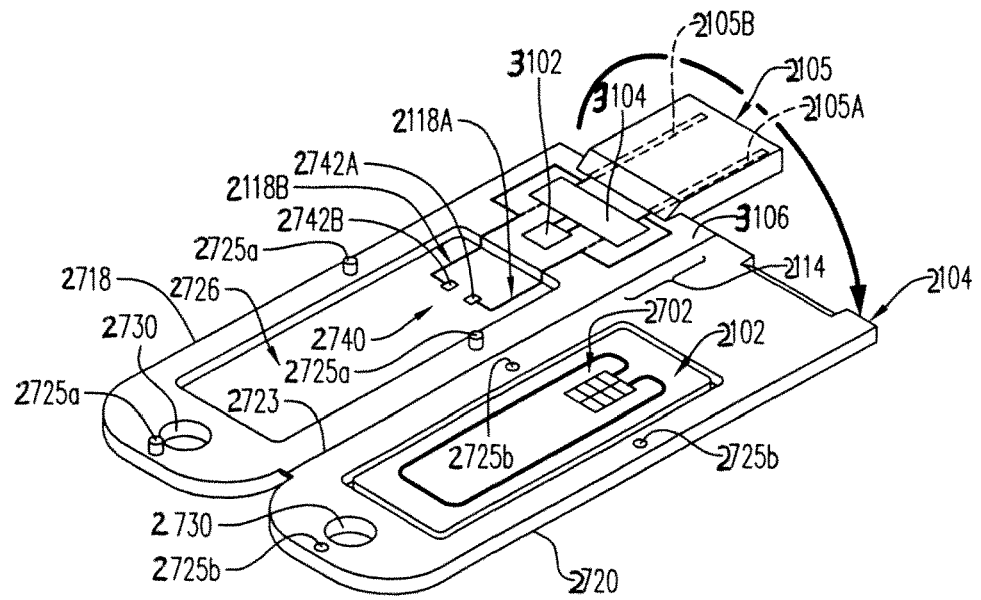

FIGS. 28A-28D are perspective views of the proximity payment device 2102, the body 2104 and connector 2105, according to some embodiments, in which the body comprises the body of a USB flash drive or other type of mass storage device. More particularly, FIG. 28A is a perspective view of the proximity payment device 2102, the body 2104 and connector 2105, according to some embodiments, with the body 2104 in an open state, prior to installing the proximity payment device 2102 therein. FIG. 28B is a perspective view of the proximity payment device 2102 installed in the body 2104, according to some embodiments, with the body 2104 in an open state. FIGS. 28C-28D are perspective views of the proximity payment device 2102 installed in the body 2104, according to some embodiments, with the body 2104 in a closed state.

Referring to FIGS. 28A-28D, in accordance with some embodiments, the proximity payment device 2102, body 2104 and connector 2105 may be similar to the proximity payment device 2102, body 2104 and connector 2105, respectively, described above with respect to FIGS. 24A-24D, except that the body 2104 further supports a mass storage system 2114.

In accordance with some embodiments, the mass storage system 2114 may be coupled to the electrical connector 2105. If the connector 2105 comprises a USB connector, the mass storage system 2114 may be adapted to operate in accordance with a USB mass storage device standard.

In operation, the mass storage system 2114 may receive a request to store information, and in response thereto, the system 2114 may store such information. The mass storage system 2114 may receive the request and/or the information via the connector 2105. The mass storage system 2114 may further receive a request for information, and in response thereto, the mass storage system 2114 may supply such information. The mass storage system 2114 may receive the request for information and/or may supply the information via the connector 2105.

In some embodiments, the mass storage system 2114 includes a memory 3102 and a controller 3104. The memory 3102 and the controller 3104 may be mounted on a printed circuit board 3106. The memory 3102 may be coupled to the controller 3104. The controller 3104 may be coupled to the connector 2105. If the connector 2105 comprises a USB connector, the memory 3102 and/or controller 3104 may operate in accordance with a USB mass storage device standard. The memory 3102 may comprise flash memory and/or other circuitry. The controller 3104 may comprise a USB controller and/or other circuitry. Flash memory may comprise EEPROM. In some embodiments, the memory 3102 comprises a storage capacity of at least 1 Mbyte. In some embodiments, the memory 3102 comprises a storage capacity of at least 1 Gbyte.

In operation, the controller 3104 may receive a request to store information and may supply the request and the information to the memory 3102. The controller 3104 may receive the request and/or the information via the connector 2105. The memory 3102 may receive the request supplied by the controller 3104 and may store the information in response thereto.

The controller 3104 may further receive a request for information and may supply the request to the memory 3102. In some embodiments, the controller 3104 receives the request via the connector 2105. The memory 3102 may receive the request supplied by the controller 3104, and in response thereto, may retrieve and supply the information to the controller 3104. The controller may receive the information supplied by the memory 3102 and may supply the information via the connector 2105.

In some embodiments, an alternative configuration of conductors 2118A-2118B (see dotted lines) couple proximity payment device 2102 to controller 3104 rather than to connector 2105. In such embodiments, the proximity payment device 2102 may receive and/or transmit signals via the controller 3104. In some embodiments, all signals received from, and/or transmitted to, the connector 2105 are received and/or transmitted via the controller 3104.

The controller 3104 may receive signals via the connector 2105 and may determine whether the signals are associated with the proximity payment device 2102 or the memory 3102. If the controller 3104 determines that the signals are associated with the proximity payment device 2102, the controller 3104 may supply the signals to the proximity payment device 2102. If the controller 3104 determines that the signals are associated with the memory 3102, the controller 3104 may supply the signals to the memory 3102. The controller 3104 may further receive signals from the proximity payment device 2102 and/or memory 3102, and in response thereto, the controller 3104 may supply the signals to the connector 2105.

In some embodiments, the proximity payment device 2102, the memory 3102 and the controller 3104 are disposed in separate packages. However, other configurations may also be employed.

Some embodiments may not include all of the features described above. In some embodiments, one or more signals received and/or transmitted via the connector 2105 are not related to a security parameter and/or authorization to reset a security parameter.

In some embodiments, the proximity payment device 2102 may not have and/or reset a security parameter in response to a signal received from the communication device 2106.

Figure 29:
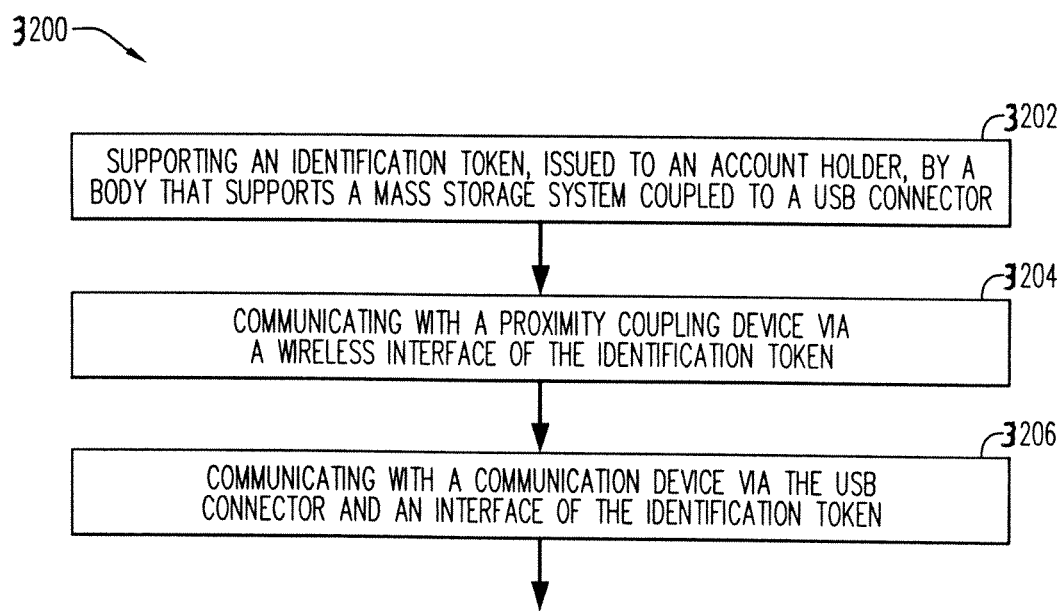
FIG. 29 is a flow chart that illustrates a method, according to some embodiments.

FIG. 29 shows a flow chart 3200 of a method, according to some embodiments. In some embodiments, one or more portions the method may be used in association with the proximity payment device 2102, the body 2104, the electrical connector 2105, the communication device 2106 and/or the system 2114 described above with respect to FIGS. 28A-28D. Notably, some embodiments may employ one or more portions of the method without one or more other portions of the method.

Referring to FIG. 29, at 3202, the method may include supporting an identification token, issued to an account holder, by a body that supports a mass storage system coupled to a USB connector.

At 3204, the method may further include communicating with a proximity coupling device via a wireless interface of the identification token.

At 3206, the method may further include communicating with a communication device via the USB connector and an interface of the identification token.

FIG. 30 is a schematic perspective view of a structure 3300, according to some embodiments. Referring to FIG. 30, in accordance with some embodiments, the structure 3300 includes an insert 3301 and a carrier 3302 for same.

The insert 3301 may include a proximity payment device 2102, a portion 3303 of connector 2105 and a coupler 3304. The proximity payment device 2102 includes a body 2700, an RFID IC 2702 and an antenna 2206. In some embodiments, the RFID IC 2702 includes the control/storage circuit 2204, the transmit/receive circuitry 2208 and the contact interface 2210 (FIG. 19).

The portion 3303 of connector 2105 includes a body 3306 and a plurality of electrical conductors, represented by conductors 2105A-2105D, supported by the body 3306. As further described below, the portion of connector 2105 is adapted to be inserted into a shell portion 3308 (FIGS. 30A-30B) of connector 2105. The plurality of conductors 2105A-2105D may be adapted to make electrical contact with a plurality of electrical conductors, represented by electrical conductors 2124A-2124D, respectively, of electrical connector 2124. In some embodiments, electrical connector 2105 comprises a USB connector having a male plug and electrical connector 2124 comprises a USB connector have a female receptacle to receive the male plug of electrical connector 2105.

The coupler 3304 includes a body 3308 and a plurality of electrical conductors, represented by electrical conductors 2118A-2118D, supported by the body 3308. The body 3308 of the coupler 3304 couples the body 2700 of proximity payment device 2102 to the body 3306 of the portion 3303 of connector 2105. The plurality of electrical conductors 2118A-2118D couple the electrical conductors 2105A-2105D, respectively, to the proximity payment device 2102.

The body 2700, the body 3306 and the body 3308 may be defined by a body 3310. In some embodiments, the body 3310 is one piece and/or generally card shaped. Tabs 3312 may join the body 3310 to the carrier 3302.

In some embodiments, the carrier 3302, the body 3310 and tabs 3312 are formed from a blank 3314. In some embodiments, the carrier 3302, the body 3310 and tabs 3312 are formed by punching, scoring, machining, etching and/or otherwise processing the blank 3314.

In some embodiments, the blank 3314 is card shaped or at least generally card shaped. In some embodiments, the blank 3314 has dimensions defined for a standard card referred to as "ID1" in ISO/IEC standard 7810, promulgated by the International Standardization Organization and other bodies.

In some embodiments, the blank 3314 comprises a multi-layer laminate. In some embodiments. One or more layers of the multi-layer laminate may be card shaped and formed of plastic or other suitable material. One or more conductive layers may define the antenna 2206, the plurality of conductors 2118A-2118D and/or the plurality of conductors 2105A-2105D. In some embodiments, one or more of such conductive layers comprises e-paper. In some embodiments, one or more of the conductive layers are disposed between two other layers of the multi-layer laminate. In other embodiments, one or more of the conductive layers define an outer layer of the multi-layer laminate.

The RFID IC 2702 may be attached to the body 2700 before, during and/or after forming the carrier 3302, the body 3310 and tabs 3312

In some embodiments, the insert 3301 is detached from the carrier 3302 and inserted in a device. In some embodiments, this may be done by an account holder, after the structure 3300 is issued to an account holder 2112. In some embodiments, this may be done prior to issuing any part of the structure 3300 to the account holder 2112. In some embodiments, the detaching of the insert 3301 from the carrier 3302 is accomplished by breaking tabs 3312.

In some embodiments, the insert 3301 may further comprise the mass storage system 2114 (FIGS. 28A-28D).

In some embodiments, "pre-personalization" and/or "personalization" of proximity payment device 2102 may be performed prior to detaching the insert 3302 from the carrier 3302.

Figure 31A:
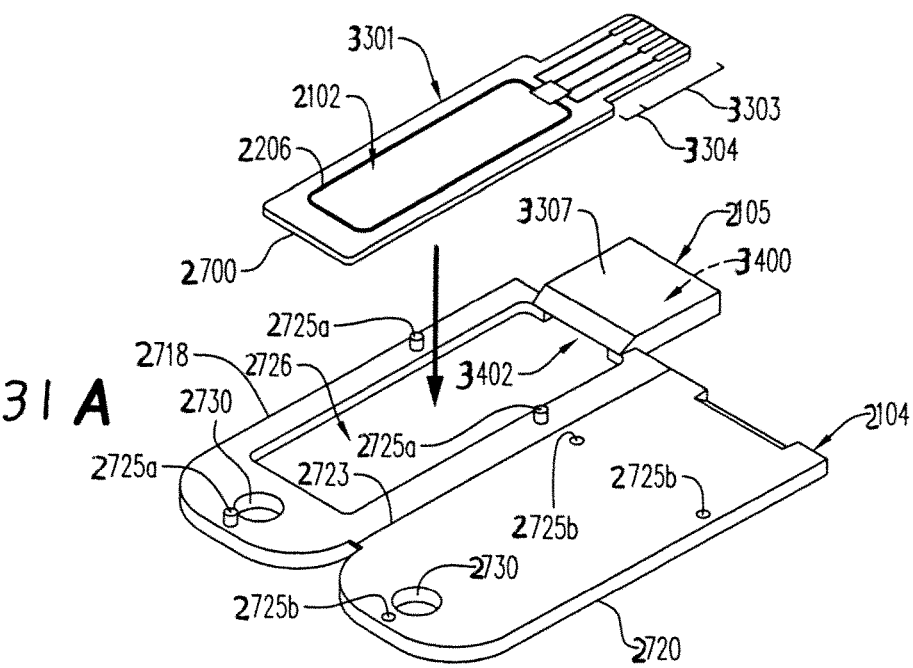
FIGS. 31A-31D are perspective views of an insert, a body and a connector, according to some embodiments.
Figure 31B:
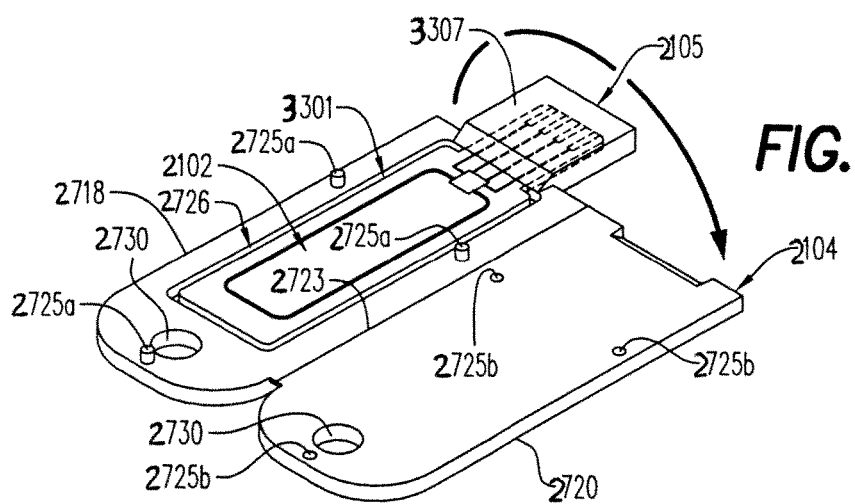
Figure 31C:
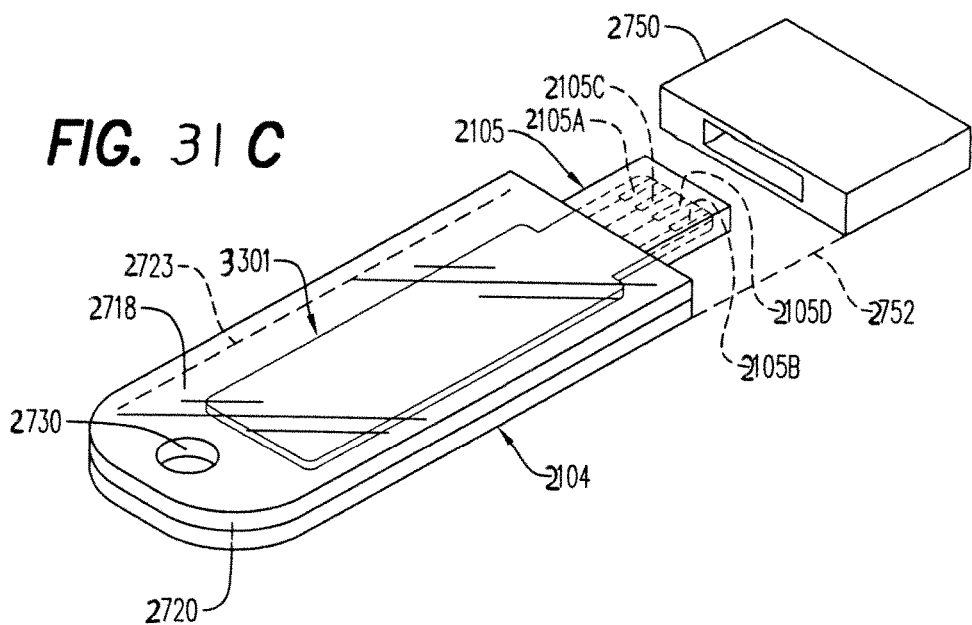
Figure 31D:
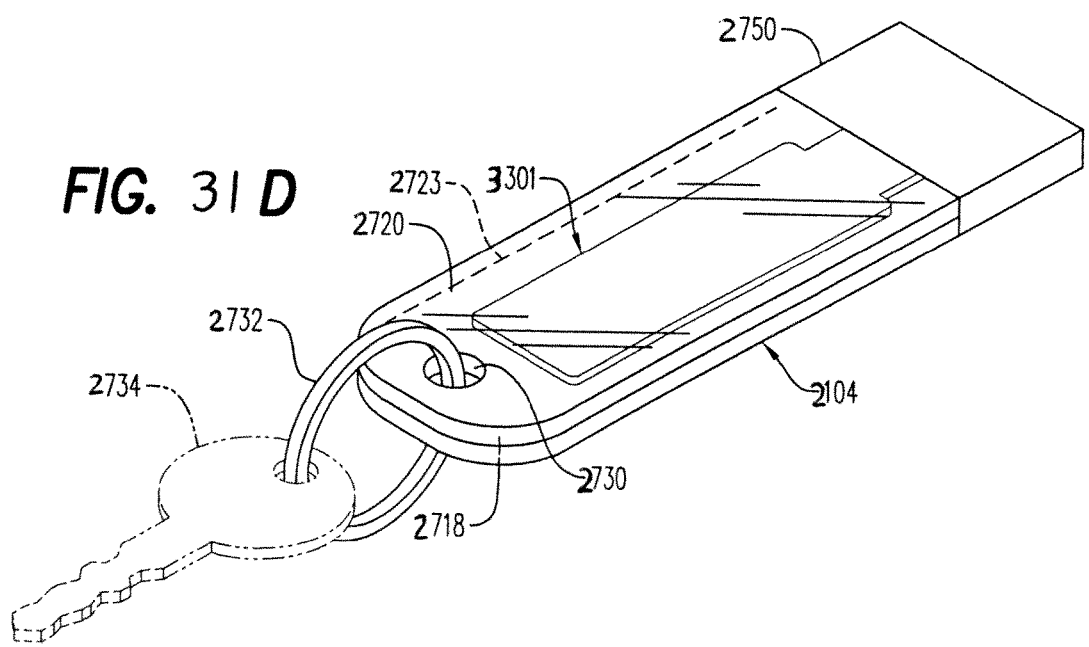

FIGS. 31A-31D are perspective views of the insert 2102, the body 2104 and a shell portion 3307 of connector 2105, according to some embodiments. More particularly, FIG. 31A is a perspective view of the insert 3301, the body 2104 and shell portion 3307 portion of the connector 2105, according to some embodiments, after the insert 3301 has been detached from the carrier 3302, prior to inserting the insert 3301 into the body 2104 and the shell portion 3307 of connector 2105. FIG. 31B is a perspective view of the insert 3301 inserted in the body 2104 and the shell portion 3307 of the connector 2105, according to some embodiments, with the body 2104 in an open state. FIGS. 31C-31D are perspective views of the insert 3301 inserted in the body 2104 and the shell portion 3307 of the connector 2105, according to some embodiments, with the body 2104 in a closed state.

Referring to FIGS. 31A-31D, in accordance with some embodiments, the shell portion 3307 of connector 2105 defines at least one opening 3400 in communication with a channel 3402. The insert 3301 may be inserted into the body 2104. The connector portion 3303 may thereafter be inserted through the at least one opening 3400 and into the channel 3402. With such positioning, the plurality of conductors 2105A-2105D may be positioned to make electrical contact with a plurality of electrical conductors, represented by electrical conductors 2124A-2124D, respectively, of electrical connector 2124. Thereafter, the body 2104 may be closed and the connector 2105 may be mated to the connector 2124. Thereafter, one or more of the methods described above may be employed. Other orders and/or methods may also be employed in addition and/or in lieu thereof.

Figure 32:
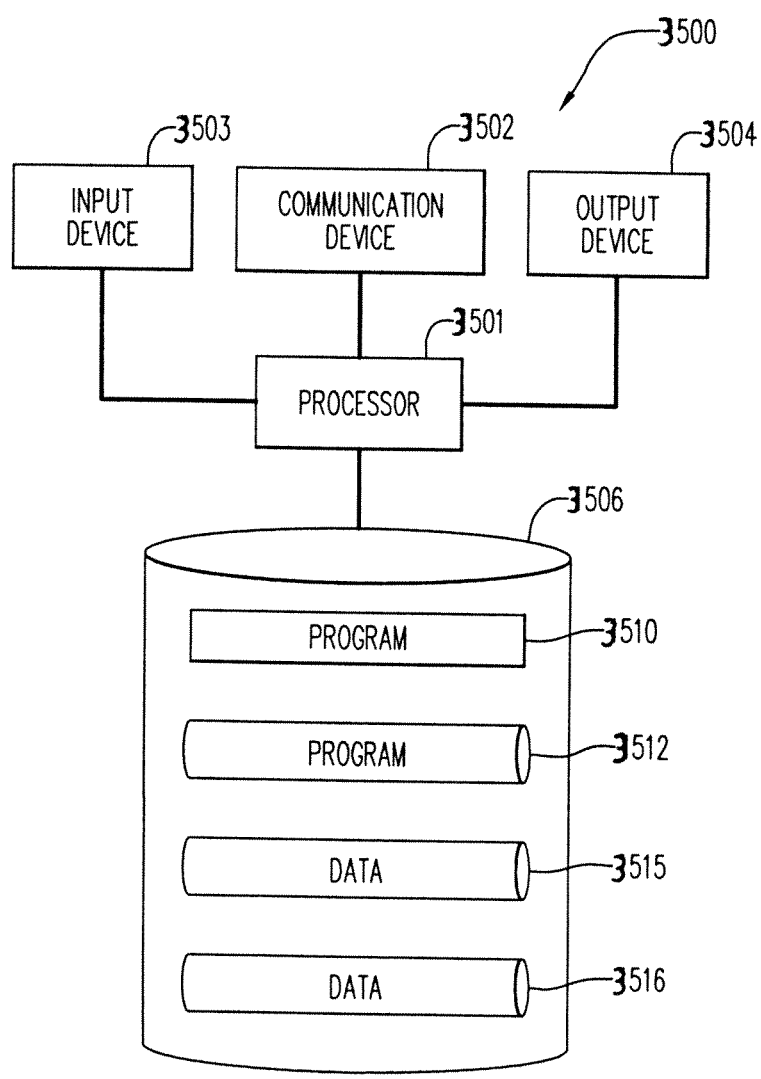
FIG. 32 is a schematic block diagram of an architecture, according to some embodiments.

FIG. 32 is a block diagram of an architecture 3500 according to some embodiments.

In some embodiments, one or more of the systems, devices and/or circuitry (or portion(s) thereof) disclosed herein may have an architecture that is the same as and/or similar to one or more portions of the architecture 3500. Referring to FIG. 32, in accordance with some embodiments, the architecture 3500 includes a processor 3501 operatively coupled to a communication device 3502, an input device 3503, an output device 3504 and a storage device 3506.

In some embodiments, the processor 3501 may execute processor-executable program code to provide one or more portions of the one or more functions disclosed herein and/or to carry out one or more portions of one or more embodiments of one or more methods disclosed herein. In some embodiments, the processor 3501 may be a conventional microprocessor or microprocessors.

The communication device 3502 may be used to facilitate communication with other devices and/or systems. In some embodiments, communication device 3502 may be configured with hardware suitable to physically interface with one or more external devices and/or network connections. For example, communication device 3502 may comprise an Ethernet connection to a local area network through which architecture 3500 may receive and transmit information over the Internet and/or one or more other network(s).

The input device 3503 may comprise, for example, one or more devices used to input data and/or other information, such as, for example: a keyboard, a keypad, track ball, touchpad, a mouse or other pointing device, a microphone, knob or a switch, an infra-red (IR) port, etc. The output device 3504 may comprise, for example, one or more devices used to output data and/or other information, such as, for example: an IR port, a dock, a display, a speaker, and/or a printer, etc.

The storage device 3506 may comprise, for example, one or more storage devices, such as, for example, magnetic storage devices (e.g., magnetic tape and hard disk drives), optical storage devices, and/or semiconductor memory devices such as Random Access Memory (RAM) devices and Read Only Memory (ROM) devices.

The storage device 3506 may store one or more programs 3510-3512, which may include one or more instructions to be executed by the processor 3501.

In some embodiments, the one or more programs may include one or more operating systems, database management systems, other applications, other information files, etc., for operation of the architecture 3500.

The storage device 3506 may store data 3514-3516 and/or other information for one or more programs. In some embodiments, the data 3514-3516 and/or other information may be stored in one or more databases. As used herein a "database" may refer to one or more related or unrelated databases. Data and/or other information may be stored in any form. In some embodiments, data and/or other information may be stored in raw, excerpted, summarized and/or analyzed form.

In some embodiments, one or more portions of one or more embodiments disclosed herein may be embodied in a method, an apparatus, a computer program product, and/or an article where the article includes a storage medium readable by a processor.

As used herein, a signal may be any type of signal, i.e., a physical quantity (e.g., voltage, current, or magnetic field strength), an indication, a message and/or any other type of signal or combination thereof. A voltage, current, or magnetic field strength may be analog, digital, single ended signal, differential and/or any other type or combination thereof.

A wireless communication interface may be any type of wireless communication interface.

A circuit may be programmable or non programmable, general purpose or special purpose, dedicated or non dedicated, distributed or non distributed, shared or not shared, and/or any combination thereof. If the circuit has two or more distributed portions, the two or more portions may communicate with one another through a communication link. A circuit may include, for example, but is not limited to, hardware, software, firmware, hardwired circuits and/or any combination thereof.

A proximity payment device refers to any device, of any shape, which transmits to a point of sale terminal, by wireless transmission, a payment account number. As used herein, a payment account number may be numeric, non numeric and/or a combination thereof.

In some embodiments, a proximity payment device may also have a contact interface like that of a conventional smart card that includes a contact interface.

Some of the principles taught herein have been described in the context of an EMV risk parameter and/or resetting an EMV risk parameter. However, these teachings are also applicable to any type of security parameter and/or resetting any type of security parameter.

In addition, some of the principles taught herein have heretofore been described in the context of proximity payment devices. Nevertheless, these teachings are also applicable to any type of identification token. As used herein, the term "identification token" refers to a device, having a card shape or any other shape, that serves as one or more of: a proximity payment device; a transportation related device; an identification device to identify the holder for purposes apart from or in addition to transaction payments (e.g., to identify medical patients and/or individuals insured by health insurance plans); a device used to portably store medical record information; stored value card(s); and to so-called electronic passports (also known as RFID-enabled passports) and/or a source of any type of information associated with a holder of the identification token (and/or the holder of the card installed therein).

The term "transportation related device" refers to a card or other device used to pay, or confirm or evidence payment of, a charge for using a transportation system and/or cards or the like issued by transportation systems (e.g., mass transit systems) for access to the transportation systems. The term "RFID-enabled passport" refers to an internationally recognized travel document that includes an IC and an antenna and communicates with a terminal by a wireless communication technique. The term "information" may include but is not limited to a name, a social security number, an account number, an expiration date, a security code and/or medical information.

Thus, unless stated otherwise, an account holder may include, but is not limited to, any person and/or entity having access to an identification token and/or any accounts associated therewith.

As used herein, an account number may be numeric, non numeric and/or a combination thereof.

Unless otherwise stated, terms such as, for example, "in response to" and "based on" mean "in response at least to" and "based at least on", respectively, so as not to preclude being responsive to and/or based on, more than one thing.

In addition, unless stated otherwise, terms such as, for example, "comprises", "has", "includes", and all forms thereof, are considered open-ended, so as not to preclude additional elements and/or features. In addition, unless stated otherwise, terms such as, for example, "a", "one", "first", are considered open-ended, and do not mean "only a", "only one" and "only a first", respectively. Moreover, unless stated otherwise, the term "first" does not, by itself, require that there also be a "second".

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method comprising:
communicating, by an identification token, with a proximity coupling device via a wireless interface of the identification token;
communicating, by the identification token, with a communication device; and
resetting a security parameter in the identification token in response, at least in part, to at least one signal from the communication device;
wherein the communication device includes a counter that counts a number of occasions that the communication device may be used in resetting the security parameter in the identification token.

2. The method of claim 1 wherein the identification token comprises an identification token supported by a non-card shaped body.

3. The method of claim 2 wherein the non-card shaped body contains the identification token.

4. The method of claim 2 wherein the non-card shaped body comprises a body of at least one of: a cell phone, a wristwatch, a portable data assistant, a music player and a key fob.

5. The method of claim 1 wherein the identification token comprises a proximity payment device.

6. The method of claim 5 wherein unless the security parameter is reset, the proximity payment device is usable for a purchase transaction only until the security parameter reaches a predetermined value and/or a predetermined amount has been spent.

7. The method of claim 1 wherein communicating with the proximity coupling device via the wireless interface comprises transmitting at least one of:
an account number; and
a name of a person.

8. The method of claim 1 wherein the security parameter comprises a security parameter based on at least one of:
a number of transactions that have been made using the identification token; and
an amount that has been spent using the identification token.

9. The method of claim 1 wherein the security parameter comprises an EMV risk parameter.

10. The method of claim 1 further comprising providing, by the identification token, a human detectable indication that the security parameter has been reset.

11. The method of claim 10 wherein the human detectable indication comprises a visible, audible and/or tactile indication.

12. The method of claim 1, the method further comprising:

decrementing the counter each time the communication device is used in resetting the security parameter.

13. Apparatus comprising:
a communication device to transmit, to an identification token configured to communicate with a proximity coupling device via a wireless interface of the identification token, at least one signal that indicates authorization to reset a security parameter in the identification token; and
wherein the communication device includes a counter that counts a number of occasions that the communication device may be used in resetting the security parameter in the identification token.

14. The apparatus of claim 13 wherein the identification token comprises an identification token supported by a non-card shaped body.

15. The apparatus of claim 13 wherein the identification token comprises a proximity payment device.

16. The apparatus of claim 15 wherein unless the security parameter is reset, the proximity payment device is usable for a purchase transaction only until the security parameter reaches a predetermined value and/or a predetermined amount has been spent.

17. The apparatus of claim 13 wherein the identification token is configured to transmit at least one of:
an account number; and
a name of a person.

18. The apparatus of claim 13 wherein the security parameter comprises a security parameter based on at least one of:
a number of transactions that have been made using the identification token; and
an amount that has been spent using the identification token.

19. The apparatus of claim 13 wherein the security parameter comprises an EMV risk parameter.

20. The apparatus of claim 13 wherein the non-card shaped body contains the identification token.

21. The apparatus of claim 13 wherein the non-card shaped body comprises a body of at least one of: a cell phone, a wristwatch, a portable data assistant, a music player and a key fob.

22. The apparatus of claim 13 wherein the communication device is further to provide a human detectable indication that the security parameter has been reset.

23. The method of claim 22 wherein the human detectable indication comprises a visible, audible and/or tactile indication.

24. A method comprising:
communicating, by a communication device, with an identification token configured to communicate with a proximity coupling device via a wireless interface of the identification token;
transmitting, by the communication device, to the identification token, at least one signal that indicates authorization to reset a security parameter in the identification token; and
including a counter in the communication device, the counter in the communication device counting a number of occasions that the communication device may be used in resetting the security parameter in the identification token.

25. The method of claim 24 further comprising providing, by the communication device, a human detectable indication that the security parameter has been reset.

26. The method of claim 25 wherein the human detectable indication comprises a visible, audible and/or tactile indication.

27. The method of claim 24 wherein the counter is resetable so that the communication device may again be used in resetting the security parameter in the identification token.

28. The method of claim 24 further comprising:
resetting the counter so that the communication device may again be used in resetting the security parameter in the identification token.

29. A non-transitory storage medium having instructions stored thereon, the instructions executable by a processor to result in a method comprising:
communicating, by a communication device, with an identification token configured to communicate with a proximity coupling device via a wireless interface of the identification token;
transmitting, by the communication device, to the identification token, at least one signal that indicates authorization to reset a security parameter in the identification token; and
including a counter in the communication device, the counter in the communication device counting a number of occasions that the communication device may be used in resetting the security parameter in the identification token.

30. The medium of claim 29, the method further comprising:
resetting the counter so that the communication device may again be used in resetting the security parameter in the identification token.

* * * * *